(12) United States Patent
Takada et al.

(10) Patent No.: US 8,250,390 B2  
(45) Date of Patent: Aug. 21, 2012

(54) POWER ESTIMATING METHOD AND COMPUTER SYSTEM

(75) Inventors: Masanori Takada, Yokohama (JP); Shuji Nakamura, Machida (JP)

(73) Assignee: Hitachi, Ltd., Tokyo (JP)

(*) Notice: Subject to any disclaimer, the term of this patent is extended or adjusted under 35 U.S.C. 154(b) by 823 days.

(21) Appl. No.: 12/351,232

(22) Filed: Jan. 9, 2009

(65) Prior Publication Data

US 2010/0100757 A1    Apr. 22, 2010

(30) Foreign Application Priority Data

Oct. 20, 2008  (JP) .................................. 2008-269921

(51) Int. Cl.
- G06F 13/00 (2006.01)
- G06F 3/00 (2006.01)
- G06F 13/12 (2006.01)
- G06F 1/00 (2006.01)
- G06F 15/173 (2006.01)
- G06B 5/00 (2006.01)

(52) U.S. Cl. .......... 713/320; 711/162; 711/114; 710/74; 710/18; 713/300; 709/223; 360/69

(58) Field of Classification Search .................. 711/114, 711/162; 713/300; 710/18, 74; 360/69; 709/223

See application file for complete search history.

(56) References Cited

U.S. PATENT DOCUMENTS

| | | | | |
|---|---|---|---|---|
| 5,961,613 | A * | 10/1999 | DeNicola ......................... | 710/18 |
| 6,966,006 | B2 * | 11/2005 | Pacheco et al. ................. | 713/300 |
| 7,281,088 | B2 * | 10/2007 | Yamazaki et al. ............. | 711/114 |
| 7,747,800 | B2 * | 6/2010 | Zimoto et al. .................. | 710/74 |
| 7,809,906 | B2 * | 10/2010 | Eguchi et al. .................. | 711/162 |
| 2003/0212857 | A1 * | 11/2003 | Pacheco et al. ............... | 711/114 |
| 2005/0160221 | A1 * | 7/2005 | Yamazaki et al. ............. | 711/114 |
| 2005/0259345 | A1 * | 11/2005 | Hakamata et al. .............. | 360/69 |
| 2007/0061512 | A1 * | 3/2007 | Taguchi et al. ................ | 711/114 |
| 2007/0294552 | A1 | 12/2007 | Kakihara et al. | |
| 2008/0120404 | A1 * | 5/2008 | Sakai ............................ | 709/223 |
| 2008/0126702 | A1 * | 5/2008 | Zimoto et al. ................. | 711/114 |

FOREIGN PATENT DOCUMENTS

| | | |
|---|---|---|
| JP | 2007-079754 | 3/2007 |
| JP | 2008-003719 | 1/2008 |

OTHER PUBLICATIONS

U.S. Appl. No. 12/200,242, filed Aug. 28, 2008, Takada et al.
Zedlewski et al., "Modeling Hard-Disk Power Consumption", Proceedings of 2nd USENIX Conference on File and Storage Technologies, 2003.

\* cited by examiner

*Primary Examiner* — Thomas Lee  
*Assistant Examiner* — Aurel Prifti  
(74) *Attorney, Agent, or Firm* — Antonelli, Terry, Stout & Kraus, LLP.

(57) ABSTRACT

In order to calculate the power of logically-partitioned areas without using a power meter in a storage system logically partitioning a storage area, there is provided a power estimating method in a computer system including a management computer and a storage system connected to the management computer and a host computer. The storage system prepares logical storage-volumes in a real area of plural disk drives. The power estimating method includes the steps of: allowing a third processor to calculate operation rates of the disk drives for access to the logical storage-volumes from operating times of the disk drives for access to the logical storage-volumes; and allowing the third processor to calculate power consumption increments of the disk drives for access to the logical storage-volumes by access types from incremental power consumption information and the calculated operation rates of the disk drives.

14 Claims, 54 Drawing Sheets

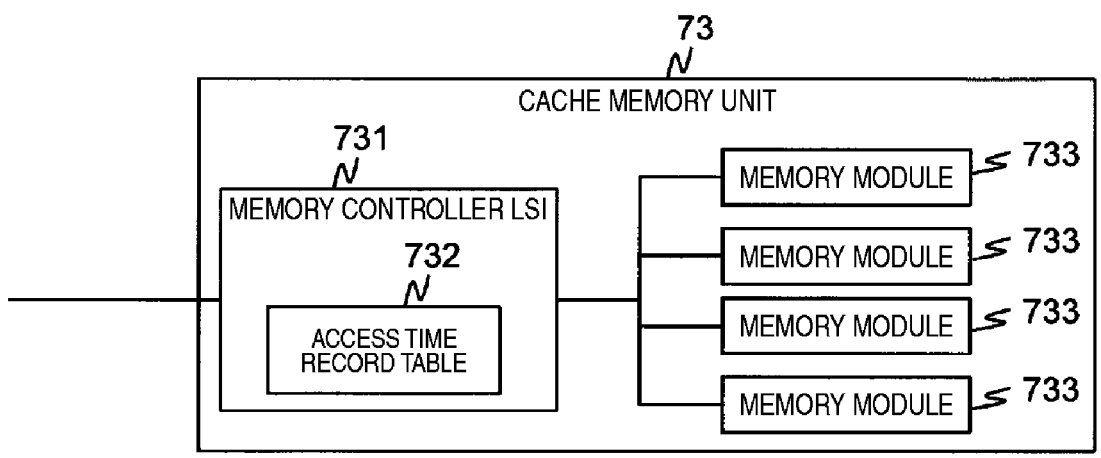

FIG. 6

| DISK NUMBER | DISK TYPE |
|---|---|
| #0 | A |
| #1 | A |
| #2 | B |
| #3 | B |
| #4 | C |
| #5 | C |
| #6 | NONE |
| ... | ... |

FIG. 7

| DISK TYPE | IDLE POWER [W] | RANDOM-READ POWER INCREMENT [W] | RANDOM-WRITE POWER INCREMENT [W] | SEQUENTIAL-READ POWER INCREMENT [W] | SEQUENTIAL-WRITE POWER INCREMENT [W] |
|---|---|---|---|---|---|
| A | 14.1 | 4.9 | 1.9 | 1.6 | 1.9 |
| B | 8.9 | 5.1 | 2.3 | 2.0 | 2.3 |
| C | 11.4 | 5.6 | 2.4 | 1.8 | 2.3 |
| ... | ... | .... | ... | ... | ... |

FIG. 8

| DISK NUMBER (331) | RANDOM-READ CUMULATIVE OPERATING TIME [μs] (332) | RANDOM-WRITE CUMULATIVE OPERATING TIME [μs] (333) | SEQUENTIAL-READ CUMULATIVE OPERATING TIME [μs] (334) | SEQUENTIAL-WRITE CUMULATIVE OPERATING TIME [μs] (335) |
|---|---|---|---|---|
| #0 | 82,148 | 8,651 | 32,823 | 6,647 |
| #1 | 9,384 | 46,095 | 5,020 | 107 |
| ... | ... | ... | ... | ... |

| DISK NUMBER (341) | TAG NUMBER (342) | ACCESS TYPE (343) |
|---|---|---|
| #0 | 0 | Random Read |
| | 1 | Random Read |
| | 2 | NONE |
| | ... | ... |
| #1 | 0 | Sequential Read |
| | 1 | Sequential Read |
| | ... | ... |

| DISK NUMBER | ACCESS TYPE | CURRENT OUTSCANDING COMMAND COUNT | DISK OPERATION START TIME |
|---|---|---|---|
| #0 | Random Read | 5 | 8,421652 |
| | Random Write | 0 | - |
| | Sequential Read | 10 | 8,421120 |
| | Sequential Write | 0 | - |
| #1 | Random Read | 0 | - |
| | Random Write | 3 | 8,421573 |
| ... | ... | ... | ... |

FIG. 11

| TYPE | SLOT NUMBER | COMPONENT NAME |
|---|---|---|
| CONTROLLER | 0 | C-A |
| | 1 | C-B |
| | ... | ... |
| CACHE MEMORY UNIT | 0 | PRESENCE |
| | 1 | PRESENCE |
| | ... | ... |
| HOST I/F | 0 | H-A |
| | 1 | H-B |
| | ... | ... |
| DISK I/F | 0 | D-A |
| | 1 | D-B |
| | ... | ... |
| CACHE MEMORY MODULE | 0 | M-A |
| | 1 | M-B |
| | ... | ... |
| ... | ... | ... |

FIG. 12

| TYPE | COMPONENT NAME | IDLE POWER [W] |
|---|---|---|
| CONTROLLER | C-A | 85 |
| | C-B | 65 |
| | ... | ... |
| CACHE MEMORY UNIT | - | 40 |
| HOST I/F | H-A | 52 |
| | H-B | 56 |
| | ... | ... |
| CACHE MEMORY MODULE | - | 48 |
| | M-A | 2.5 |
| | M-B | 4.2 |
| | ... | ... |
| ... | ... | ... |

FIG. 13

| TYPE | COMPONENT NAME | POWER INCREMENT [W] |
|---|---|---|
| CONTROLLER | C-A | 42 |
| | C-B | 36 |
| | ... | ... |
| CACHE MEMORY MODULE | M-A | 3.7 |
| | M-B | 5.3 |
| | ... | ... |
| ... | ... | ... |

381 = TYPE; 382 = COMPONENT NAME; 383 = POWER INCREMENT [W]; 38 = table

FIG. 14

| CONTROLLER NUMBER | PROCESSOR CORE NUMBER | CUMULATIVE OPERATING TIME [μs] |
|---|---|---|
| 0 | 0 | 758,243 |
| | 1 | 426,197 |
| | 2 | 548,164 |
| | 3 | 137,654 |
| 1 | 0 | 84,792 |
| | 1 | 46,879 |
| ... | ... | ... |

391 = CONTROLLER NUMBER; 392 = PROCESSOR CORE NUMBER; 393 = CUMULATIVE OPERATING TIME [μs]; 39 = table

FIG. 15

| CONTROLLER NUMBER (301) | PROCESSOR CORE NUMBER (302) | JOB START TIME (303) |
|---|---|---|
| 0 | 0 | 8,421,652 |
| 0 | 1 | - |
| 0 | 2 | 8,421,210 |
| 0 | 3 | - |
| 1 | 0 | - |
| 1 | 1 | 8,421,573 |
| ... | ... | ... |

FIG. 22

| CALCULATED VALUE | CALCULATION EXPRESSION |
|---|---|
| P_static | P_idle |
| P_RndRd | AR_RndRd × p_RndRd |
| P_RndWr | AR_RndWr × p_RndWr |
| P_SeqRd | AR_SeqRd × p_SeqRd |
| P_SeqWr | AR_SeqWr × p_SeqWr |
| P_Dynamic | P_RndRd + P_RndWr + P_SeqRd + P_SeqWr |

FIG. 23

| PART | AVERAGE POWER CONSUMPTION [W] | POWER INCREMENT [W] | | | | IDLE POWER [W] |
| --- | --- | --- | --- | --- | --- | --- |
| | | RANDOM-READ POWER INCREMENT [W] | RANDOM-WRITE POWER INCREMENT [W] | SEQUENTIAL-READ POWER INCREMENT [W] | SEQUENTIAL-WRITE POWER INCREMENT [W] | CONTROLLER POWER INCREMENT [W] | |
| DISK 0 | 18.0 | 3.7 | 0.2 | 0.0 | 0.0 | - | 14.1 |
| DISK 1 | 16.3 | 0.0 | 0.0 | 2.0 | 0.2 | - | 14.1 |
| CACHE MEMORY UNIT 0 | 40.0 | - | - | - | - | 0.0 | 40.0 |
| CACHE MEMORY UNIT 1 | 40.0 | - | - | - | - | 0.0 | 40.0 |
| DIMM 0 | 3.7 | - | - | - | - | 1.2 | 2.5 |
| DIMM 1 | 7.2 | - | - | - | - | 3.0 | 4.2 |
| CONTROLLER 0 | 122.0 | - | - | - | - | 37.0 | 85.0 |
| CONTROLLER 1 | 75.0 | - | - | - | - | 10.0 | 65.0 |
| HOST I/F UNIT 0 | 52.0 | - | - | - | - | 0.0 | 52.0 |
| HOST I/F UNIT 1 | 56.0 | - | - | - | - | 0.0 | 56.0 |
| DISK I/F UNIT 0 | 48.0 | - | - | - | - | 0.0 | 48.0 |
| ⋮ | ⋮ | ⋮ | ⋮ | ⋮ | ⋮ | ⋮ | ⋮ |
| TOTAL | 1,325 | 30 | 18 | 0 | 12 | | 1,260 |

991  992  993  994

| DATE 511 | PART 512 | AVERAGE POWER CON-SUMPTION [W] 513 | POWER INCREMENT [W] 514 | | | | IDLE POWER [W] 515 |
|---|---|---|---|---|---|---|---|
| | | | RANDOM-READ POWER INCREMENT [W] | RANDOM-WRITE POWER INCREMENT [W] | SEQUENTIAL-READ POWER INCREMENT [W] | SEQUENTIAL-WRITE POWER INCREMENT [W] | CONTROL-LER POWER INCREMENT [W] | |
| 05/11 10:00 -11:00 | DISK 0 | 18 | 3.7 | 0.2 | 0 | 0 | - | 14.1 |
| | CONTROL-LER 0 | 122 | - | - | - | - | 37 | 85 |
| | ... | ... | ... | ... | ... | ... | ... | ... |
| | TOTAL | 1,325 | 30 | 8 | 15 | 12 | 152 | 1,260 |
| 05/11 -12:00 | ... | ... | ... | ... | ... | ... | ... | ... |
| | TOTAL | 1,570 | 257 | 12 | 23 | 18 | 215 | 1,260 |
| | ... | ... | ... | ... | ... | ... | ... | ... |

| VIRTUAL STORAGE (LPAR) NUMBER | LOGICAL VOLUME NUMBER |
|---|---|
| 0 | 0,1,2,3,5,7,8,12 |
| 1 | 4,6,9,10,11,13,14 |
| ... | ... |

FIG. 30

| LOGICAL VOLUME NUMBER (921) | RAID LEVEL (922) | DISK NUMBER (923) | LBA RANGE (924) |
|---|---|---|---|
| 0 | 1 | 0 | 0-20971519 |
|  |  | 1 | 0-20971519 |
|  |  | ... | ... |
| 1 | 5 | 4 | 0-16777215 |
|  |  | 5 | 0-16777215 |
|  |  | 6 | 0-16777215 |
|  |  | 7 | 0-16777215 |
| 2 | 1 | 0 | 20971520-37748735 |
|  |  | 1 | 20971520-37748735 |
|  |  | ... | ... |
| ... | ... | ... | ... |

Table 92

FIG. 31

| DISK NUMBER (331) | LOGICAL VOLUME NUMBER (336) | RANDOM-READ CUMULATIVE OPERATING TIME [μs] (332) | RANDOM-WRITE CUMULATIVE OPERATING TIME [μs] (333) | SEQUENTIAL-READ CUMULATIVE OPERATING TIME [μs] (334) | SEQUENTIAL-WRITE CUMULATIVE OPERATING TIME [μs] (335) |
|---|---|---|---|---|---|
| #0 | 0 | 43,705 | 6,385 | 13,980 | 3,376 |
|  | 1 | 40,273 | 2,013 | 18,534 | 3,482 |
|  | ... | ... | ... | ... | ... |
| #1 | 0 | 9,384 | 46,095 | 5,020 | 107 |
|  | ... | ... | ... | ... | ... |
| ... | ... | ... | ... | ... | ... |

Table 33

FIG. 32

| DISK NUMBER 341 | TAG NUMBER 342 | LOGICAL VOLUME NUMBER 344 | ACCESS TYPE 343 |
|---|---|---|---|
| #0 | 0 | 0 | Random Read |
| | 1 | 1 | Random Read |
| | 2 | - | NONE |
| | ... | ... | ... |
| #1 | 0 | 0 | Sequential Read |
| | 1 | 0 | Sequential Read |
| ... | | ... | ... |

FIG. 33

| DISK NUMBER | LOGICAL VOLUME NUMBER | ACCESS TYPE | CURRENTLY-OUTSTANDING COMMAND COUNT | DISK OPERATION START TIME |
|---|---|---|---|---|
| #0 | 0 | Random Read | 5 | 8,421652 |
| | | Random Write | 0 | - |
| | | Sequential Read | 10 | 8,421120 |
| | 1 | Sequential Write | 0 | - |
| #1 | 0 | Random Read | 0 | - |
| | | Random Write | 3 | 8,421573 |
| ... | | ... | ... | ... |

FIG. 34

| CONTROLLER NUMBER (391) | PROCESSOR CORE NUMBER (392) | LOGICAL VOLUME NUMBER (394) | CUMULATIVE OPERATING TIME [μs] (393) |
|---|---|---|---|
| 0 | 0 | 0 | 374,105 |
| | | 1 | 374,120 |
| | 1 | 0 | 398,752 |
| | | 1 | 25,182 |
| | 2 | 0 | 268,675 |
| | | 1 | 240,357 |
| | 3 | 0 | 42,970 |
| | | 1 | 60,723 |
| 1 | 0 | 0 | 75,804 |
| | | 1 | 9,750 |
| | 1 | 0 | 40,795 |
| | | 1 | 5,972 |
| ... | ... | ... | ... |

FIG. 35

| CONTROLLER NUMBER (301) | PROCESSOR CORE NUMBER (302) | LOGICAL VOLUME NUMBER (304) | JOB START TIME (303) |
|---|---|---|---|
| 0 | 0 | 0 | 8,421,652 |
| | 1 | - | - |
| | 2 | 1 | 8,421,210 |
| | 3 | - | - |
| 1 | 0 | - | - |
| | 1 | 0 | 8,421,573 |
| ... | ... | ... | ... |

| LOGICAL VOLUME NUMBER (911) | CUMULATIVE ACCESS AMOUNT [B] (912) |
|---|---|
| 0 | 1,653,688,320 |
| 1 | 833,028,096 |
| ... | ... |

| PART | AVERAGE POWER CONSUMPTION [W] | IDLE POWER [W] | LOGICAL VOLUME NUMBER | POWER INCREMENT [W] | | | | |
|---|---|---|---|---|---|---|---|---|
| | | | | RANDOM-READ POWER INCREMENT [W] | RANDOM-WRITE POWER INCREMENT [W] | SEQUENTIAL-READ POWER INCREMENT [W] | SEQUENTIAL-WRITE POWER INCREMENT [W] | CONTROLLER POWER INCREMENT [W] |
| DISK 0 | 18.0 | 14.1 | 0 | 3.7 | 0.2 | 0.0 | 0.0 | - |
| DISK 1 | ... | ... | ... | ... | ... | ... | ... | ... |
| DIMM 0 | 3.7 | 2.5 | 0 | - | - | - | - | 0.5 |
| ... | ... | ... | ... | ... | ... | ... | ... | ... |
| TOTAL | 1,325 | 1,260 | - | 30 | 18 | 0 | 12 | 15 |

FIG. 44

| DATE (511) | PART (512) | AVERAGE POWER CONSUMPTION [W] (513) | LOGICAL VOLUME NUMBER (516) | POWER INCREMENT [W] (514) | | | | | IDLE POWER [W] (515) |
|---|---|---|---|---|---|---|---|---|---|
| | | | | RANDOM-READ POWER INCREMENT [W] | RANDOM-WRITE POWER INCREMENT [W] | SEQUENTIAL-READ POWER INCREMENT [W] | SEQUENTIAL-WRITE POWER INCREMENT [W] | CONTROLLER POWER INCREMENT [W] | |
| 05/11 10:00 -11:00 | DISK 0 | 18 | 0 | 3.7 | 0.2 | 0 | 0 | - | 14.1 |
| | | | ... | ... | ... | ... | ... | ... | ... |
| | CONTROLLER 0 | 122 | 0 | - | - | - | - | 3.7 | 85 |
| | ... | ... | ... | ... | ... | ... | ... | ... | ... |
| | TOTAL | 1,325 | | 30 | 8 | 15 | 12 | 152 | 1,260 |
| 05/11 -12:00 | TOTAL | 1,570 | | 257 | 12 | 23 | 18 | 215 | 1,260 |
| ... | | | | ... | ... | ... | ... | ... | ... |

FIG. 46

| | VIRTUAL STORAGE POWER CONSUMPTION | | |
|---|---|---|---|
| | 591 | 592 | |
| | STATIC POWER | VIRTUAL STORAGE 0 | ... |
| TOTAL | 1500[W] | 120[W] | ... |
| DISK 0 | 12.1[W] | 1.8[W] | .... |
| CONTROLLER 0 | 65[W] | 27[W] | .... |
| .... | .... | .... | .... |

593 UPDATE   594 END

FIG. 49

| 321 DISK TYPE | 322 IDLE POWER [W] | 323 RANDOM-READ POWER INCREMENT [W] | 324 RANDOM-WRIT POWER INCREMENT [W] | 325 SEQUENTIAL-READ POWER INCREMENT [W] | 326 SEQUENTIAL-WRITE POWER INCREMENT [W] | 327 STANDBY POWER [W] | 328 SPIN-DOWN POWER [W] |
|---|---|---|---|---|---|---|---|
| A | 14.1 | 4.9 | 1.9 | 1.6 | 1.9 | 10.2 | 1.3 |
| B | 8.9 | 5.1 | 2.3 | 2.0 | 2.3 | 5.4 | 1.3 |
| C | 11.4 | 5.6 | 2.4 | 1.8 | 2.3 | 9.7 | 1.2 |
| ... | ... | ... | ... | ... | ... | ... | ... |

FIG. 50

| 331 DISK TYPE | 336 LOGICAL VOLUME NUMBER | 332 RANDOM-READ CUMULATIVE OPERATING TIME [μs] | 333 RANDOM-WRITE CUMULATIVE OPERATING TIME [μs] | 334 SEQUENTIAL-READ CUMULATIVE OPERATING TIME [μs] | 335 SEQUENTIAL-WRITE CUMULATIVE OPERATING TIME [μs] | 337 STANDBY TIME [μs] | 338 SPIN-DOWN TIME [μs] |
|---|---|---|---|---|---|---|---|
| #0 | 0 | 43,705 | 6,385 | 13,980 | 3,376 | 50,732 | 1,367 |
| | 1 | 40,273 | 2,013 | 18,534 | 3,482 | | |
| | ... | ... | ... | ... | ... | | |
| #1 | 0 | 9,384 | 46,095 | 5,020 | 107 | 0 | 84,915 |
| | ... | ... | ... | ... | ... | | |
| ... | ... | ... | ... | ... | ... | ... | ... |

FIG. 51

| DISK NUMBER | CURRENT STATUS | START TIME |
|---|---|---|
| #0 | SPIN DOWN | 8,421,652 |
| #1 | ACTIVE | - |
| ... | ... | ... |

FIG. 55

| DISK TYPE | IDLE POWER [W] | RANDOM-READ ENERGY CONSUMPTION [J/kB] | RANDOM-WRITE ENERGY CONSUMPTION [J/kB] | SEQUENTIAL-READ ENERGY CONSUMPTION [J/kB] | SEQUENTIAL-WRITE ENERGY CONSUMPTION [J/kB] |
|---|---|---|---|---|---|
| S-A | 14.1 | 4.9 | 1.9 | 1.6 | 1.9 |
| S-B | 8.9 | 5.1 | 2.3 | 2.0 | 2.3 |
| ... | ... | .... | ... | ... | ... |

FIG. 56

| DISK NUMBER | LOGICAL VOLUME NUMBER | RANDOM-READ CUMULATIVE TRANSFER SIZE [kB] | RANDOM-WRITE CUMULATIVE TRANSFER SIZE [kB] | SEQUENTIAL-READ CUMULATIVE TRANSFER SIZE [kB] | SEQUENTIAL-WRITE CUMULATIVE TRANSFER SIZE [kB] |
|---|---|---|---|---|---|
| #0 | 0 | 43,705 | 6,385 | 13,980 | 3,376 |
| | 1 | 40,273 | 2,013 | 18,534 | 3,482 |
| | ... | | | | |
| #1 | 0 | 9,384 | 46,095 | 5,020 | 107 |
| | ... | | | | |
| ... | ... | ... | ... | ... | ... |

FIG. 62

| TYPE | SLOT NUMBER | USED VIRTUAL STORAGE NUMBER |
|---|---|---|
| CONTROLLER | 0 | 0,1,2 |
| | 1 | 0,1 |
| | ... | ... |
| CACHE MEMORY UNIT | 0 | 0,1,2 |
| | 1 | 0 |
| | ... | ... |
| HOST I/F | 0 | 0 |
| | 1 | 1,2 |
| | ... | ... |
| DISK I/F | 0 | 0,1 |
| | 1 | 1,2 |
| | ... | ... |
| CACHE MEMORY MEMORY MODULE | 0 | 0,1,2 |
| | 1 | 0,1 |
| | ... | ... |
| ... | ... | ... |

FIG. 64

| | VIRTUAL STORAGE POWER CONSUMPTION | | |
|---|---|---|---|
| | 592A<br>VIRTUAL STORAGE 0 | 592B<br>VIRTUAL STORAGE 1 | ... |
| TOTAL | 273[W] | 263[W] | ... |
| DISK 0 | 3[W] | 0[W] | .... |
| CONTROLLER 0 | 33[W] | 15[W] | .... |
| .... | .... | .... | .... |

593 UPDATE    594 END

POWER ESTIMATING METHOD AND COMPUTER SYSTEM

CROSS REFERENCES TO RELATED APPLICATIONS

This application relates to and claims priority from Japanese Patent Application No. 2008-269921, filed on Oct. 20, 2008, the entire disclosure of which is incorporated herein by reference.

BACKGROUND OF THE INVENTION

1. Technical Field

The present invention relates to a storage system storing data in plural magnetic disk devices.

2. Related Art

A storage system is known in which a sub-system is constructed by a disk array including magnetic disk devices and data is stored in the disk array.

Since the storage system is connected to plural computers, the storage system is often used in an environment such as a data center on which many computers are concentrated.

Power consumption of the data centers or devices disposed in the data centers tends to increase. Particularly, the power consumption of the storage system is great and thus there is a need for power saving control such as shutting down the power supply of disks or carrying out migration of data depending on operating statuses of devices in the storage system. In order to embody the power saving control, it is necessary to accurately obtain the power consumption depending on the operating statuses of devices by detailed constituent units.

Since the storage system is generally connected to plural host computers, the same physical resources in the storage system are shared with the plural host computers. In general, the physical resources in the storage system are logical partitioned and the storage system provides the resultant logical resources to the host computers.

At this time, in order to make the power saving control in the entire system including the host computers and the storage system, it is preferable that the power consumption of the storage system should be obtained every host computer, that is, every logical resource.

To solve the above-mentioned problem, a method of measuring power of operating parts, mapping the measured power onto rated power, I/O command count, and transfer size, and providing the mapping to a manager is known (for example, see JP-A-2007-079754).

As another method, a method of providing a threshold value to the power consumption of a device and controlling a rotation frequency of a disk and an ON/OFF operation of a power source so that the power is smaller than the threshold value is known (for example, JP-A-2008-003719). In the configuration described in JP-A-2008-003719, a control is made using the maximum values of power consumption of components, that is, the rated power.

As another method, a method of simulating a small-sized hard drive used for notebook PCs (simulation for status change such as I/O tracing, seeking, head waiting, and access) to estimate the power consumption is known (for example, "Modeling Hard-Disk Power Consumption", Proceedings of 2nd USENIX Conference on File and Storage Technologies, 2003). A method of estimating power consumption using a ratio of operating times is also disclosed as a simple method in "Modeling Hard-Disk Power Consumption."

SUMMARY OF THE INVENTION

However, in the power measuring method described in JP-A-2007-079754, for example, when the power consumption is intended to know by detailed constituent units such as disks corresponding to logical volumes, it is necessary to use power meters every constituent unit from which the power consumption should be measured. When a logical volume is constituted by combination of plural disks, the constituent units from which the power consumption should be measured vary and thus it is necessary to measure the power consumption by using power meters for detailed constituent units, that is, the disks. When plural logical volumes share a single disk, the power of the respective logical volumes cannot be measured using the above-mentioned method.

The cumulative power consumption described in JP-A-2008-003719 is greatly different from the actual power consumption and thus a control with high precision cannot be made. A method of calculating power consumption by logical partitions when a single hardware resource is shared by plural logical partitions is not described therein.

In the estimation method using the disk status simulation described in the "Modeling Hard-Disk Power Consumption", it is necessary to simulate the detailed statuses of disks, thereby enhancing the amount of calculation. In the estimation method using a ratio of operating times, it is necessary to make a structure for read information on operating times from a storage controller by modifying firmware of a disk so as to read the information from the disk. That is, it is necessary to modify the firmware of disks by disk types. In the "Modeling Hard-Disk Power Consumption", when there is a characteristic (inclination) in types (spatial and temporal locality) of disk accesses, satisfactory precision is not obtained. When a storage system supports plural virtual storages and the same hardware resource is shared by the plural virtual storages, a method of acquiring the power consumption by virtual storages is not disclosed. The "Modeling Hard-Disk Power Consumption" does not also disclose the method of estimating power of the controller.

In the above-mentioned methods, it is not possible to acquire power of the controller and parts of the disk array in the storage system. In the storage system supporting the virtual storages, it is not possible to acquire the power consumption of the respective virtual storages.

The invention is contrived to solve the above-mentioned problems. An advantage of some aspects of the invention is to acquire power consumption of each part and each logical partition in a storage system.

A representative example of the invention is as follows. That is, there is provided a power estimating method in a computer system including a management computer and a storage system connected to the management computer and a host computer. Here, the management computer includes a first interface connected to the storage system, a first processor connected to the first interface, and a first memory connected to the first processor. The host computer includes a second interface connected to the storage system, a second processor connected to the second interface, and a second memory connected to the second processor. The storage system includes at least one third processor controlling read and write of data to and from a plurality of disk drives, a control memory connected to the third processor, a management interface connected to the management computer, a host interface connected to the host computer, a disk interface connected to the disk drives, and a cache memory unit temporarily storing data. The third processor, the management interface, the host interface, the disk interface, and the cache memory unit are connected to each other. The cache memory unit includes a plurality of third memories and a memory controller controlling the plurality of third memories. The control memory stores a storage control program for controlling the storage system and control data used to control the storage system. The storage control program includes a power estimating program for estimating power and the control data includes incremental power consumption information indicating power consumption increments of the disk drives, the cache memory unit, and the third processor when the storage system is operating. The storage system prepares logical storage-volumes in a real area of the plurality of disk drives, logically partitions physical resources of the storage system to generate a plurality of logical partitions including the logical storage-volumes and the logically-partitioned physical resources, and provides the logical partitions to the host computer. The incremental power consumption information includes information on power consumption increments of the disk drives in access directions to the logical storage-volumes. The power estimating method includes the steps of: allowing the third processor to calculate operation rates of the disk drives for access to the logical storage-volumes from operating times of the disk drives for access to the logical storage-volumes; allowing the third processor to calculate power consumption increments of the disk drives for access to the logical storage-volumes by access directions from the incremental power consumption information and the calculated operation rates of the disk drives; and allowing the third processor to transmit the calculated power consumption increments of the disk drive for access to the logical storage-volumes to the management computer.

According to the above-mentioned configuration, it is possible to obtain power consumption of disk parts and the other constituent parts of a storage system, thereby obtaining the power consumption of each logical partition. As a result, it is possible to provide a power control with high precision.

BRIEF DESCRIPTION OF THE DRAWINGS

FIG. 2 is a block diagram illustrating a configuration of cache memory unit according to the first embodiment of the invention.

FIG. 3 is a diagram illustrating an example of an access time record table according to the first embodiment of the invention.

FIG. 6 is a diagram illustrating an example of a disk configuration table according to the first embodiment of the invention.

FIG. 7 is a diagram illustrating an example of a disk power specification table according to the first embodiment of the invention.

FIG. 8 is a diagram illustrating an example of a disk operation record table according to the first embodiment of the invention.

FIG. 9 is a diagram illustrating an example of a tag management table according to the first embodiment of the invention.

FIG. 10 is a diagram illustrating an example of an I/O issuing status table according to the first embodiment of the invention.

FIG. 11 is a diagram illustrating an example of a controller configuration table according to the first embodiment of the invention.

FIG. 12 is a diagram illustrating an example of a controller power specification table according to the first embodiment of the invention.

FIG. 13 is a diagram illustrating an example of a controller power variation specification table according to the first embodiment of the invention.

FIG. 14 is a diagram illustrating an example of a processor operating status table according to the first embodiment of the invention.

FIG. 15 is a diagram illustrating another example of a processor operating status table according to the first embodiment of the invention.

FIG. 22 is a diagram illustrating an example of a method of calculating a disk power increment in S241 and S243 of the power estimating function according to the first embodiment of the invention.

FIG. 23 is a diagram illustrating an example of display data transmitted to a management computer in S244 of the power estimating function according to the first embodiment of the invention.

FIG. 30 is a diagram illustrating an example of an LDEV-physical volume mapping table according to the second embodiment of the invention.

FIG. 31 is a diagram illustrating an example of a disk operation record table according to the second embodiment of the invention.

FIG. 32 is a diagram illustrating an example of a tag management table according to the second embodiment of the invention.

FIG. 33 is a diagram illustrating an example of an I/O issuing status table according to the second embodiment of the invention.

FIG. 34 is a diagram illustrating an example of a processor operating status table according to the second embodiment of the invention.

FIG. 35 is a diagram illustrating another example of a processor operating status table according to the second embodiment of the invention.

FIG. 36 is a diagram illustrating an example of a cache access-amount table according to the second embodiment of the invention.

FIG. 43 is a diagram illustrating an example of display data transmitted to a management computer in S244 of the power estimating function according to the second embodiment of the invention.

FIG. 44 is a diagram illustrating an example of a power consumption history table according to the second embodiment of the invention.

FIG. 46 is a diagram illustrating an example of a virtual storage power consumption output performed by the virtual storage power displaying function according to the second embodiment of the invention.

FIG. 49 is a diagram illustrating an example of a disk power specification table according to the third embodiment of the invention.

FIG. 50 is a diagram illustrating an example of a disk operation record table according to the third embodiment of the invention.

FIG. 51 is a diagram illustrating an example of a disk status table according to the third embodiment of the invention.

FIG. 55 is a diagram illustrating an example of an SSD power specification table according to the fourth embodiment of the invention.

FIG. 56 is a diagram illustrating an example of an SSD operation record table according to the fourth embodiment of the invention.

FIG. 62 is a diagram illustrating an example of a virtual storage-controller resource mapping table according to the fifth embodiment of the invention.

FIG. 64 is a diagram illustrating an example of a virtual storage power consumption displaying picture according to the fifth embodiment of the invention.

DESCRIPTION OF EXEMPLARY EMBODIMENTS

Hereinafter, exemplary embodiments of the invention will be described with reference to the accompanying drawings.

First Embodiment

In a first embodiment of the invention, power consumption of disk and controller parts of a storage system depending on operating statuses is estimated.

First, the summary of the first embodiment will be described in brief.

In the first embodiment, power consumption corresponding to operating statuses is calculated as follows. When the storage system holds information on idle power consumption and power consumption (hereinafter, referred to as power consumption base data) in a status of always processing accesses of I/O types (random or sequential and read or write) by disk types, a controller of the storage system totals a time for waiting for a response from disks by I/O types. The storage system calculates the power consumption corresponding to the operating status from the held power consumption base data and the logged operation information. The storage system records an operating time of a processor and an access time to a cache memory in the controller part and calculates the power consumption from the operating time of the processor and the access time to the cache memory. Hereinafter, the status of always processing an access of any I/O type is also referred to as a fully operating status.

Figure 1:
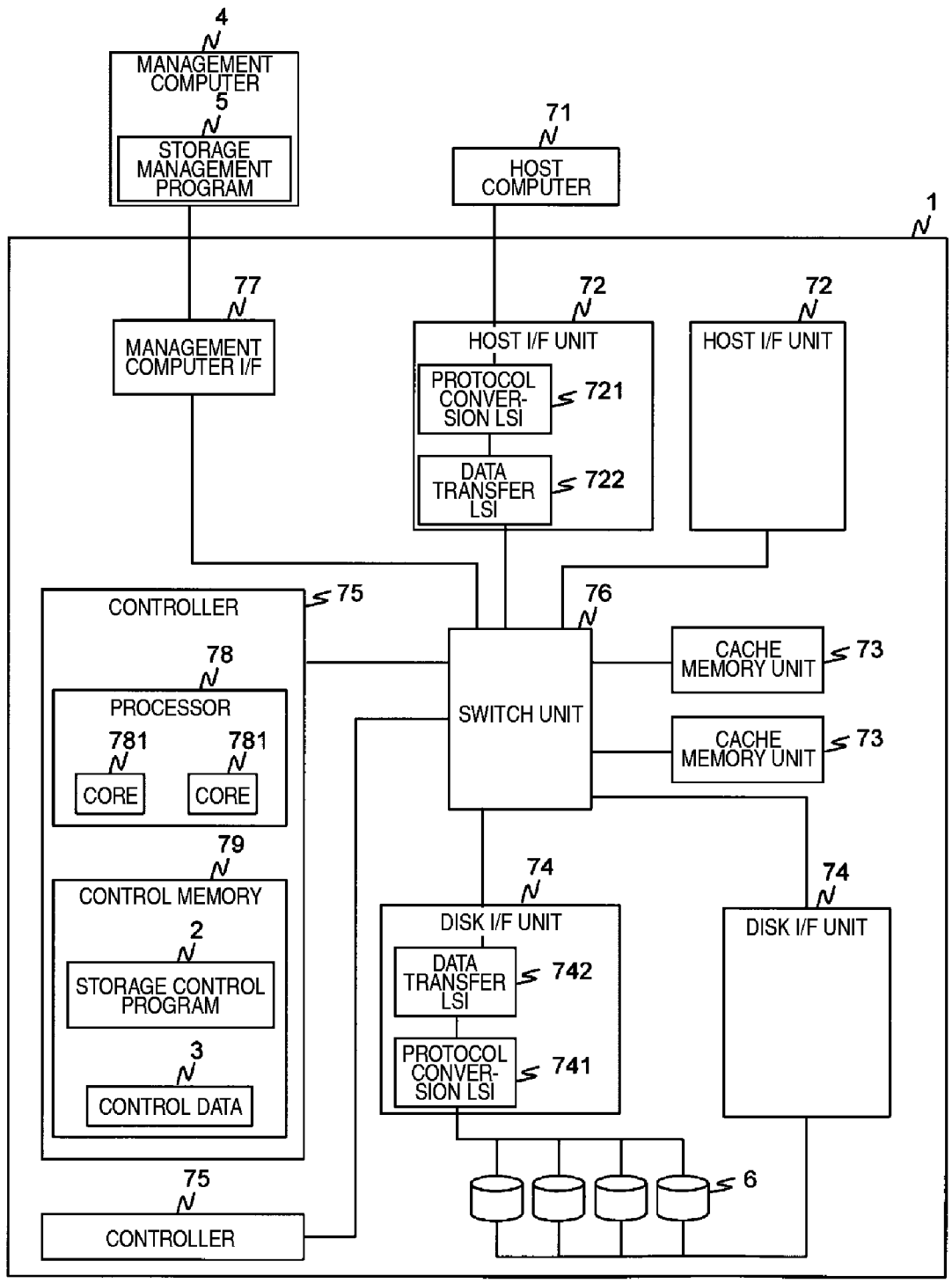
FIG. 1 is a block diagram illustrating a configuration of a computer system according to a first embodiment of the invention.

FIG. 1 is a block diagram illustrating a configuration of a computer system according to the first embodiment of the invention.

The computer system includes a storage system 1, a management computer 4, and a host computer 71. The storage system 1 is connected to the management computer 4 and the host computer 71.

The storage system 1 includes disk drives 6, a host interface (I/F) unit 72, a disk interface (I/F) unit 74, a cache memory unit 73, a controller 75, a management computer interface (I/F) unit 77, and a switching unit 76.

The host I/F unit 72 is an interface for connection to the host computer 71 and the storage system 1 transmits and receives data to and from the host computer 71 through the host I/F unit 72.

The host I/F unit 72 includes a protocol conversion LSI 721 and a data transfer LSI 722.

The protocol conversion LSI 721 converts a protocol of a fibre channel used for connection to the host computer 71 and a protocol of a PCI used in the storage.

The data transfer LSI 722 transmits data between the protocol conversion LSI 721 and the cache memory unit 73 in accordance with a command from the controller 75.

In the example shown in FIG. 1, the number of host I/F units 72 is 2, but the storage system 1 may include two or more host I/F units 72. The protocol conversion LSI 721 may convert a protocol other than the protocol of a fibre channel and the protocol of a PCI.

The cache memory unit 73 stores data for quick access to a part of data stored in the disk drives 6.

The disk I/F unit 74 is an interface for connection to the disk drives 6 in the storage system 1 and the storage system 1 transmits and receives data to and from the disk drives 6 through the disk I/F unit 74.

The disk I/F unit 74 includes a protocol conversion LSI 741 and a data transfer LSI 742.

The protocol conversion LSI 741 converts a protocol of a fibre channel or an SAS (Serial Attached SCSI) used for connection to the disk drives 6 and a protocol used in the storage.

The data transfer LSI 742 transmits data between the disk drives 6 and the cache memory unit 73 in accordance with a command from the controller 75.

The protocol conversion LSI 741 may convert a protocol other than the protocol of a fibre channel, the protocol of an SAS, and the protocol used in the storage.

The controller 75 controls the storage system 1. The controller 75 includes a processor 78 and a control memory 79. The processor 78 includes plural processor cores 781.

The control memory 79 stores a storage control program 2 and control data 3 which is information necessary for storage control. The processor 78 executes the storage control program 2 controlling the storage system 1 to control the storage system 1. For example, the controller 75 controls data transfer in the storage system 1.

The management computer I/F unit 77 is an interface for connection to the management computer 4. The storage system 1 transmits and receives data to and from the management computer 4 through the management computer I/F unit 77.

The switching unit 76 connects the host I/F unit 72, the cache memory unit 73, the disk I/F unit 74, the controller 75, and the management computer I/F unit 77.

The management computer 4 includes a processor (not shown), a nonvolatile storage medium (not shown), and a memory (not shown). The nonvolatile storage medium stores a storage management program 5 for managing the storage system 1. The storage system 1 is managed by the storage management program 5.

The host computer 71 includes a processor (not shown), a nonvolatile storage medium (not shown), and a memory (not shown) and reads data from the disk drives 6 of the storage system 1 or writes data to the disk drives 6.

FIG. 2 is a block diagram illustrating a configuration of the cache memory unit 73 according to the first embodiment of the invention.

The cache memory unit 73 includes a memory control LSI 731 and memory modules (DIMM) 733.

The memory controller LSI 731 converts a protocol of a PCI used in the storage system 1 and an SDRAM access protocol used for access to the memory module 733. The memory controller LSI 731 includes an access time record table 732 having access times to the memory modules 733 recorded therein. The memory controller LSI 731 may convert a protocol other than the protocol of a PCI used in the storage system 1 and the SDRAM access protocol used for access to the memory modules 733.

FIG. 3 is a diagram illustrating an example of the access time record table 732 according to the first embodiment of the invention.

The access time record table 732 includes a channel number 7321 and an access time 7322. The channel number 7321 stores an identifier of a channel which is a data transfer path between the memory modules 733 and the memory controller LSI 731. The access time 7322 stores a value indicating a cumulative time of past access times of the respective channels.

Figure 4:
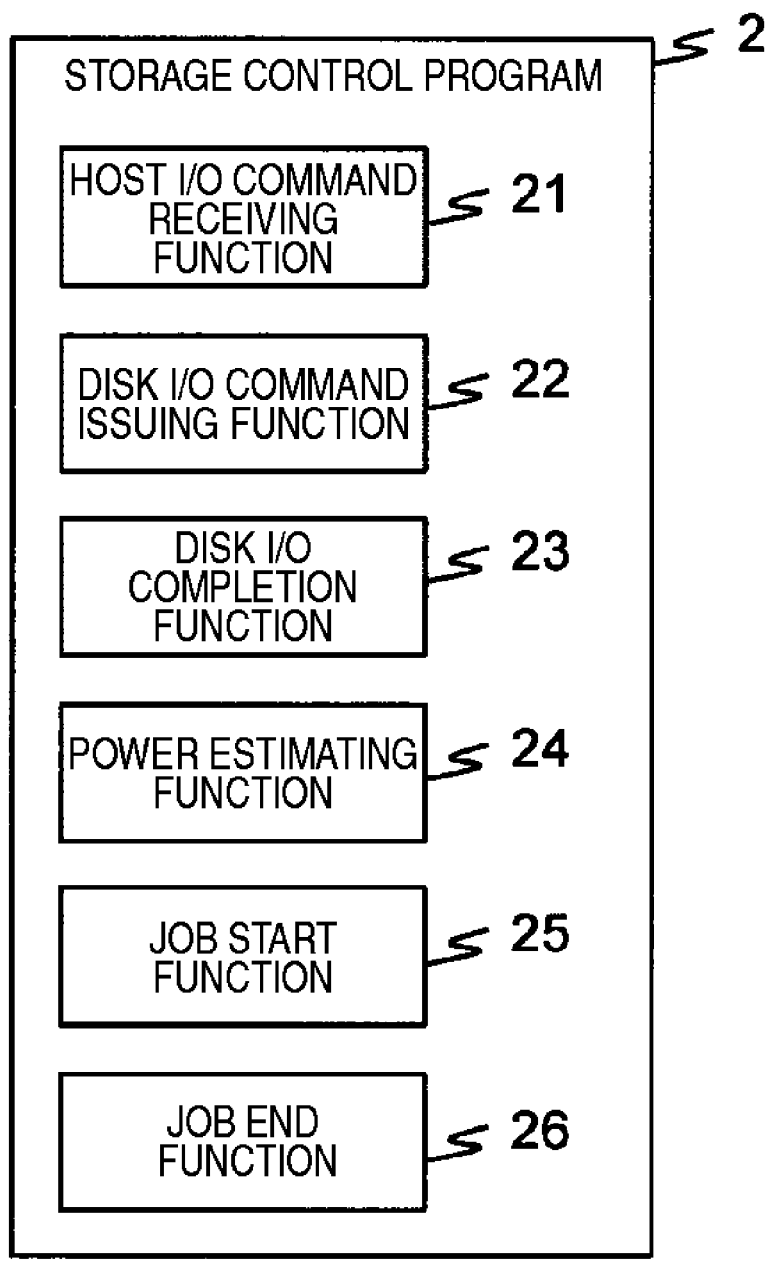
FIG. 4 is a diagram illustrating functions of a storage control program according to the first embodiment of the invention.

FIG. 4 is a block diagram illustrating functions of the storage control program 2 according to the first embodiment of the invention.

The storage control program 2 includes a host I/O command receiving function 21, a disk I/O command issuing function 22, a disk I/O completion function 23, a power estimating function 24, a job start function 25, and a job stop function 26. The details of the functions will be described later with reference to FIGS. 16 to 20.

Figure 5:
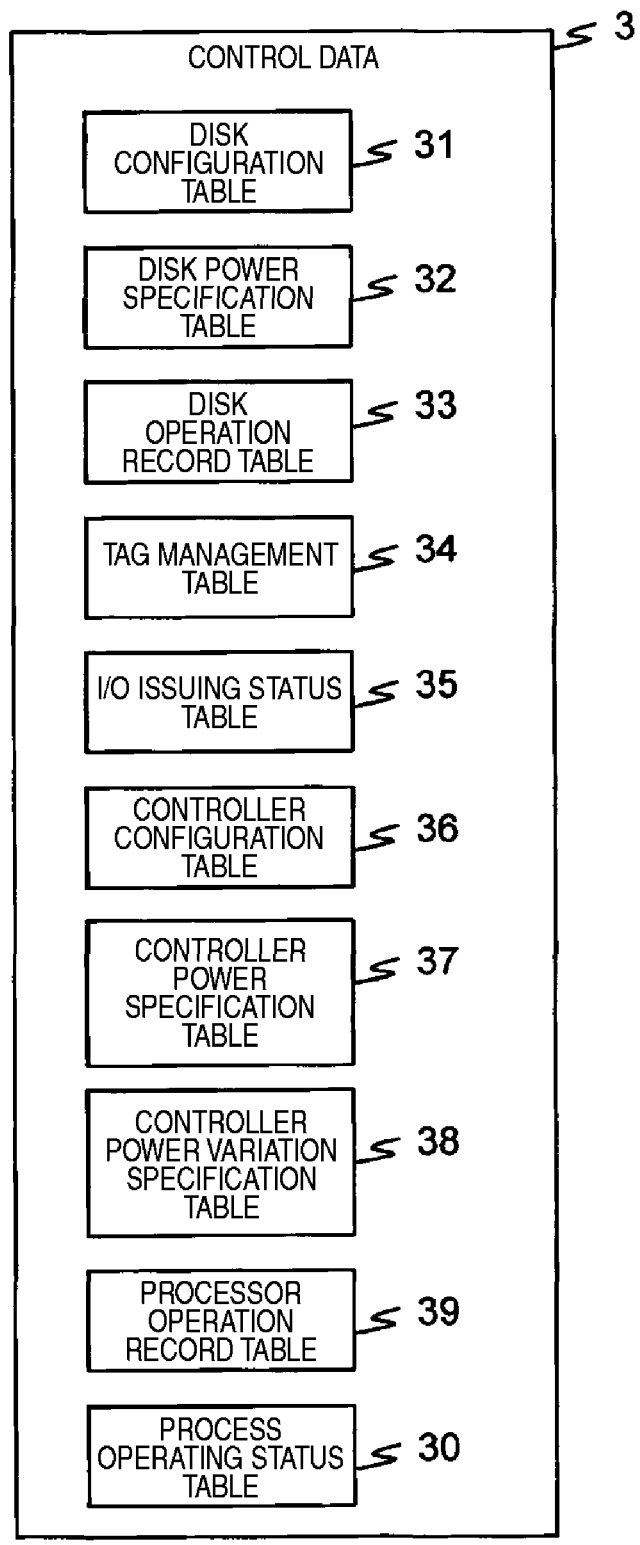
FIG. 5 is a block diagram illustrating a configuration of control data according to the first embodiment of the invention.

FIG. 5 is a block diagram illustrating a configuration of the control data 3 according to the first embodiment of the invention.

The control data 3 includes a disk configuration table 31, a disk power specification table 32, a disk operation record table 33, a tag management table 34, an I/O issuing status table 35, a controller configuration table 36, a controller power specification table 37, a controller power variation specification table 38, a processor operation record table 39, and a processor operating status table 30. The tables are described now.

FIG. 6 is a diagram illustrating an example of the disk configuration table 31 according to the first embodiment of the invention.

The disk configuration table 31 manages types of the disk drives 6 mounted on the storage system 1 and physical positions of the disk drives 6. The disk configuration table 31 is updated at the time of adding or removing a disk drive 6. The power estimating function 24 refers to the disk configuration table 31 at the time of estimating power.

The disk configuration table 31 includes a disk number 311 and a disk type 312.

The disk number 311 stores information indicating the physical positions of the disk drives 6. For example, an identifier identifying a slot number of the storage system 1 is stored in the disk number.

The disk type 312 stores information indicating what type of disk drive 6 is mounted at a position corresponding to the disk number 311. For example, the types of the disk drives 6 are stored therein. The disk type may be any information as long as it can identify the disk drives 6 having different power specifications.

FIG. 7 is a diagram illustrating an example of the disk power specification table 32 according to the first embodiment of the invention.

The disk power specification table 32 manages power consumption in various statuses by types of the disk drives 6 mounted on the storage system 1. The disk power specification table 32 is updated when a new type of disk drive 6 is added. The power estimating function 24 refers to the disk power specification table 32 at the time of estimating power.

The disk power specification table 32 includes a disk type 321, an idle power 322, a random-read power increment 323, a random-write power increment 324, a sequential-read power increment 325, and a sequential-write power increment 326.

The disk type 321 stores an identifier identifying disk types. For example, the types of the disk drives 6 are stored therein. The disk type is the same as the disk type 312 shown in FIG. 6.

The idle power 322 stores the power consumption when the corresponding disk drive 6 is in an idle status. Here, the idle status means a status where a power source is turned on and an access can be accepted but no access is accepted.

The random-read power increment 323 stores a value indicating a difference between the power consumption and the idle power 322 when the corresponding disk drive 6 receives only the random read and is in the fully operating status. Here, the random read means a status where the host computer 71 issues a read access command having no locality to the entire disk drives 6.

The random-write power increment 324 stores a value indicating a difference between the power consumption and the idle power 322 when the corresponding disk drive 6 receives only the random write and is in the fully operating status. Here, the random write means a status where the host computer 71 issues a write access command having no locality to the entire disk drives 6.

The sequential-read power increment 325 stores a value indicating a difference between the power consumption and the idle power when the corresponding disk drive 6 receives only the sequential read and is in the fully operating status. Here, the sequential read means a status where the host computer 71 issues a read access command sequentially to continuous areas of a disk drive.

The sequential-write power increment 326 stores a value indicating a difference between the power consumption and the idle power when the corresponding disk drive 6 receives only a sequential write and is in the fully operating status. Here, the sequential write means a status where the host computer 71 issues a write access command sequentially to continuous areas of a disk drive.

FIG. 8 is a diagram illustrating an example of the disk operation record table 33 according to the first embodiment of the invention.

The disk operation record table 33 manages access times to the disk drives 6. The disk operation record table 33 is updated every access to the disk drives 6. The power estimating function 24 refers to the disk operation record table 33 at the time of estimating power.

The disk operation record table 33 includes a disk number 331, a random read cumulative operating time 332, a random-write cumulative operating time 333, a sequential-read cumulative operating time 334, and a sequential write cumulative operation time 335.

The disk number 331 stores information indicating physical positions of the disk drives 6 and is the same as the disk number 311 shown in FIG. 6.

The random-read cumulative operating time 332 stores a cumulative operating time of times when the random read access is being issued to the disk drive 6 corresponding to the disk number 331.

The random-write cumulative operating time 333 stores a cumulative operating time of times when the random write access is being issued to the disk drive 6 corresponding to the disk number 331.

The sequential-read cumulative operating time 334 stores a cumulative operating time of times when the sequential read access is being issued to the disk drive 6 corresponding to the disk number 331.

The sequential-write cumulative operating time 335 stores a cumulative operating time of times when the sequential write access is being issued to the disk drive 6 corresponding to the disk number 331.

FIG. 9 is a diagram illustrating an example of the tag management table 34 according to the first embodiment of the invention.

The tag management table 34 manages tags as identifiers for identifying accesses issued to the disk drives 6. Accordingly, when accesses are multiply issued to a single disk drive 6, it is possible to identify to what access request a response is.

The tag management table 34 includes a disk number 341, a tag number 342, and an access type 343.

The disk number 341 stores information indicating physical positions of the disk drives 6 and is the same as the disk number 311 shown in FIG. 6.

The tag number 342 stores identifiers for uniquely identifying plural accesses issued to a disk drive 6 at the same time. The tag number 342 is specified when the controller 75 issues an access.

The access type 343 stores information indicating a trigger for access to the disk drive 6. Specifically, types of accesses to the disk drive 6 are stored in the access type.

The tag management table 34 stores only the access type 343 and does not manage from what host computer 71 the access should be. However, the controller 75 includes a table (not shown) where identifiers for identifying I/O of the host computers 71 are mapped onto the tag number 342 and manages the host computers 71 and the type of the access issued from the host computers 71 by the corresponding table.

FIG. 10 is a diagram illustrating an example of the I/O issuing status table 35 according to the first embodiment of the invention.

The I/O issuing status table 35 manages types of accesses issued to the disk drives 6 and times when accesses to the disk drives are issued. The I/O issuing status table 35 is referred to and updated when the disk I/O issuing function 22 issues an access to the disk drives 6 or when the disk I/O completion function 23 processes a response from the disk drives 6.

The I/O issuing status table 35 includes a disk number 351, an access type 352, a outstanding command count 353, and a disk operation start time 354.

The disk number 351 stores information indicating physical positions of the disk drives 6 and is the same as the disk number 311 shown in FIG. 6.

The access type 352 stores information indicating a trigger for access to the disk drives 6 and is the same as the access type 343 shown in FIG. 9.

The outstanding command count 353 stores a value indicating how many accesses corresponding to the access type 352 are currently issued to the disk drive 6 corresponding to the disk number 351.

The disk operation start time 354 stores a value indicating when the access corresponding to the access type 352 is issued to the disk drive 6 corresponding to the disk number 351. Specifically, the internal time of the storage system 1 counted after the storage system 1 starts its operation is stored therein.

FIG. 11 is a diagram illustrating an example of the controller configuration table 36 according to the first embodiment of the invention.

The controller configuration table 36 manages specific kinds of constituent units such as the cache memory unit 73 and the controller 75 in the storage system 1 and physical positions of the constituent units. The controller configuration table 36 is updated at the time of adding or removing a component. The power estimating function 24 refers to the controller configuration table 36 at the time of estimating power.

The controller configuration table 36 includes a type 361, a slot number 362, and a component name 363.

The type 361 stores types of the constituent units of the storage system 1 such as the controller 75 and the cache memory unit 73. The slot number 362 stores numbers of slots used to add components of the constituent units. The number of slots is provided in advance to the storage system 1.

The component name 363 stores information indicating specific types of the components of the constituent units mounted on the slot. When no component is mounted on the slot corresponding to the slot number 362, "none" is stored therein. However, different information may be stored as the information indicating that no component is mounted.

By including the controller configuration table 36, it is possible to know a specific configuration of the storage system 1.

FIG. 12 is a diagram illustrating an example of the controller power specification table 37 according to the first embodiment of the invention.

The controller power specification table 37 manages information on the power consumption when the components mounted on the storage system 1 are in the normal status (idle status). The controller power specification table 37 is updated at the time of adding a new type of component. The power estimating function 24 refers to the controller power specification table 37 at the time of estimating power.

The controller power specification table 37 includes a type 371, a component name 372, and an idle power 373.

The type 371 stores types of the constituent units of the storage system 1 such as the controller 75 and the cache memory unit 73. The type 371 is the same as the type 361 shown in FIG. 11.

The component name 372 stores information for identifying components having different power specifications, such as types of the components used to distinguish components having different performance and capacity from each other. The component name 372 is the same as the component name 363 shown in FIG. 11.

The idle power 373 stores the power consumption of an electrified component not operating (idle).

FIG. 13 is a diagram illustrating an example of the controller power variation specification table 38 according to the first embodiment of the invention.

The controller power variation specification table 38 manages power variations in operating statuses of the constituent units of the storage system 1.

The controller power variation specification table 38 includes a type 381, a component name 382, and a power increment 383.

The type 381 stores types of the constituent units of the storage system 1 such as the controller 75 and the cache memory unit 73. The type 381 is the same as the type 361 shown in FIG. 11.

The component name 382 stores information for identifying components having different power specifications, such as types of the components used to distinguish components having different performance and capacity from each other. The component name 382 is the same as the component name 363 shown in FIG. 11.

The power increment 383 stores a power consumption increment when the corresponding component operates in maximum.

The controller power variation specification table 38 may store information on only the constituent unit of the storage system 1 varying in power consumption or may store information on all the constituent units of the storage system 1. When the information on the all the constituent units of the storage system 1 is stored, "0" is stored in the power increment 383 of the component not varying in power consumption.

FIG. 14 is a diagram illustrating an example of the processor operation record table 39 according to the first embodiment of the invention.

The processor operation record table 39 manages an operating time of the processor 78 of the controller 75. The processor operation record table 39 is updated when a job, that is, the I/O processing function such as the host I/O processing function or the disk I/O processing function of the storage control program 2, is performed by a scheduler operating on the processor 78. The power estimating function 24 refers to the processor operation record table 39 at the time of estimating power.

The processor operation record table 39 includes a controller number 391, a processor core number 392, and a cumulative operating time 393.

The controller number 391 stores identifiers for identifying plural controllers 75 in the storage system 1.

The processor core number 392 stores identifiers for identifying plural processor cores 781 in the processor 78 of the controller 75.

The cumulative operating time 393 stores a cumulative time of times when a job is executed on the processor core 781 corresponding to the processor core number 392.

FIG. 15 is a diagram illustrating an example of the processor operating status table 30 according to the first embodiment of the invention.

The processor operating status table 30 manages whether a job of the storage control program 2 is executed and the time when the job of the storage control program 2 is started.

The processor operating status table 30 includes a controller number 301, a processor core number 302, and a job start time 303.

The controller number 301 stores identifiers for identifying plural controllers 75 in the storage system 1. The controller number 301 is the same as the controller number 391 shown in FIG. 14.

The processor core number 302 stores identifiers for identifying plural processor cores 781 in the processor 78 of the controller 75 and is the same as the processor core number 392 shown in FIG. 14.

The job start time 303 stores whether a job of the storage control program 2 is currently executed and the time when the job of the storage control program 2 is started. Specifically, when the job of the storage control program 2 is not executed, none is stored in the job start time 303. When the job of the storage control program 2 is executed, the time when the job of the storage control program 2 is started is stored in the job start time 303. The stored time is an internal time of the storage system 1.

The tables of the control data 3 are described hitherto. The functions of the storage control program 2 will be described now.

Figure 16:
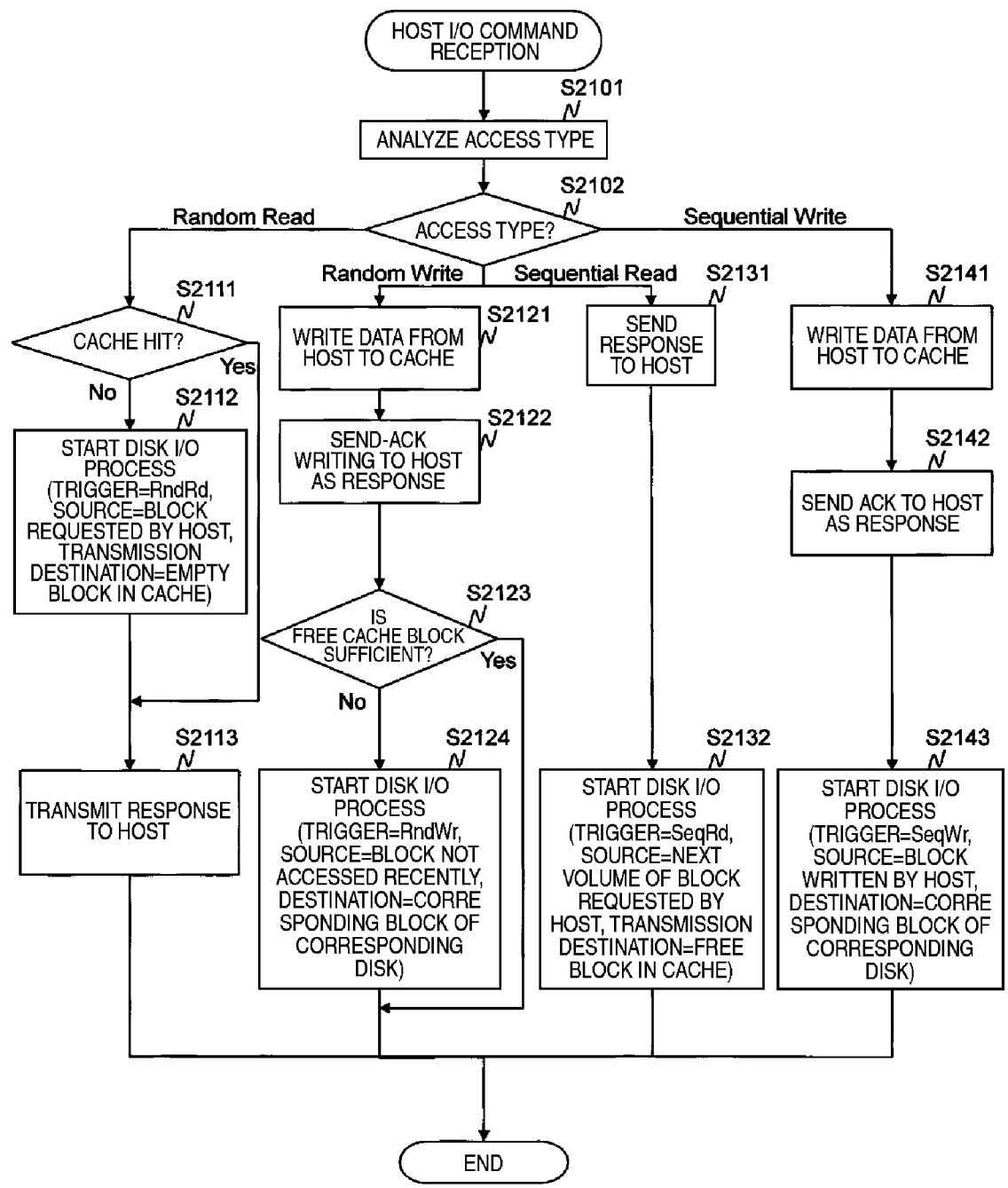
FIG. 16 is a flowchart illustrating an example of a host I/O command receiving function according to the first embodiment of the invention.

FIG. 16 is a flowchart illustrating an example of the host I/O command receiving function 21 according to the first embodiment of the invention.

The host I/O command receiving function 21 is called when receiving a read request command or a write request command from the host computer 71 and serves to determine the type of the received command and to perform a process corresponding to the determined type of the received command.

First, the host I/O command receiving function 21 analyzes the access type of an access request from the host computer 71 (S2101). Specifically, the access type is one of random read, random write, sequential read, and sequential write.

The host I/O command receiving function 21 determines what type of the analyzed command corresponds to (S2102).

When it is determined that the access type is "random read", the host I/O command receiving function 21 determines whether the requested data is stored in the cache memory unit 73 (S2111).

When it is determined that the requested data is not stored, the host I/O command receiving function 21 starts the disk I/O command issuing function 22 (S2112). At this time, the host I/O command receiving function 21 gives the trigger for issuing a disk access to the disk I/O command issuing function 22 as a parameter so as to total the access time. Specifically, the host I/O command receiving function 21 gives the random read as a trigger, an address in a disk where data requested from the host exists as a transfer source of an access, and an empty area in the cache memory unit 73 as a transfer destination to the disk I/O command issuing function 22 as parameters to start the disk I/O command issuing function 22 and performs the process of S2113.

When it is determined in S2111 that the requested data is not stored, the host I/O command receiving function 21 performs the process of S2113.

The host I/O command receiving function 21 transmits the requested data as a response to the host computer 71 (S2113) and ends the process.

When it is determined in S2102 that the access type is the random write, the host I/O command receiving function 21 writes data sent from the host computer 71 to the cache memory unit 73 (S2121).

Then, the host I/O command receiving function 21 transmits a response of write completion to the host computer 71 (S2122).

The host I/O command receiving function 21 determines whether the empty area in the cache memory unit 73 is sufficient (S2123).

When it is determined that the empty area of the cache memory unit 73 is sufficient, the host I/O command receiving function 21 ends the process.

When it is determined that the empty area of the cache memory unit 73 is not sufficient, the host I/O command receiving function 21 writes the data stored in the cache memory unit 73 to the disk 6 so as to receive the write data from the host computer 71. Specifically, the host I/O command receiving function 21 gives the random write as an access trigger, an area not accessed lately in the cache memory unit 73 as a transfer source, and an address in a disk drive 6 corresponding to the area not accessed as a transfer destination to the disk I/O command issuing function 22 as parameters to start the disk I/O command issuing function 22 (S2124) and ends the process.

When it is determined in S2102 that the access type is the sequential read, the host I/O command receiving function 21 predicts the access from the host computer 71 and reads the requested data to the cache memory unit 73, and thus transmits the read data to the host computer 71 as a response (S2131).

Since it predicts that the host computer 71 accesses a next area, the host I/O command receiving function 21 reads data of the next area to the cache memory unit 73. Specifically, the host I/O command receiving function 21 gives the sequential read as the access trigger, a next area of the area requested by the host computer 71 as a transfer source, and an empty area in the cache memory unit 73 as a transfer destination to the disk I/O command issuing function 22 as parameters to start the disk I/O command issuing function 22 (S2132) and ends the process.

When it is determined in S2102 that the access type is the sequential write, the host I/O command receiving function 21 writes the data sent from the host computer 71 to the cache memory unit 73 (S2141).

The host I/O command receiving function 21 then transmits a response of write completion to the host computer 71 (S2142).

The sequential write has small possibility of write data to the same area again. Accordingly, even when the written data is held in the cache memory unit 73, the effective performance gain is not expected. As a result, the host I/O command receiving function 21 evacuates the data written from the host computer 71 to the disk drives 6. Specifically, the host I/O command receiving function 21 gives the sequential write as the access trigger, an area to which data is written from the host computer as a transfer source, and an address in the corresponding disk drive 6 as a transfer destination to the disk I/O command issuing function 22 as parameters to start the disk I/O command issuing function 22 (S2143) and ends the process.

Figure 17:
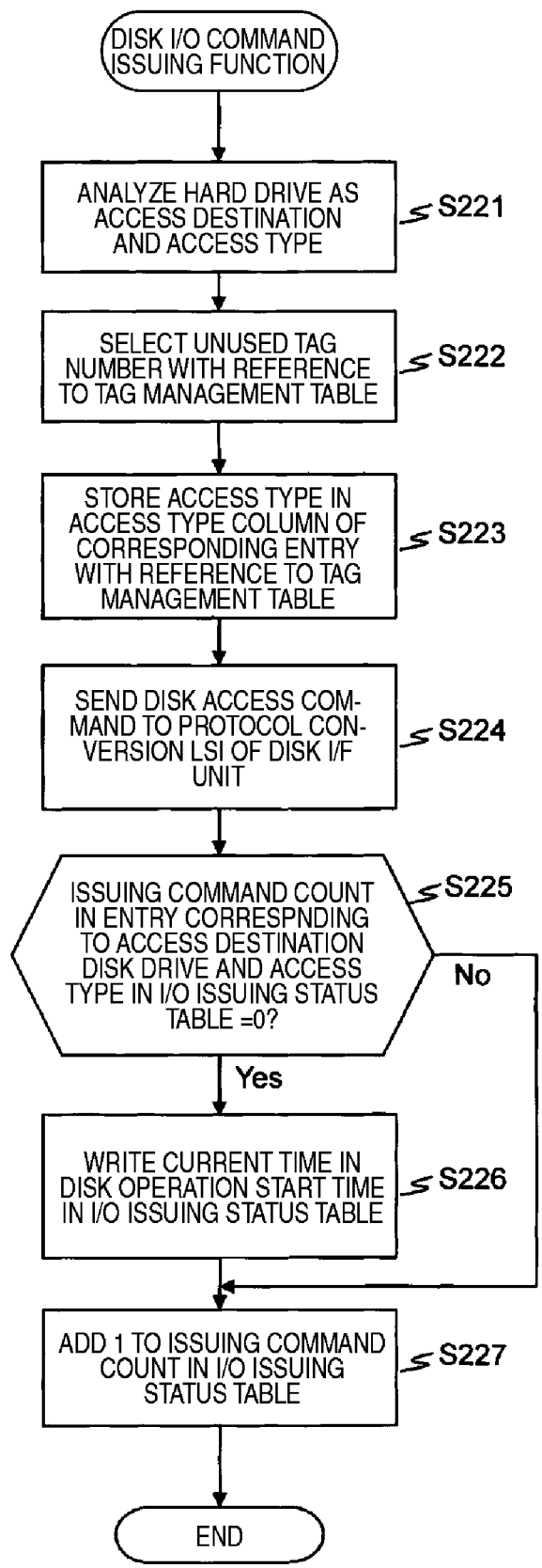
FIG. 17 is a flowchart illustrating an example of a disk I/O command issuing function according to the first embodiment of the invention.

FIG. 17 is a flowchart illustrating an example of the disk I/O command issuing function 22 according to the first embodiment of the invention.

The disk I/O command issuing function 22 is a function of issuing an access to the disk drives 6 and is started in response to a request from the host I/O command receiving function 21.

First, the disk I/O command issuing function 22 analyzes the parameters sent from the host I/O command receiving function 21 as a calling source and extracts the disk drive 6 as an access destination and the access type (S221).

The disk I/O command issuing function 22 selects the tag number 342 not used, that is, the tag number 342 to which the access type 343 corresponding to the tag number 342 is not written, with reference to the tag management table 34 (S222).

The disk I/O command issuing function 22 stores the extracted access type in the access type 343 of the entry corresponding to the selected tag number 342 (S223).

The disk I/O command issuing function 22 transmits a disk access command to the protocol conversion LSI 741 of the disk I/F unit 74 (S224).

Then, the disk I/O command issuing function 22 determines whether the disk drive 6 as the extracted access destination and the outstanding command count 353 of the entry corresponding to the access type are "0" with reference to the I/O issuing status table 35 (S225).

When it is determined that the outstanding command count 353 of the corresponding entry is "0", it means that the disk drive 6 as the access destination does not operate and the disk drive 6 as the access destination is started from now on. Accordingly, the disk I/O command issuing function 22 stores the current time in the disk operation start time 354 of the corresponding entry (S226) and then performs the process of S227.

When it is determined in S225 that the outstanding command count 353 of the corresponding entry is not "0", it means that the same type of access is issued to the same disk drive 6, that is, the disk drive 6 as the access destination is in an operating status. Accordingly, the disk I/O command issuing function 22 performs the process of S227.

The disk I/O command issuing function 22 adds "1" to the outstanding command count 353 of the corresponding entry in the I/O issuing status table 35 (S227) and ends the process.

Figure 18:
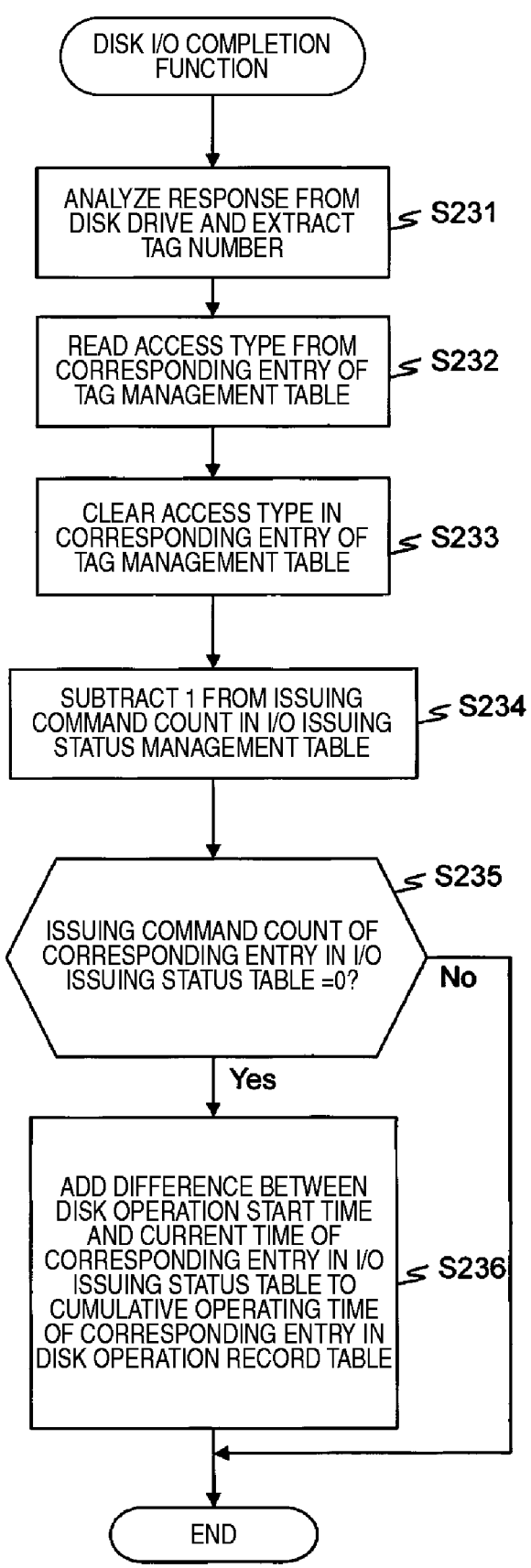
FIG. 18 is a flowchart illustrating an example of a disk I/O completion function according to the first embodiment of the invention.

FIG. 18 is a flowchart illustrating an example of the disk I/O ending function 23 according to the first embodiment of the invention.

The disk I/O ending function 23 is a function called when the disk I/O command issuing function 22 receives the response to the disk access command issued by the disk I/O command issuing function 22 from the disk drive 6 and manages the access time.

First, the disk I/O completion function 23 analyzes the response received from the disk drive 6 and extracts the tag number 342 (S231).

The disk I/O completion function 23 reads the access type 343 of the entry corresponding to the extracted tag number 342 with reference to the tag management table 34 (S232).

The disk I/O completion function 23 erases the access type 343 of the entry in the tag management table 34 (S233).

Then, the disk I/O completion function 23 subtracts "1" from the outstanding command count 353 of the corresponding entry in the I/O issuing status table 35 (S234).

The disk I/O completion function 23 determines whether the outstanding command count 353 of the corresponding entry in the I/O issuing status table 35 is "0" (S235).

When it is determined that the outstanding command count 353 of the corresponding entry is "0", it means that no access corresponding to the access type is issued, that is, the access to the disk drive 6 is completed, and the disk I/O completion function 23 records the access time as operation information. That is, the disk I/O completion function 23 calculates a difference between the disk operation start time 354 of the corresponding entry in the I/O issuing status table 35 and the current time, adds the calculated difference to the cumulative operating times 332 to 335 corresponding to the access type (S236), and then ends the process.

When it is determined in S235 that the outstanding command count 353 of the corresponding entry is not "0", it means that a different access of the same access type is performed, and thus the disk I/O completion function 23 ends the process.

Figure 19:
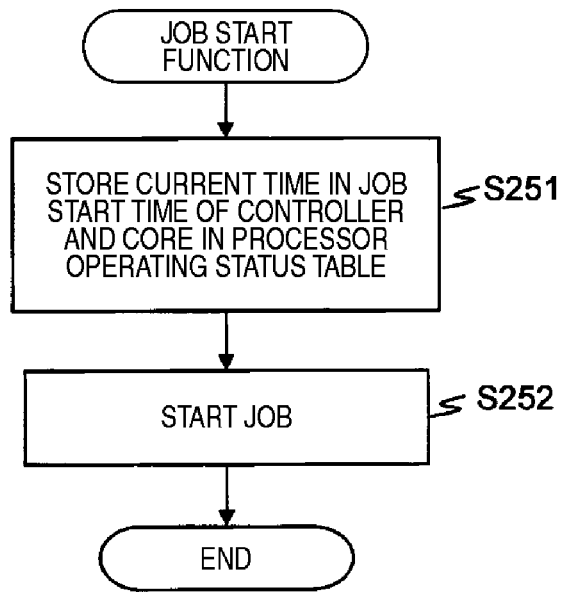
FIG. 19 is a flowchart illustrating an example of a job start function according to the first embodiment of the invention.

FIG. 19 is a flowchart illustrating an example of the job starting function 25 according to the first embodiment of the invention.

The job start function 25 is called by the processor core 781 performing a process requested in the received command or response to call a function (job) corresponding to the process, when receiving the command from the host computer 71 or the response from the disk drive 6.

First, the job starting function 25 checks the entries corresponding to the controller number 301 for identifying the controller 75 including the processor core 781 performing the requested process and the processor core number 302 for identifying the processor core 781 with reference to the processor operating status table 30. The job starting function 25 writes the current time in the job start time 303 of the corresponding entry (S251). Thereafter, the job starting function 25 starts the job corresponding to the requested process (S252) and ends the process.

Figure 20:
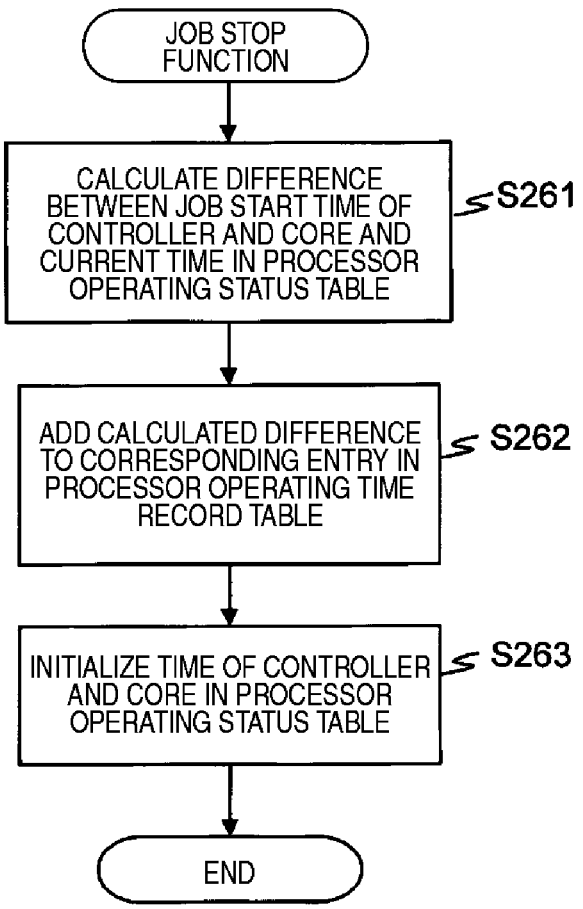
FIG. 20 is a flowchart illustrating an example of a job stop function according to the first embodiment of the invention.

FIG. 20 is a flowchart illustrating an example of the job stop function 26 according to the first embodiment of the invention.

The job stop function 26 is called by the processor core 781 having ending the above-mentioned job and serves to total the process time.

First, the job stop function 26 reads the entries corresponding to the controller number 301 for identifying the controller 75 including the processor core 781 performing the requested process and the processor core number 302 for identifying the processor core 781 with reference to the processor operating status table 30. The job stop function 26 calculates a difference between the job start time 303 and the current time with reference to the job start time 303 of the entry corresponding to the read information (S261).

The job stop function 26 adds the calculated difference to the cumulative operating time 393 of the corresponding entry in the processor operation record table 39 (S262).

The job stop function 26 erases the value of the job start time 303 of the corresponding entry in the processor operating status table 30 (S263) and ends the process.

Figure 21:
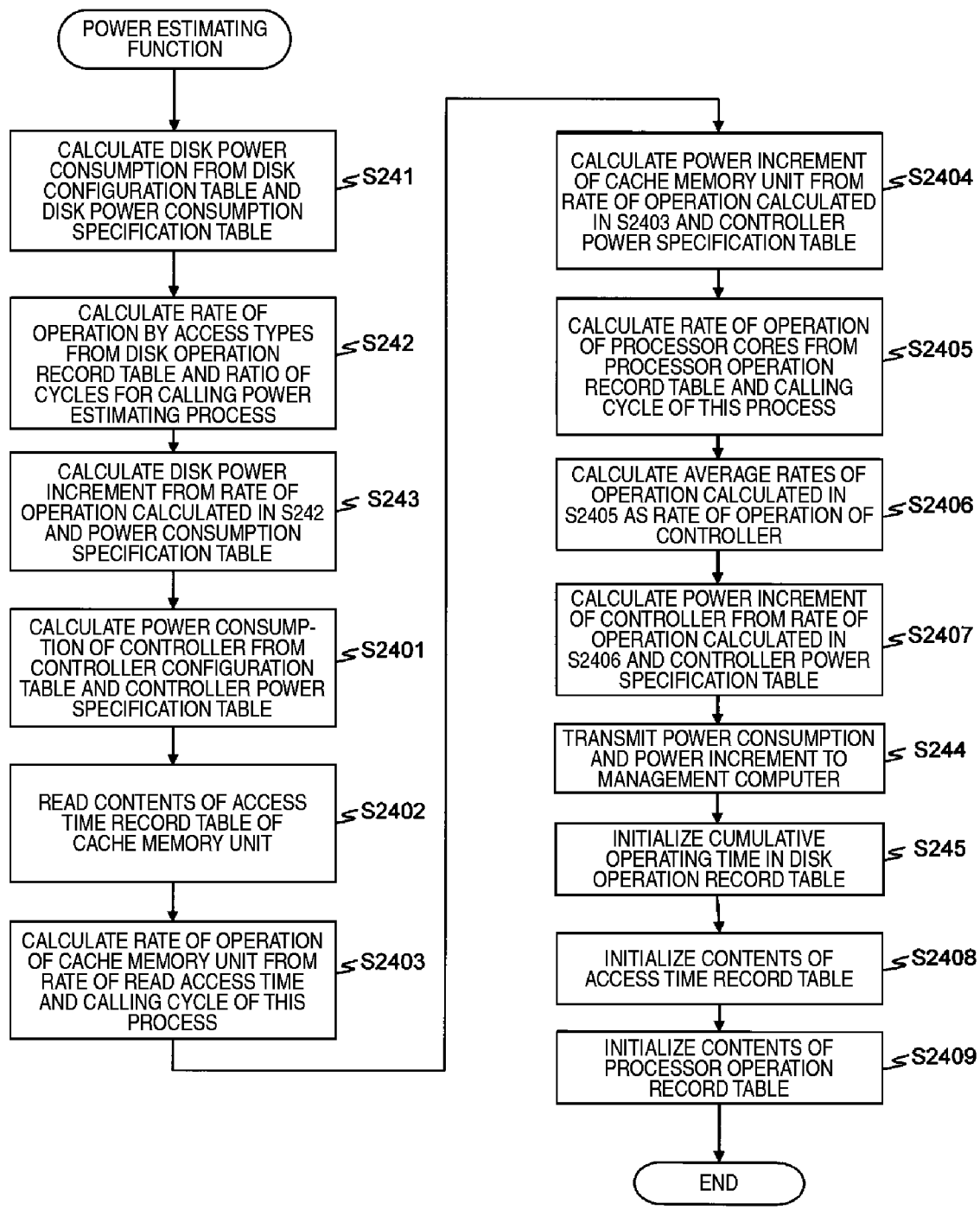
FIG. 21 is a flowchart illustrating an example of a power estimating function according to the first embodiment of the invention.

FIG. 21 is a flowchart illustrating an example of the power estimating function 24 according to the first embodiment of the invention.

The power estimating function 24 calculates operation rates of the disk drives 6, the controller 75, and the cache memory unit 73, estimates the power consumption from the information of the tables and the calculated operation rates, and transmits information on the estimated power consumption to the management computer 4. The power estimating function 24 is called with a predetermined interval.

First, the power estimating function 24 calculates disk power consumption from the disk configuration table 31 and the disk power specification table 32 (S241). Specifically, the power estimating function 24 uses the idle power 322 of the entry corresponding to the disk type 312 in the disk power specification table 32 as the disk power consumption with reference to the disk type 312 of the entry in the disk configuration table 31.

Then, the power estimating function 24 calculates the operation rates of the disk drives 6 by access types using the information in the disk operation record table 33 and the calling interval of this process (S242). Specifically, the operation rate is calculated using the cumulative operating times 332 to 335 by access types and the calling interval of this process. For example, when the calling interval of this process is "1 second" and the random-read cumulative operating time 332 in the disk operation record table 33 is "1 millisecond", the operation rate in the random read is "1/1000."

Then, the power estimating function 24 calculates the power increments of the disk drives 6 from the calculated operation rates and the information in the disk power specification table 32 (S243). For example, when the operation rate in the random read is "1/10" and the power increment 323 in the random read is "4.9 W", the power increment is "0.49 W." The calculation expression will be described later with reference to FIG. 22.

The power estimating function 24 calculates the power consumption of the controller from the controller configuration table 36 and the controller power specification table 37 (S2401). Specifically, the power consumption by types 361 is calculated. For example, as shown in FIGS. 11 and 12, when slot 0 and slot 1 of the controller 75 are mounted with "C-1" and "C-2", the idle power 373 of the "C-1" is "85 W", the idle power 373 of the "C-2" is "65 W", and none is mounted on the other slots, the power consumption of the controller 75 in the storage system 1 is calculated as "85+65=150 W." The calculated value is used as the power consumption of the controller 75. The power consumption of the other constituent units is calculated using the same method.

The power estimating function 24 reads the contents of the access time record table 732 for the cache memory unit 73 (S2402).

Then, the power estimating function 24 calculates the operation rate of the cache memory unit 73 using the read access time 7322 and the calling interval of this process (S2403). For example, when the calling interval of this process is "1 second" and the read access time 7322 is "10 millisecond", the operation rate of the cache memory unit 73 is "1/100."

The power estimating function 24 calculates the power consumption increment of the cache memory unit 73 from the calculated rate of the operation of the cache memory unit 73 and the contents of the controller power variation specification table 38 (S2404). For example, as shown in FIG. 12, when the operation rate of the cache memory unit 73 is "1/10", the component name 382 is "M-2", and the power increment 383 is "5.3 W", the power increment of the corresponding memory module 733 is calculated as "1/10×5.3=0.53 W."

Then, the power estimating function 24 calculates the operation rates of the processor cores 781 using a ratio of the processor operation record table 39 and the calling interval of this process (S2405). The calculation method is the same as performed in S242.

The power estimating function 24 calculates the operation rate of the controller 75 from the calculated operation rates of the processor cores 781 (S2406). Specifically, an average of the operation rates of the processor cores 781 in the controller 75 is calculated and the calculated average operation rate of the processor cores 781 is set as the operation rate of the controller 75. For example, when the controller 75 have four processor cores 781 and the operation rates thereof are "20%", "40%", "60%", and "80%", the operation rate of the controller 75 is "50%."

The power estimating function 24 calculates the power increment of the controller 75 from the calculated operation rate of the controller 75 and the contents of the controller power variation specification table 38 (S2407). For example, when the power increment 383 in the controller power variation specification table 38 is "42 W" and the operation rate is "50%", the power increment of the controller 75 is "42 W×0.5=21 W."

The power estimating function 24 transmits the calculated power consumption and the calculated power increments of the constituent units to the management computer 4 (S244).

The power estimating function 24 initializes the cumulative operating times 332 to 335 in the disk operation record table 33 (S245).

Then, the power estimating function 24 initializes the access time 7322 in the access time record table 732 of the cache memory unit 73 (S2408).

The power estimating function 24 initializes the cumulative operating time 393 in the processor operation record table 39 (S2409) and ends the process.

Although the power consumption has been calculated above, energy consumption may be calculated. Specifically, the energy consumption can be calculated by multiplying the operating time by the calculated power consumption. The calculated energy consumption may be transmitted to the management computer 4.

FIG. 22 is a diagram illustrating an example of the method of allowing the power estimating function 24 to calculate a disk power increment in S241 and S243 according to the first embodiment of the invention.

A calculated value 1001 is information indicating the power calculated in the processes shown in FIG. 21. Specifically, the calculated value stores P_Static, P_RndRd, P_RadWr, P_SeqRd, P_SeqWr, and P_Dynamic.

The P_Static is the normal power consumption of a disk type 312. The P_RndRd is the power increment in the random read access in a disk type 312. The P_RndWr is the power increment in the random write access in a disk type 312. The P_SeqRd is the power increment in the sequential read access in a disk type 312. The P_SeqWr is the power increment in the sequential write access in a disk type 312. The P_Dynamic is the power increment in the entire accesses in a disk type 3012.

The calculation expression 1002 indicates a specific calculation expression of the calculated value 1001. The calculation expression 1002 of the calculated values 1001 will be described now.

The P_Static is calculated by the following expression.

$$P\_Static = P\_idle \quad \text{Expression 1}$$

Here, P_idle is the idle power consumption.

The P_RndRd is calculated by the following expression.

$$P\_RndRd = AR\_RndRd \times p\_RndRd \quad \text{Expression 2}$$

Here, AR_RndRd is the operation rate of the random read access and p_RndRd is the power increment 323 of the random read access.

The P_RndWr is calculated by the following expression.

$$P\_RndWr = AR\_RndWr \times p\_RndWr \quad \text{Expression 3}$$

Here, AR_RndWr is the operation rate of the random write access and p_RndWr is the power increment 324 of the random write access.

The P_SeqRd is calculated by the following expression.

$$P\_SeqRd = AR\_SeqRd \times p\_SeqRd \quad \text{Expression 4}$$

Here, AR_SeqRd is the operation rate of the sequential read access and p_SeqRd is the power increment 325 of the sequential read access.

The P_SeqWr is calculated by the following expression.

$$P\_SeqWr = AR\_SeqWr \times p\_SeqWr \quad \text{Expression 5}$$

Here, AR_SeqWr is the operation rate of the sequential write access and p_SeqWr is the power increment 326 of the sequential write access.

The P_Dynamic is calculated by the following expression $$P\_Dynamic = P\_RndRd + P\_RndWr + P\_SeqRd + P\_SeqWr \quad \text{Expression 6}$$

The power increments of the disk parts are calculated by the use of the above-mentioned expressions.

FIG. 23 is a diagram illustrating an example of display data 990 transmitted to the management computer 4 in S244 of the process performed by the power estimating function 24 according to the first embodiment of the invention.

The display data 990 includes a part 991, an average power consumption 992, a power increment 993, and an idle power 994.

The part 991 stores information indicating the constituent units or components of the storage system 1. For example, information on the type 361 and the component name 363 is stored therein. The information is not fully as long as it can identify the constituent units or components.

The average power consumption 992 stores information indicating the average power consumption of the part 991. Here, the average power consumption is a value indicating the total value of the calculated power increment and the idle power 994.

The power increment 993 stores information indicating the power increment of the disk drives 6 or the controller. When the part 991 stores the information indicating the disk drive 6, information on the power increments by access types is stored therein. When the part 991 stores the information indicating the controller, information on the power increment of the controller is stored therein.

The idle power 994 stores information indicating the power when the constituent units or components of the storage system 1 are not performing any process.

Figures 24, 25:
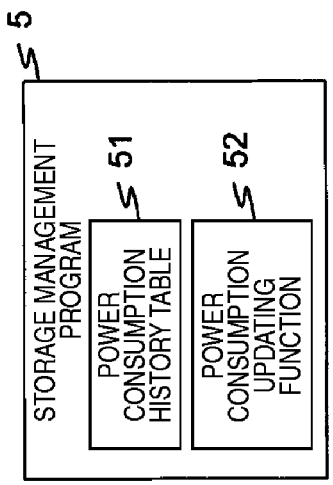
FIG. 24 is a block diagram illustrating functions and tables of a storage management program according to the first embodiment of the invention.
FIG. 25 is a diagram illustrating an example of a power consumption history table according to the first embodiment of the invention.

FIG. 24 is a block diagram illustrating functions and tables of the storage management program 5 according to the first embodiment of the invention.

The storage management program 5 includes a power consumption history table 51 and a power consumption updating function 52.

The power consumption history table 51 manages power data sent from the storage system 1. The power consumption updating function 52 updates the power consumption history table 51 on the basis of the power data sent from the storage system 1.

FIG. 25 is a diagram illustrating the power consumption history table 51 according to the first embodiment of the invention.

The power consumption history table 51 is included in the storage management program 5 of the management computer 4 and is used to manage the power data sent from the storage system 1 and to display the contents thereof in response to a management computer user's request.

The power consumption history table 51 includes a date and time 511, a part 512, an average power consumption 513, a power increment 514, and an idle power 515.

The date and time 511 stores information indicating when the data is stored. The part 512, the average power consumption 513, the power increment 514, and the idle power 515 are the same as the part 991, the average power consumption 992, the power increment 993, and the idle power 994 shown in FIG. 22.

As described above, according to the first embodiment of the invention, it is possible to calculate accurate values of the power consumption by exchanging the operation information with all the constituent units, that is, the disk drives and the controller, in the storage system 1. The manager can know the information on the calculated power consumption. As a result, it is possible to control the power with higher precision.

Second Embodiment

In a second embodiment of the invention, the power consumption of virtual storages is estimated when the storage system 1 can be treated as plural virtual storages (LPAR).

The configuration of the computer system according to the second embodiment of the invention is the same as the first embodiment and thus its description is omitted.

In the second embodiment, the physical resources of the storage system 1 are divided and virtual storages are constituted from the divided physical resources. Each virtual storage is recognized as one storage system 1 by the host computer 71. The disk drives 6 are partitioned into logical volumes. The tables store information every logical volume. The power estimating function 24 calculates the estimated power consumption every logical volume and estimates the power consumption of the respective virtual storage on the basis of the calculated estimated power consumption.

Figures 26, 27:
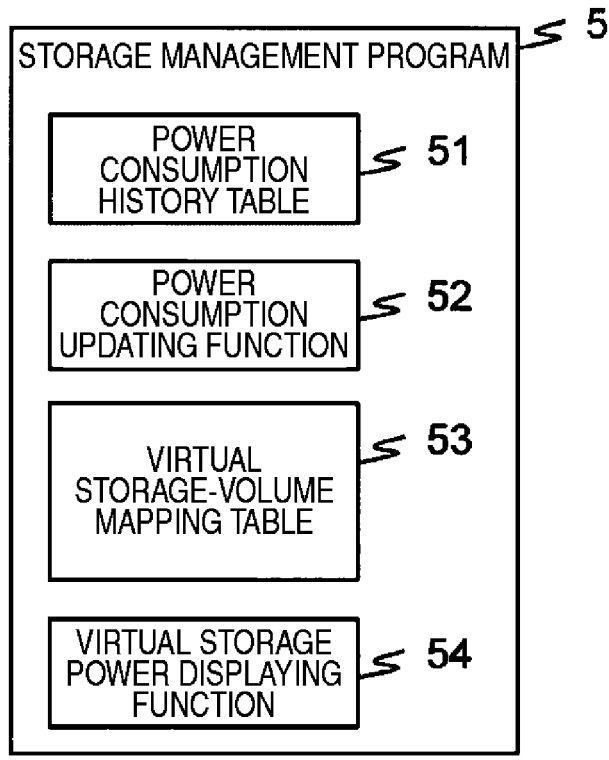
FIG. 26 is a block diagram illustrating functions and tables of a storage management program according to a second embodiment of the invention.
FIG. 27 is a diagram illustrating an example of a virtual storage-volume mapping table according to the second embodiment of the invention.

FIG. 26 is a block diagram illustrating functions and tables of the storage management program 5 according to the second embodiment of the invention.

In the second embodiment, the storage management program 5 additionally includes a virtual storage-volume mapping table 53 and a virtual storage power displaying function 54.

The virtual storage-volume mapping table 53 manages the mapping between the virtual storages and the logical volumes. The virtual storage power displaying function 54 displays the power estimation result by virtual storages.

FIG. 27 is a diagram illustrating an example of the virtual storage-volume mapping table 53 according to the second embodiment of the invention.

The virtual storage-volume mapping table 53 manages a virtual storage (LPAR) number 531 and a logical volume number 532.

The virtual storage number 531 stores identifiers for identifying the virtual storages in the storage system 1.

The logical volume number 532 stores identifiers for identifying the logical volumes prepared in the disk drives 6.

The storage system 1 can know to what virtual storage a process relates from the logical volume number 532.

Figure 28:
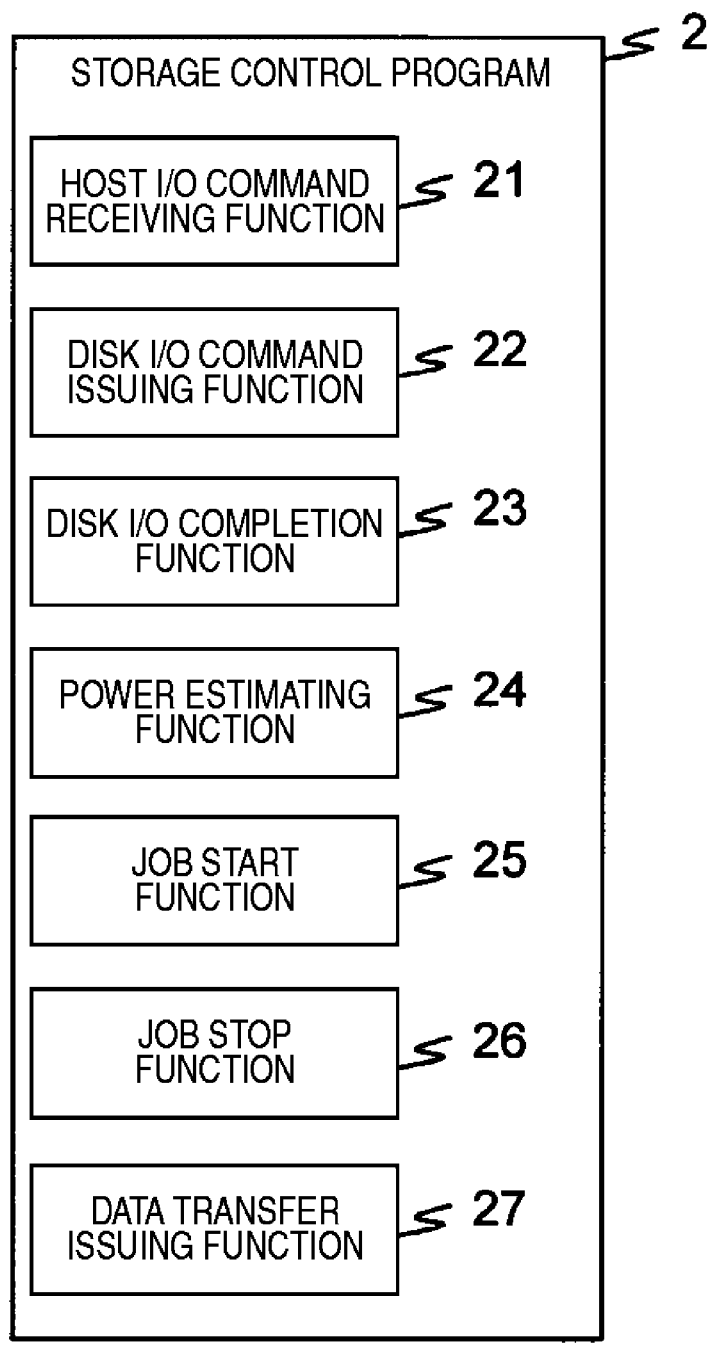
FIG. 28 is a diagram illustrating functions of a storage control program according to the second embodiment of the invention.

FIG. 28 is a block diagram illustrating functions of the storage control program 2 according to the second embodiment of the invention.

Compared with the first embodiment, the storage control program 2 according to the second embodiment additionally includes a data transfer issuing function 27. The data transfer issuing function 27 is a function of managing the amount of data by which the cache memory unit 73 is accessed to operate the logical volumes. Details thereof will be described later with reference to FIG. 41.

Figure 29:
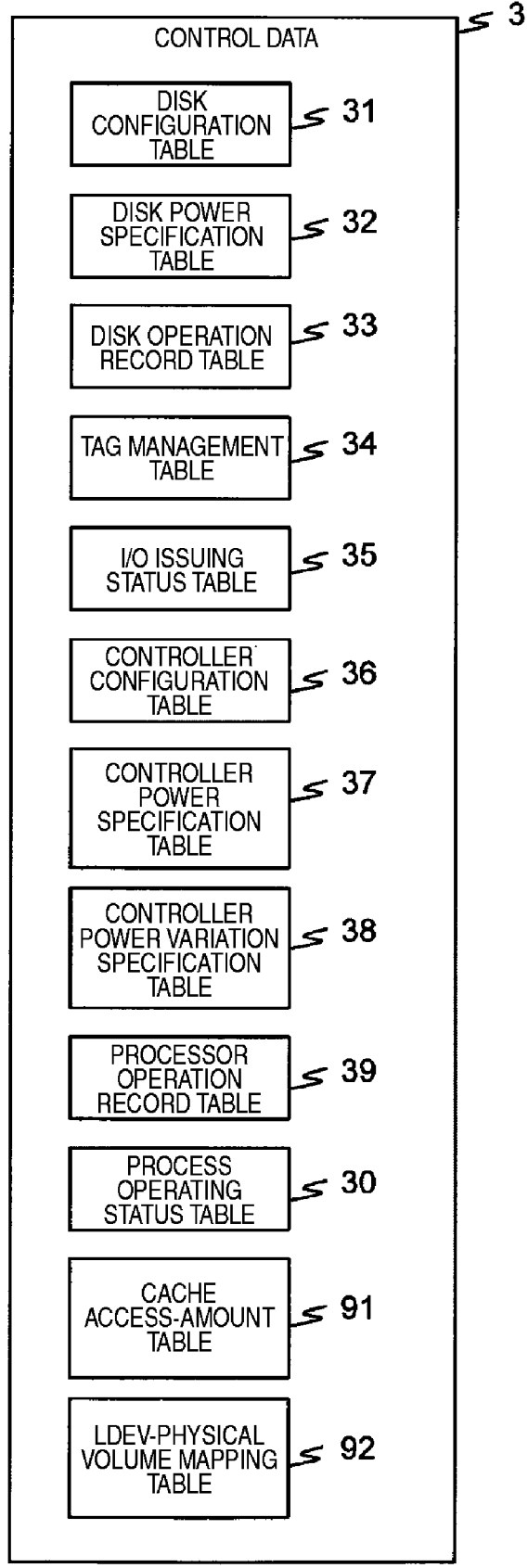
FIG. 29 is a block diagram illustrating a configuration of control data according to the second embodiment of the invention.

FIG. 29 is a block diagram illustrating a configuration of control data 3 according to the second embodiment of the invention.

Compared with the first embodiment, the control data 3 according to the second embodiment additionally includes a cache access-amount table 91 and an LDEV-physical volume mapping table 92.

In the second embodiment, the information stored in the disk operation record table 33, the tag management table 34, the I/O issuing status table 35, the processor operation record table 39, and the processor operating status table 30 is different from that of the first embodiment.

First, the LDEV-physical volume mapping table 92 will be described.

FIG. 30 is a diagram illustrating an example of the LDEV-physical volume mapping table 92 according to the second embodiment of the invention.

The LDEV-physical volume mapping table 92 manages the mapping between a disk drive 6 and the logical volumes (LDEV: logical Device) prepared in an RAID group including one or more disk drives 6.

The LDEV-physical volume mapping table 92 includes a logical volume number 921, an RAID level 922, a disk number 923, and an LBA range 924.

The logical volume number 921 stores identifiers for identifying the logical volumes.

The RAID level 922 stores information indicating types of the RAID.

The disk number 923 stores identifiers of the disk drives 6 constituting the RAID.

The LBA range 924 stores addresses assigned to the disk drives 6.

Differences of the disk operation record table 33, the tag management table 34, the I/O issuing status table 35, the processor operation record table 39, and the processor operating status table 30 will be described now.

FIG. 31 is a diagram illustrating an example of the disk operation record table 33 according to the second embodiment of the invention.

The disk operation record table 33 additionally includes a logical volume number 336, compared with the first embodiment.

The logical volume number 336 stores identifiers for identifying the logical volumes prepared in the disk drives 6. Accordingly, the disk operation record table 33 can manage the cumulative operating times 332 to 335 of the logical volumes by access types.

The identifier for identifying a logical volume is an identifier specified by the management computer 4 at the time of preparing the logical volumes.

FIG. 32 is a diagram illustrating an example of the tag management table 34 according to the second embodiment of the invention.

The tag management table 34 additionally includes a logical volume number 344, compared with the first embodiment. The logical volume number 344 is the same as the logical volume number 336 shown in FIG. 31. The logical volume number 344 is mapped onto the tag number 342 so that the tag management table 34 can manage to logical volume the access is corresponding to the tag number 342 is an access.

FIG. 33 is a diagram illustrating an example of the I/O issuing status table 35 according to the second embodiment of the invention.

The I/O issuing status table 35 additionally includes a logical volume number 355, compared with the first embodiment. The logical volume number 355 is the same as the logical volume number 336 shown in FIG. 31. Accordingly, the I/O issuing status table 35 can manage the outstanding command count 353 and the disk operation start time 354 of the respective logical volumes by access types.

FIG. 34 is a diagram illustrating an example of the processor operation record table 39 according to the second embodiment of the invention.

The processor operation record table 39 additionally includes a logical volume number 394, compared with the first embodiment. The logical volume number 394 is the same as the logical volume number 336 shown in FIG. 31. Accordingly, the processor operation record table 39 can manage a time when the processor core 781 is operating to perform a job of a certain logical volume.

FIG. 35 is a diagram illustrating an example of the processor operating status table 30 according to the second embodiment of the invention.

The processor operating status table 30 additionally includes a logical volume number 304, compared with the first embodiment. The logical volume number 304 is the same as the logical volume number 336 shown in FIG. 31. Accordingly, the processor operating status table 30 can manage the job start time 303 of the processor core 781 every logical volume.

The cache access-amount table 91 will be described now.

FIG. 36 is a diagram illustrating an example of the cache access-amount table 91 according to the second embodiment of the invention.

The cache access-amount table 91 manages an amount of cache memory access every logical volume. At the time of estimating the power consumption every logical volume, the power estimating function 24 refers to the cache access-amount table 91.

The cache access-amount table 91 includes a logical volume number 911 and a cumulative access amount 912.

The logical volume number 911 is the same as the logical volume number 336 shown in FIG. 31.

The cumulative access amount 912 stores an amount of data by which the cache memory unit 73 is accessed to operate the corresponding logical volume.

Figure 37:
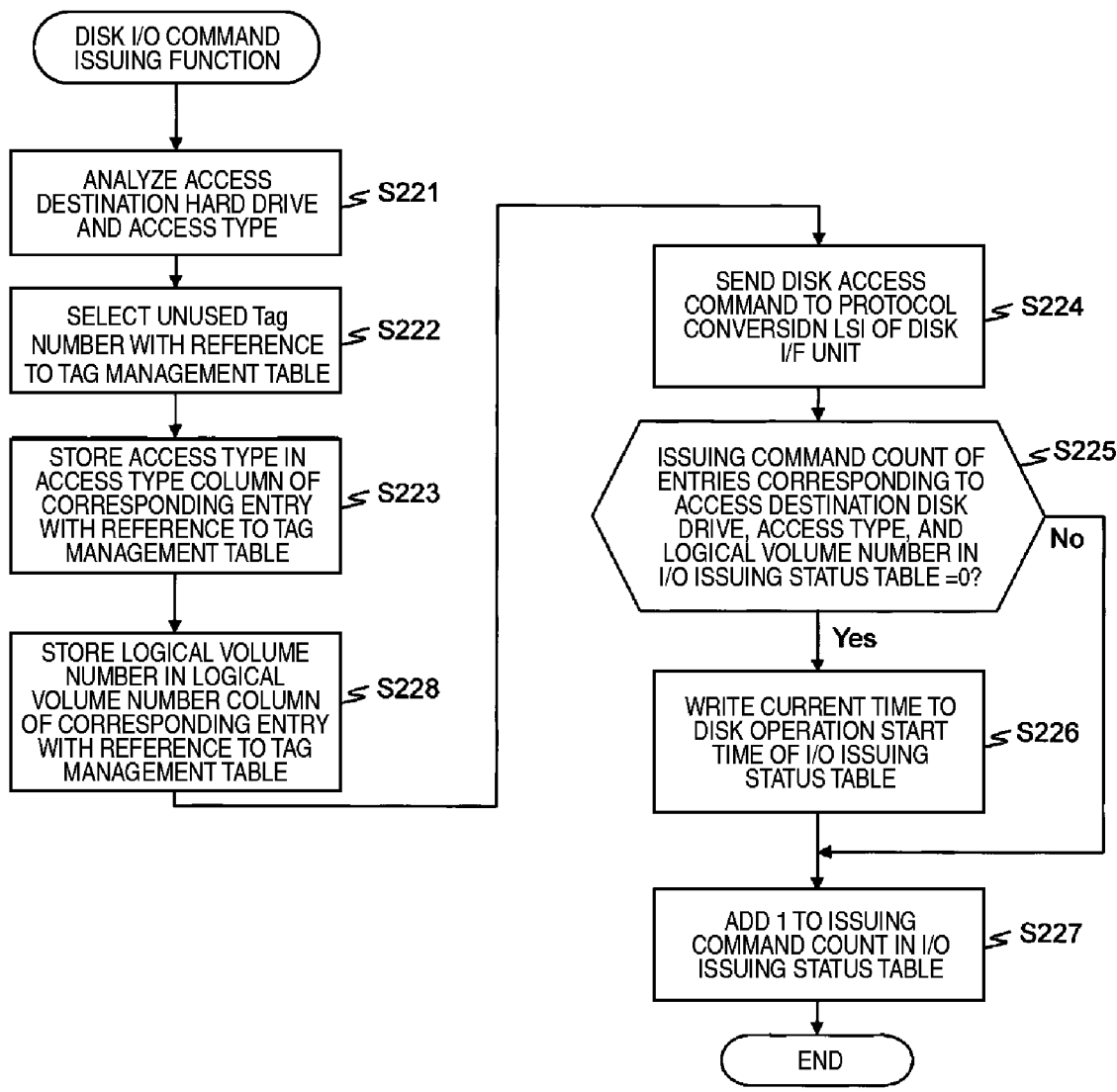
FIG. 37 is a diagram illustrating an example of a disk I/O command issuing function according to the second embodiment of the invention.

FIG. 37 is a diagram illustrating an example of a disk I/O command issuing function 22 according to the second embodiment of the invention. The process steps different from those of the first embodiment are mainly described now.

The processes of S221 to S223 are the same as the first embodiment. The parameters sent from the host I/O command receiving function 21 include the identifiers of the logical volumes. The process of S228 is additionally performed after S223.

In S228, the disk I/O command issuing function 22 stores the extracted identifiers of the logical volumes in the logical volume number 344 of the entry corresponding to the tag number 342 selected in S222 with reference to the tag management Table 34.

The process of S224 is the same as the first embodiment. The process of S225 is different from the first embodiment.

In S225, the disk I/O command issuing function 22 determines whether the outstanding command count 353 of the entry corresponding to the disk drive 6 as the extracted access destination, the logical volume number 355, and the access type is "0" with reference to the I/O issuing status table 35.

The processes of S226 to S227 are the same as the first embodiment.

Figure 38:
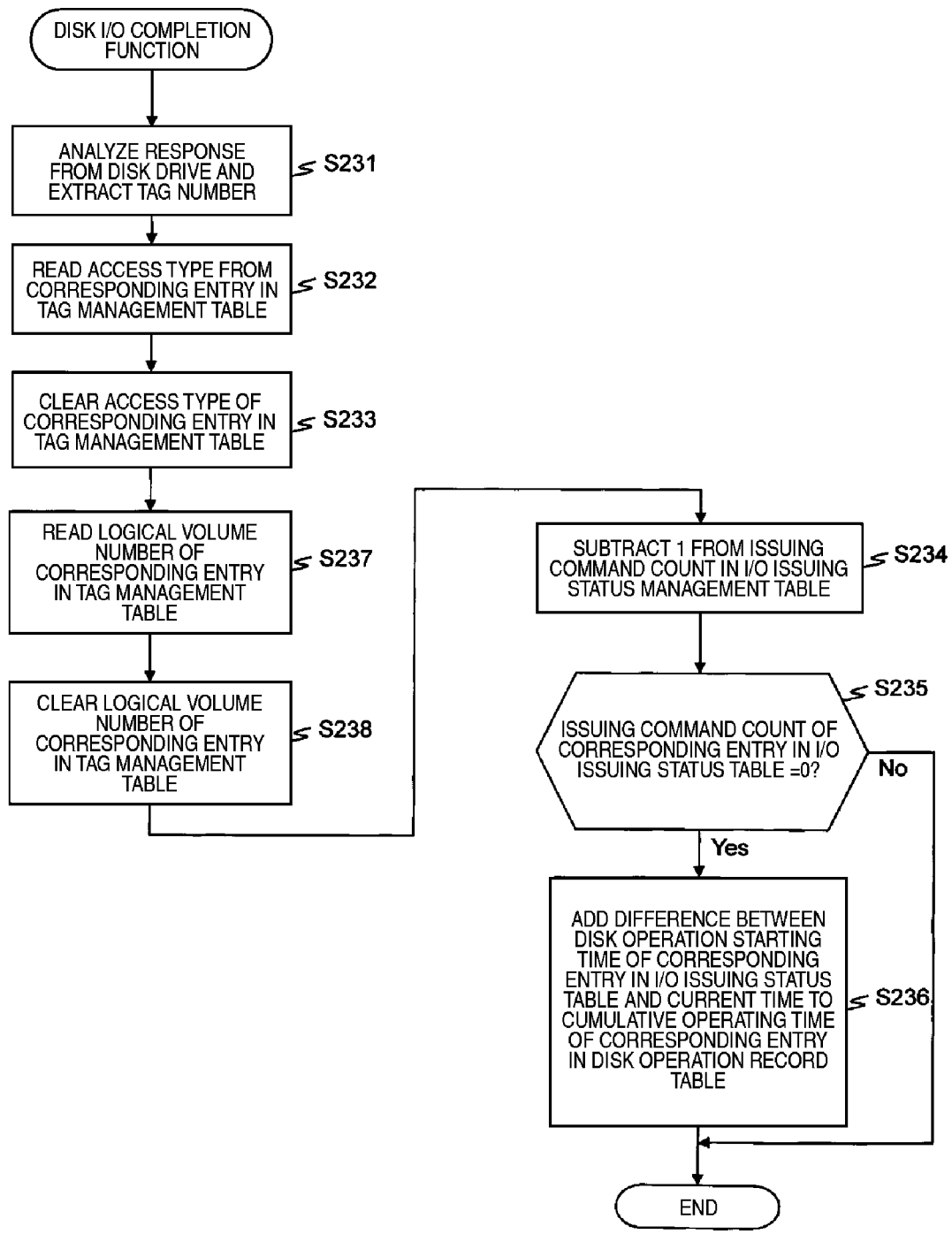
FIG. 38 is a diagram illustrating an example of a disk I/O completion function according to the second embodiment of the invention.

FIG. 38 is a diagram illustrating an example of a disk I/O completion function 23 according to the second embodiment of the invention. Process steps different from those of the first embodiment will be mainly described now.

The processes of S231 to S233 are the same as the first embodiment. The processes of S237 and S238 are additionally performed after S233.

In S237, the disk I/O completion function 23 reads the logical volume number 344 of the entry corresponding to the extracted tag number 342 with reference to the tag management table 34. In S228, the disk I/O completion function 23 erases the logical volume number 344 of the entry.

The processes of S234 to S236 are the same as the first embodiment. However, the processes are performed on the basis of the extracted logical volume number 344.

Figure 39:
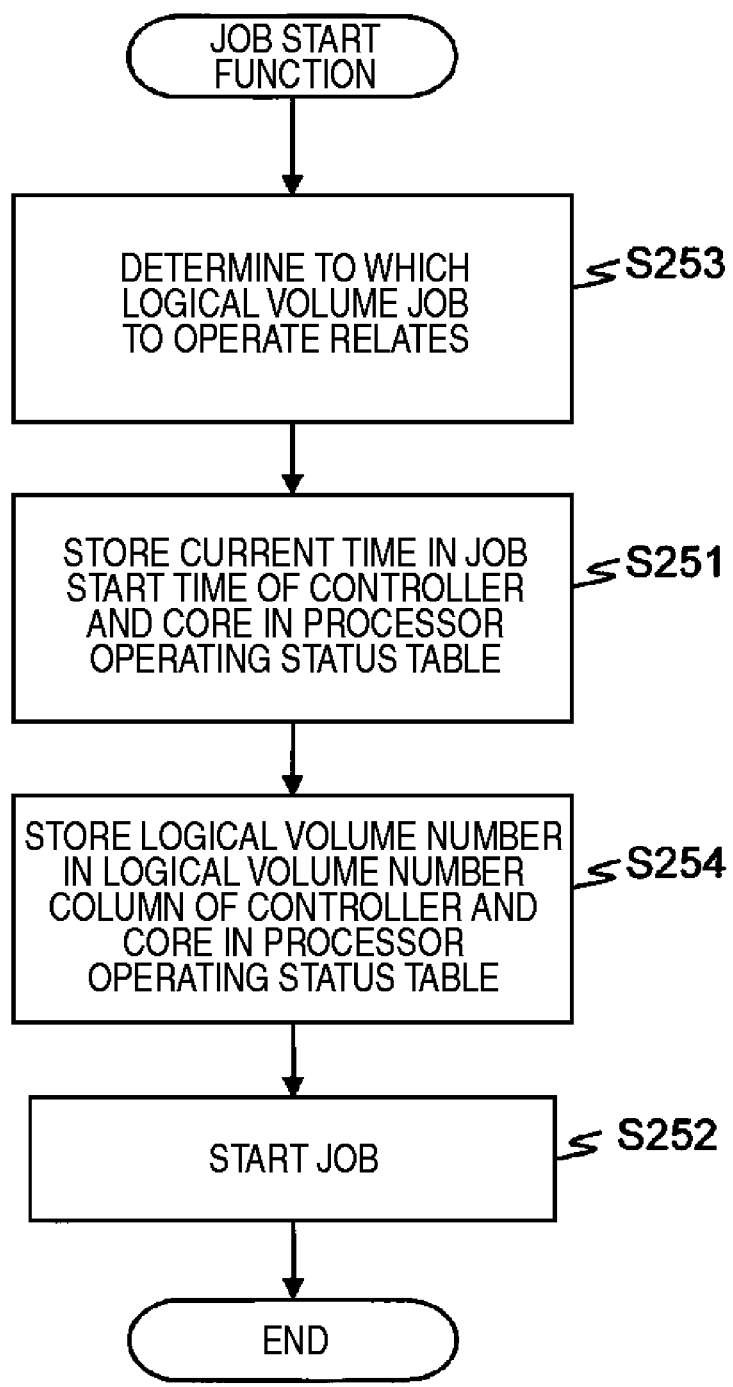
FIG. 39 is a diagram illustrating an example of a job start function according to the second embodiment of the invention.

FIG. 39 is a diagram illustrating an example of a job starting function 25 according to the second embodiment of the invention. Process steps different from those of the first embodiment will be mainly described now.

The processes of S251 and S252 are the same as the first embodiment. The processes of S253 and S254 are additionally performed, compared with the first embodiment.

In S253, the job starting function 25 determines from what logical volume a started job is requested. The request includes the identifier of the logical volume and thus the job starting function 25 determines from what logical volume the started job is requested with reference to the identifier of the corresponding logical volume.

In S254, the job starting function 25 stores the identifier of the logical volume determined in S253 in the logical volume number 304 of the entry in which the job start time 303 is stored in S251.

Figure 40:
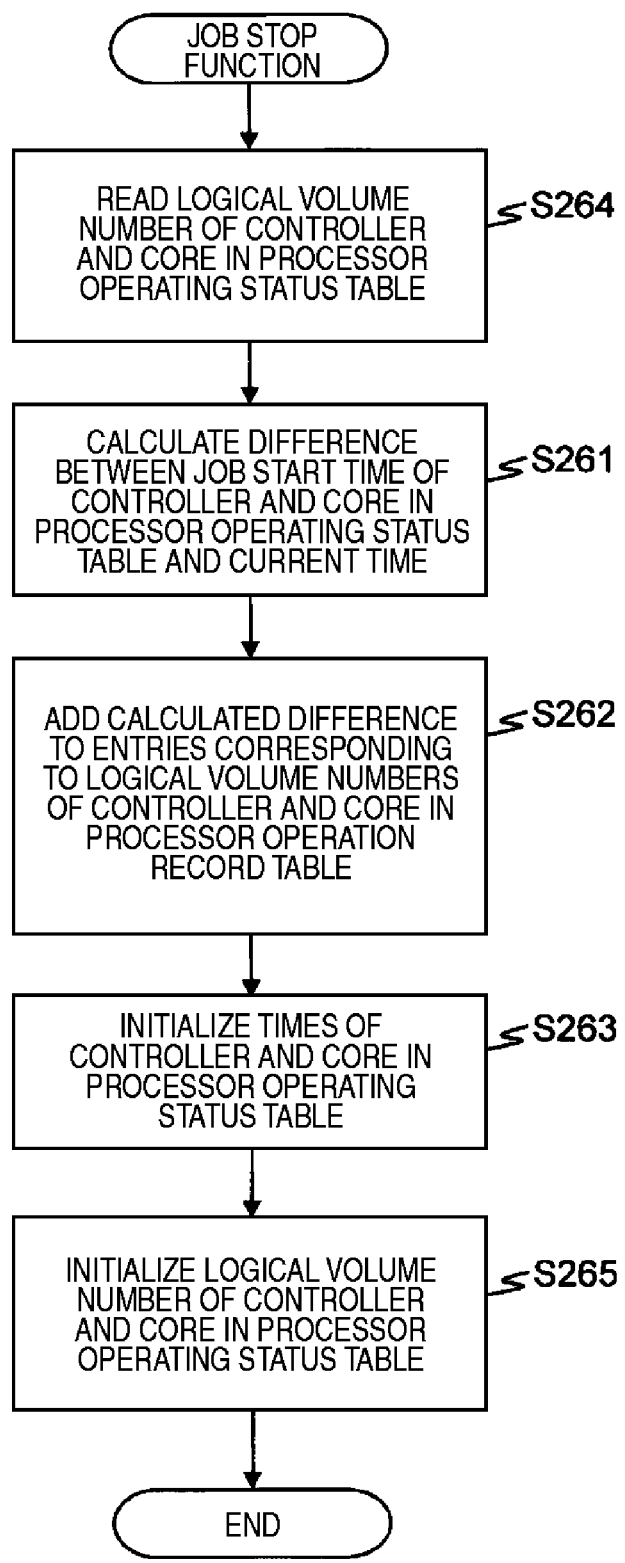
FIG. 40 is a diagram illustrating an example of a job stop function according to the second embodiment of the invention.

FIG. 40 is a diagram illustrating an example of a job stop function 26 according to the second embodiment of the invention. Process steps different from those of the first embodiment will be mainly described now.

The processes of S261 and S263 are the same as the first embodiment. Compared with the first embodiment, the process of S262 is different and the processes of S264 and S265 are additionally performed.

In S264, the job stop function 26 reads the entries corresponding to the controller number 301 including the processor core 781 performing the requested process, the processor core number 302 for identifying the processor core 781, and the logical volume number 304 with reference to the processor operating status table 30.

In S262, the job stop function 26 adds the difference calculated in S261 to the cumulative operating time 393 of the entry corresponding to the read information (the controller number 301, the processor core number 302, and the logical volume number 304).

In S265, the job stop function 26 erases the logical volume number 304 of the corresponding entry in the processor operating status table 30 and ends the processes.

Figure 41:
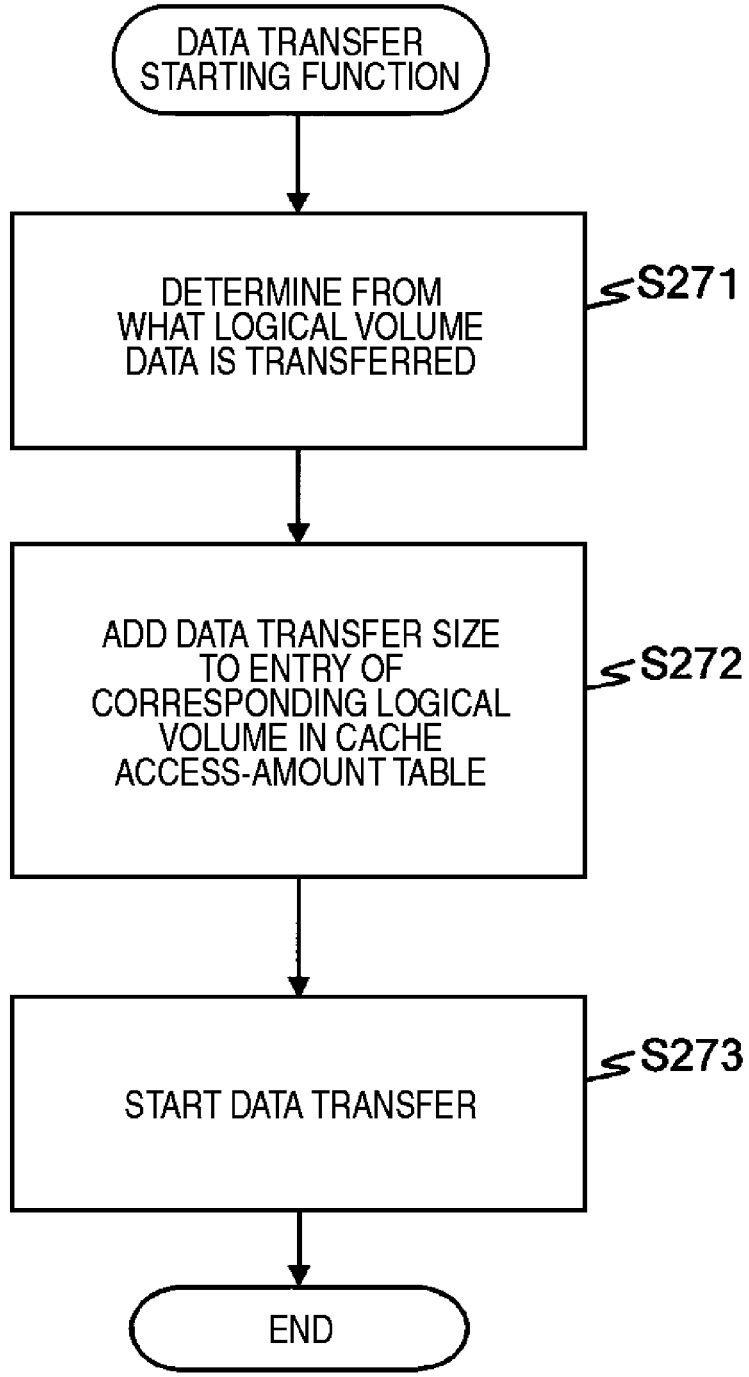
FIG. 41 is a diagram illustrating an example of a data transfer starting function according to the second embodiment of the invention.

FIG. 41 is a diagram illustrating an example of the data transfer starting function 27 according to the second embodiment of the invention.

The data transfer issuing function 27 is started up at the time of transferring data between the cache memory unit 73, and the host interface unit 72 or at the time of transferring data between the cache memory unit 73 and the disk interface unit 74.

First, the data transfer starting function 27 determines from what logical volume data is transferred (S271). In general, the job calling the data transfer issuing function 27 manages on what logical volume a process is performed. The data transfer starting function 27 determines what logical volume is operated with reference to the information managed by the job.

Then, the data transfer issuing function 27 adds the transferred data size to the entry of the logical volume number 911 corresponding to the logical volume determined in S271 (S272).

The data transfer starting function 27 starts up the transfer of data (S273) and ends the process. Specifically, the data transfer issuing function 27 transmits a data transfer command to the data transfer LSI 722 of the host interface unit 72 or the data transfer LSI 742 of the disk interface unit 74.

Figure 42:
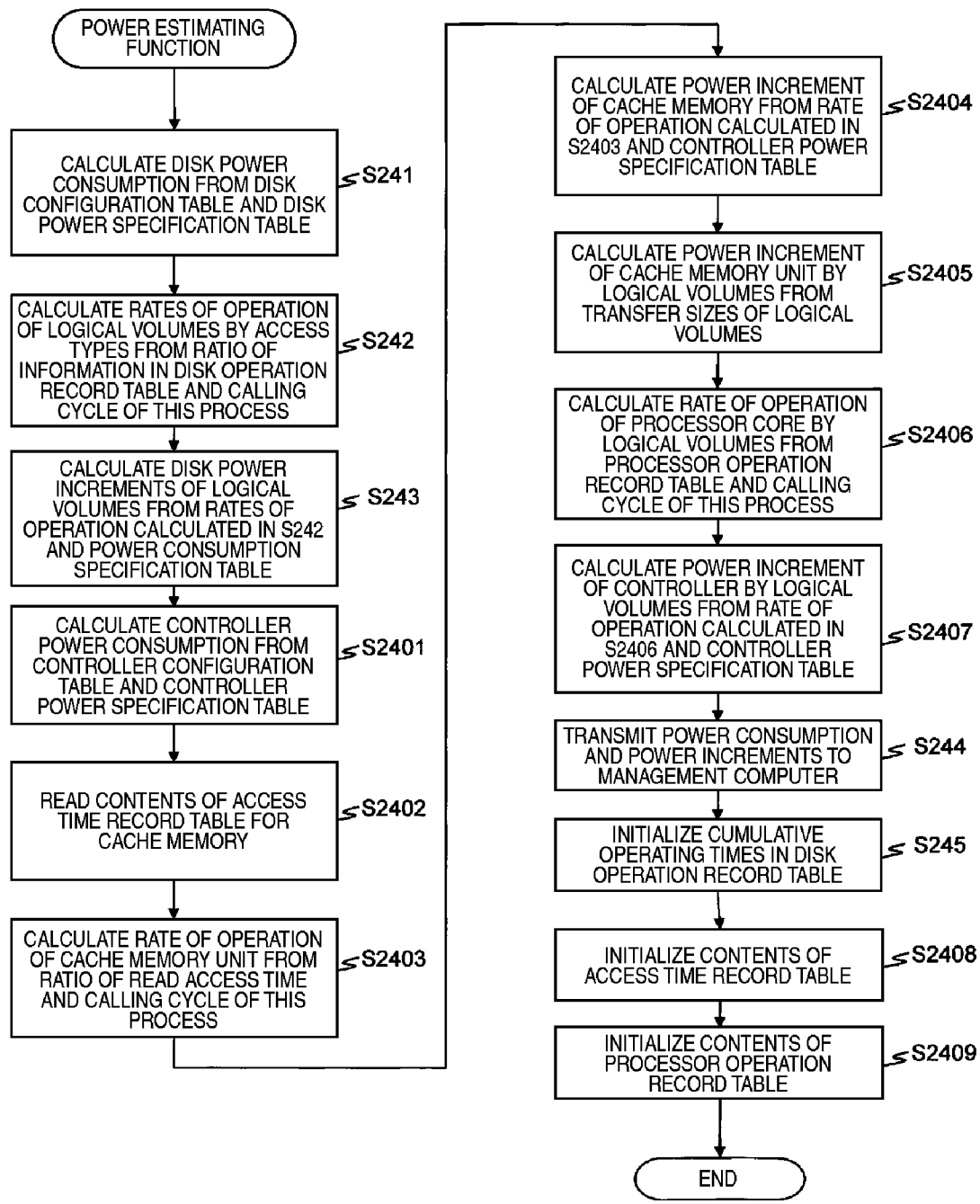
FIG. 42 is a flowchart illustrating an example of a power estimating function according to the second embodiment of the invention.

FIG. 42 is a flowchart illustrating an example of the power estimating function 24 according to the second embodiment of the invention. Process steps different from those of the first embodiment will be mainly described now.

The processes of S241, S2401 to S2403, S244 to S245, and S2408 and S2409 are the same as the first embodiment.

In S242, the power estimating function 24 calculates the operation rates of the logical volumes by access types using the ratio of the information included in the disk operation record table 33 and the calling interval of this process.

In S243, the power estimating function 24 calculates the power increments of the logical volumes from the calculated operation rates and the information of the disk power specification table 32.

In S2405, the power estimating function 24 calculates the power increment of the cache memory unit 73 by logical volumes from the data transfer sizes of the logical volumes.

Specifically, the power estimating function 24 calculates a ratio of the cumulative access amount 912 of a logical volume to the total of the cumulative access amount 912 of the cache access-amount table 91, multiplies the access time 7322 shown in FIG. 3 by the calculated ratio, and calculates the access time of the cache memory unit 73 to the logical volume.

Then, the power estimating function 24 calculates the operation rate of the cache memory unit 73 in a logical volume from the calling interval of this process and the calculated access time of the cache memory unit 73 to the logical volume and calculates the power increments of the cache memory unit 73 using the calculated operation rate of the cache memory unit 73 in the logical volume. The method of calculating the power increment of the cache memory unit 73 is the same as the first embodiment.

In S2406, the power estimating function 24 calculates the operation rate of the processor core 781 by logical volumes using the ratio of the cumulative operating time 393 in the processor operation record table 39 and the calling interval of this process. The calculation method is the same as the first embodiment.

In S2407, the power estimating function 24 calculates the operation rate of the controller 75 by logical volumes from the calculated operation rate of the processor. The calculation method is the same as the first embodiment.

FIG. 43 is a diagram illustrating an example of display data 990 transmitted to the management computer 4 in S244 performed by the power estimating function 24 according to the second embodiment of the invention.

The display data 990 additionally includes a logical volume number 995, compared with the first embodiment. The logical volume number 995 is the same as the logical volume number 336 shown in FIG. 31.

FIG. 44 is a diagram illustrating an example of the power consumption history table 51 according to the second embodiment of the invention.

Compared with the first embodiment, the power consumption history table 51 additionally includes a logical volume number 516. The logical volume number 516 is the same as the logical volume number 336 shown in FIG. 31. Accordingly, the management computer 4 can know the power increment by logical volumes.

Figure 45:
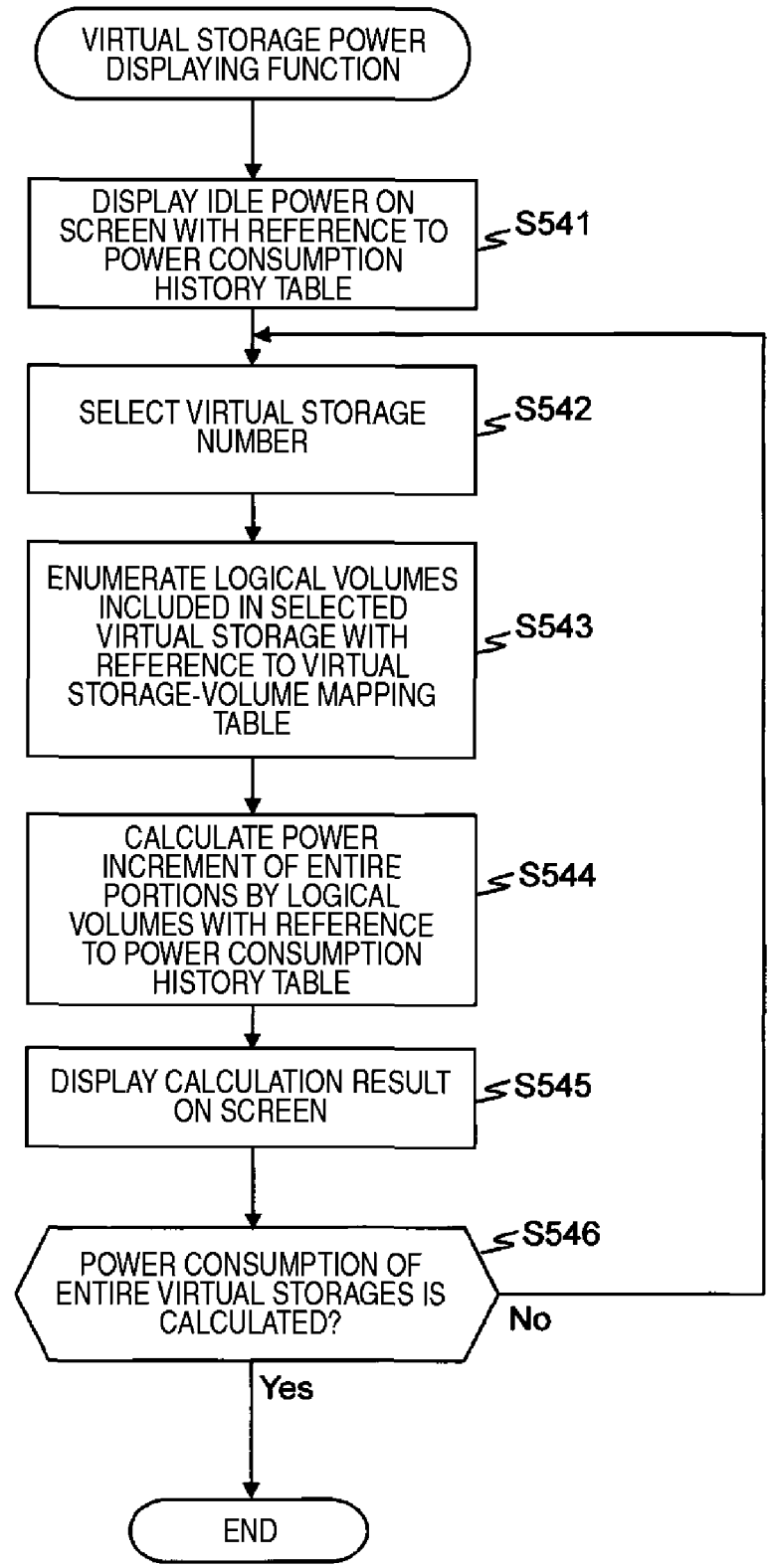
FIG. 45 is a flowchart illustrating an example of a virtual storage power displaying function according to the second embodiment of the invention.

FIG. 45 is a flowchart illustrating an example of the virtual storage power displaying function 54 according to the second embodiment of the invention.

The virtual storage power displaying function 54 is called in response to a request from a manager operating the management computer 4 to display the power consumption of the virtual storages.

First, the virtual storage power displaying function 54 displays the idle power 515 on a screen with reference to the power consumption history table 51 (S541).

The virtual storage power displaying function 54 selects an entry of the virtual storage corresponding to a virtual storage number with reference to the virtual storage-volume mapping table 53 (S542).

The virtual storage power displaying function 54 enumerates the logical volumes included in the selected virtual storages with reference to the virtual storage-volume mapping table 53 (S543).

Then, the virtual storage power displaying function 54 totals the power increments of the enumerated logical volumes with reference to the power consumption history table 51 (S544).

The virtual storage power displaying function 54 displays the totaling result on the screen (S545).

The virtual storage power displaying function 54 determines whether the above-mentioned process is performed on the entries of the entire virtual storages (S546).

When it is determined that the above-mentioned process is not performed on the entries of the entire virtual storages, the virtual storage power displaying function 54 performs the above-mentioned process in S542 again.

When it is determined that the above-mentioned process is performed on the entries of the entire virtual storages, the virtual storage power displaying function 54 ends the process.

FIG. 46 is a diagram illustrating an example of a virtual storage power consumption output performed by the virtual storage power displaying function 54 according to the second embodiment of the invention.

In the example shown in FIG. 46, the virtual storage power displaying function 54 displays a normal power 591 and a power increment 592.

The normal power 591 is the power consumption of the storage system 1 when it is turned on but does not perform any process, that is, the idle power. The power increment 592 is the power increment due to the operation of the virtual storages.

An updating unit 593 updates data by operating the updating unit 593.

An ending unit 594 ends the display by operating the ending unit 594.

As described above, according to the second embodiment of the invention, it is possible to calculate the power increment by virtual storages in the storage system 1 supporting plural virtual storages.

As a result, in a single storage system 1 using the virtual storage function, it is possible to calculate the power consumption by virtual storages, similarly the case where power is individually calculated from plural storage systems 1.

In the second embodiment, the operating times of disks are obtained by measurement every logical volume. However, similarly to the power estimating method of the cache memory unit 73, the storage system 1 may store the operating time, the I/O count, and the transfer size every logical volume and may proportionally distribute the power increment by the I/O count or the transfer size every logical volume.

Although the power consumption by virtual storages is calculated in the second embodiment, the power consumption may be calculated every host computer 71 in the same way.

Although the estimated power every logical volume is calculated using the identifiers of the logical volumes in the second embodiment, the tables may include the identifiers for identifying the virtual storages and calculate the estimated power by virtual storages.

Third Embodiment

In a third embodiment of the invention, power is estimated by considering a change in status in a storage system 1 controlling a status (active, standby, or rotation OFF) of disk drives 6.

The configuration of the storage system according to the third embodiment of the invention is the same as the second embodiment and thus its description is omitted.

Figure 47:
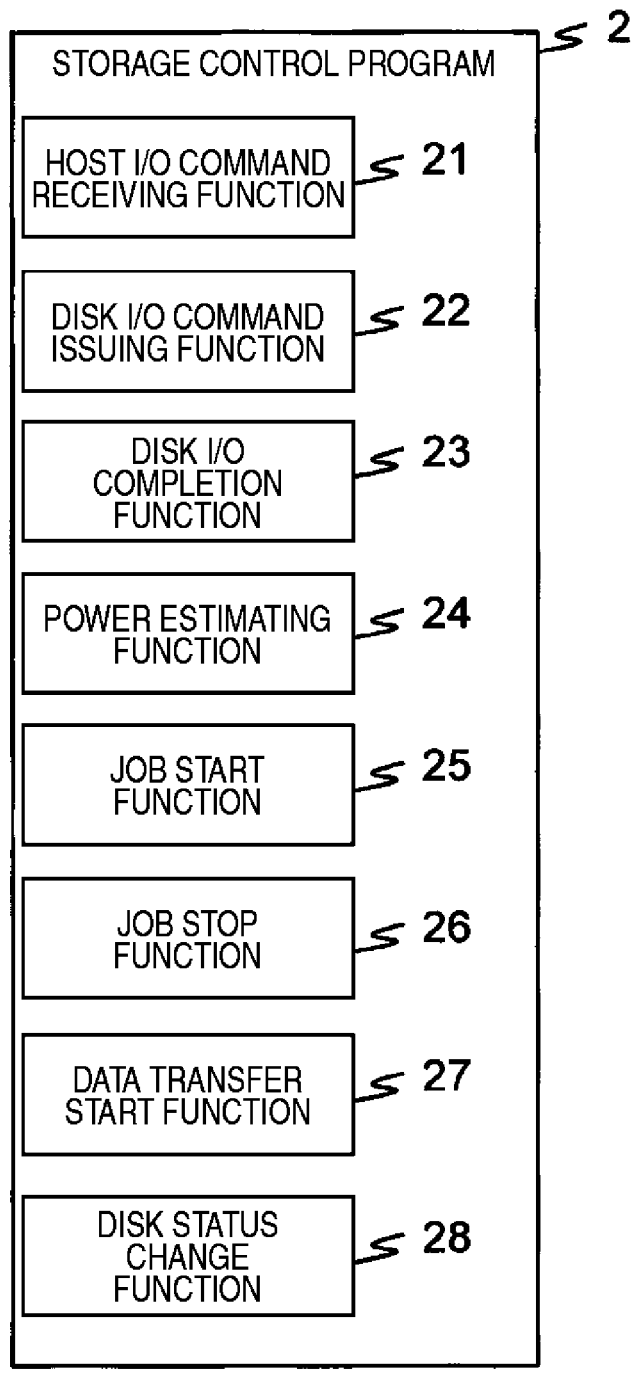
FIG. 47 is a diagram illustrating functions of a storage control program according to the third embodiment of the invention.

FIG. 47 is a block diagram illustrating functions of the storage control program 2 according to the third embodiment of the invention.

Compared with the second embodiment, the storage control program 2 according to the third embodiment additionally includes a disk status changing function 28. The disk status changing function 28 manages the statuses of the disk drives 6.

Figure 48:
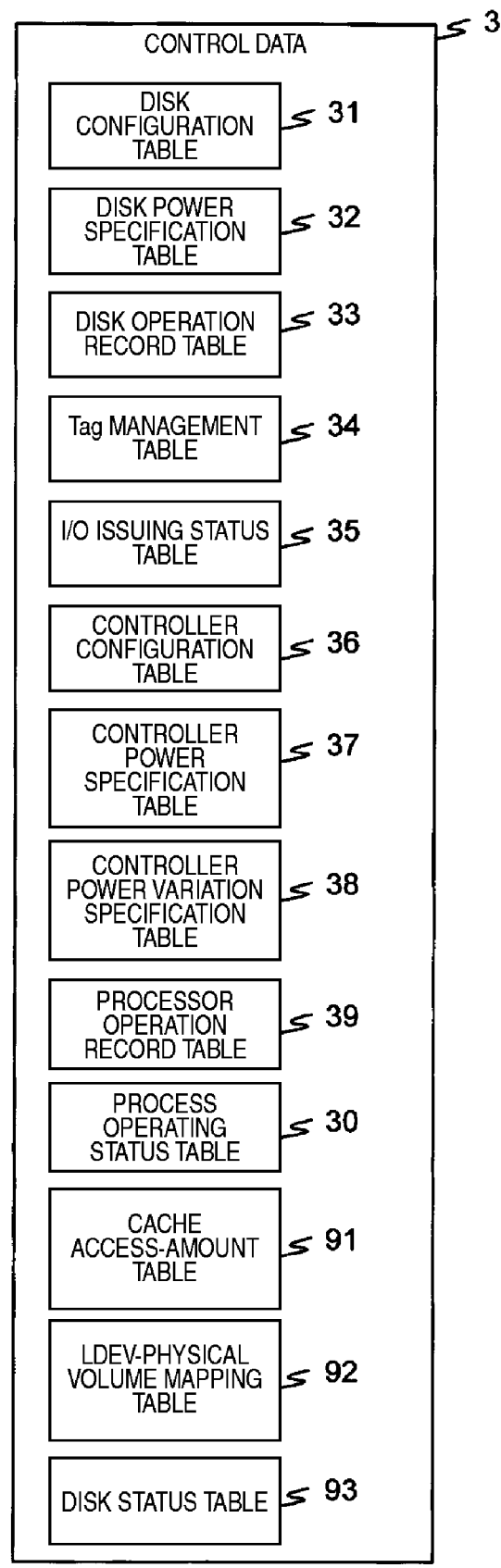
FIG. 48 is a block diagram illustrating a configuration of control data according to the third embodiment of the invention.

FIG. 48 is a block diagram illustrating a configuration of control data 3 according to the third embodiment of the invention.

Compared with the second embodiment, the control data 3 according to the third embodiment additionally includes a disk status table 93. The disk status table 93 will be described later with reference to FIG. 51.

FIG. 49 is a diagram illustrating an example of a disk power specification table 32 according to the third embodiment of the invention.

Compared with the second embodiment, the disk power specification table 32 additionally includes a standby power 327 and a spin-down power 328.

The standby power 327 stores the power consumption when a disk drive 6 is in a standby status.

The spin-down power 328 stores the power consumption when a disk drive 6 is in a spin-down status.

FIG. 50 is a diagram illustrating an example of a disk operation record table 33 according to the third embodiment of the invention.

Compared with the second embodiment, the disk operation record table 33 additionally includes a standby time 337 and a spin-down time 338. The standby time 337 and the spin-down time 338 are stored every disk number 331.

The standby time 337 stores the cumulative time when the disk drive 6 is in the standby status.

The spin-down time 338 stores the cumulative time when the disk drive 6 is in the spin-down status.

FIG. 51 is a diagram illustrating an example of the disk status table 93 according to the third embodiment of the invention.

The disk status table 93 manages a current operating status and a status change start time of the disk drives 6 in the storage system 1.

The disk status table 93 includes a disk number 931, a current status 932, and a start time 933.

The disk number 931 is the same as the disk number 311 shown in FIG. 6.

The current status 932 stores information indicating the current operating statuses of the disk drives 6. For example, "active" is stored in a normal operating status, "standby" is stored in the standby status, and "spin down" is stored in the spin-down status.

The start time 933 stores a time when the operating status as the current status 932 is started, that is, the status change start time.

Figure 52:
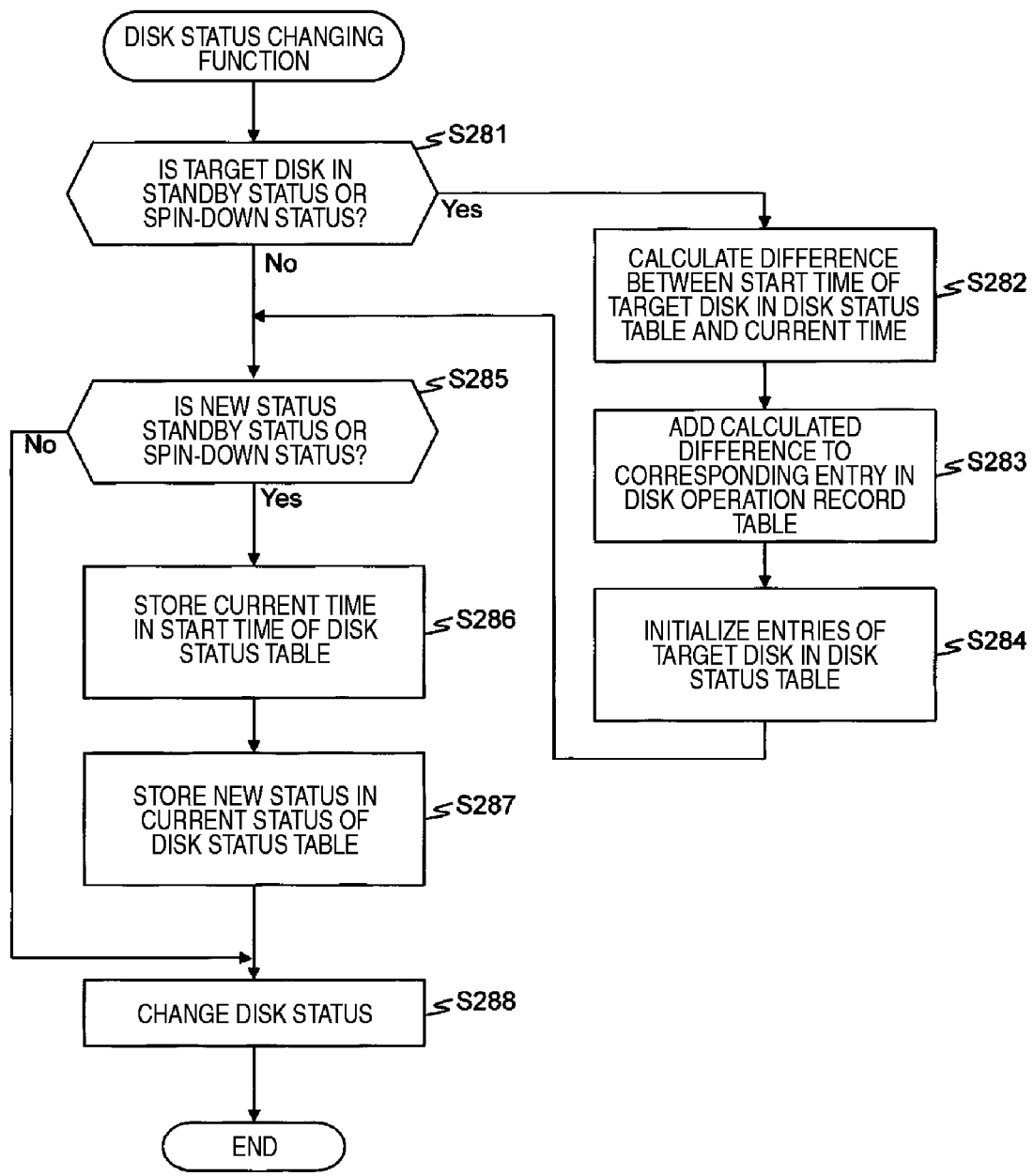
FIG. 52 is a diagram illustrating an example of a disk status changing function according to the third embodiment of the invention.

FIG. 52 is a flowchart illustrating an example of the disk status changing function 28 according to the third embodiment of the invention.

The disk status changing function 28 is called when the status of the disk drive 6 is changed in accordance with a command from the host computer 71 or the management computer 4, changes the disk status, and manages the status change time.

First, the disk status changing function 28 determines whether a target disk drive 6 is in the standby status or in the spin-down status (S281).

When it is determined that the target disk drive 6 is in the standby status or in the spin-down status, that is, when it is determined that the standby status or the spin-down status is ended, the disk status changing function 28 calculates a difference between the start time 933 of the target disk drive 6 and the current time with reference to the disk status table 93 (S282).

The disk status changing function 28 adds the calculated difference to the standby time 337 or the spin-down time 338 of the corresponding entry of the disk operation record table 33 (S283).

The disk status changing function 28 initializes the entry of the target disk drive 6 in the disk status table 93 (S284) and then performs the process of S285.

When it is determined in S281 that the target disk drive 6 is not in the standby status or in the spin-down status, the disk status changing function 28 determines whether a new changed status is the standby status or the spin-down status (S285).

When it is determined that the new changed status is not the standby status or the spin-down status, the disk status changing function 28 performs the process of S288.

When it is determined in S285 that the new changed status is the standby status or the spin-down status, the disk status changing function 28 stores the current time in the start time 933 of the target disk drive 6 in the disk status table 93 (S286).

The disk status changing function 28 stores the new status in the current status 932 in the disk status table 93 (S287) and performs the process of S288.

The disk status changing function 28 changes the disk status to the status instructed by the host computer 71 or the management computer 4 (S288) and ends the process.

Figure 53:
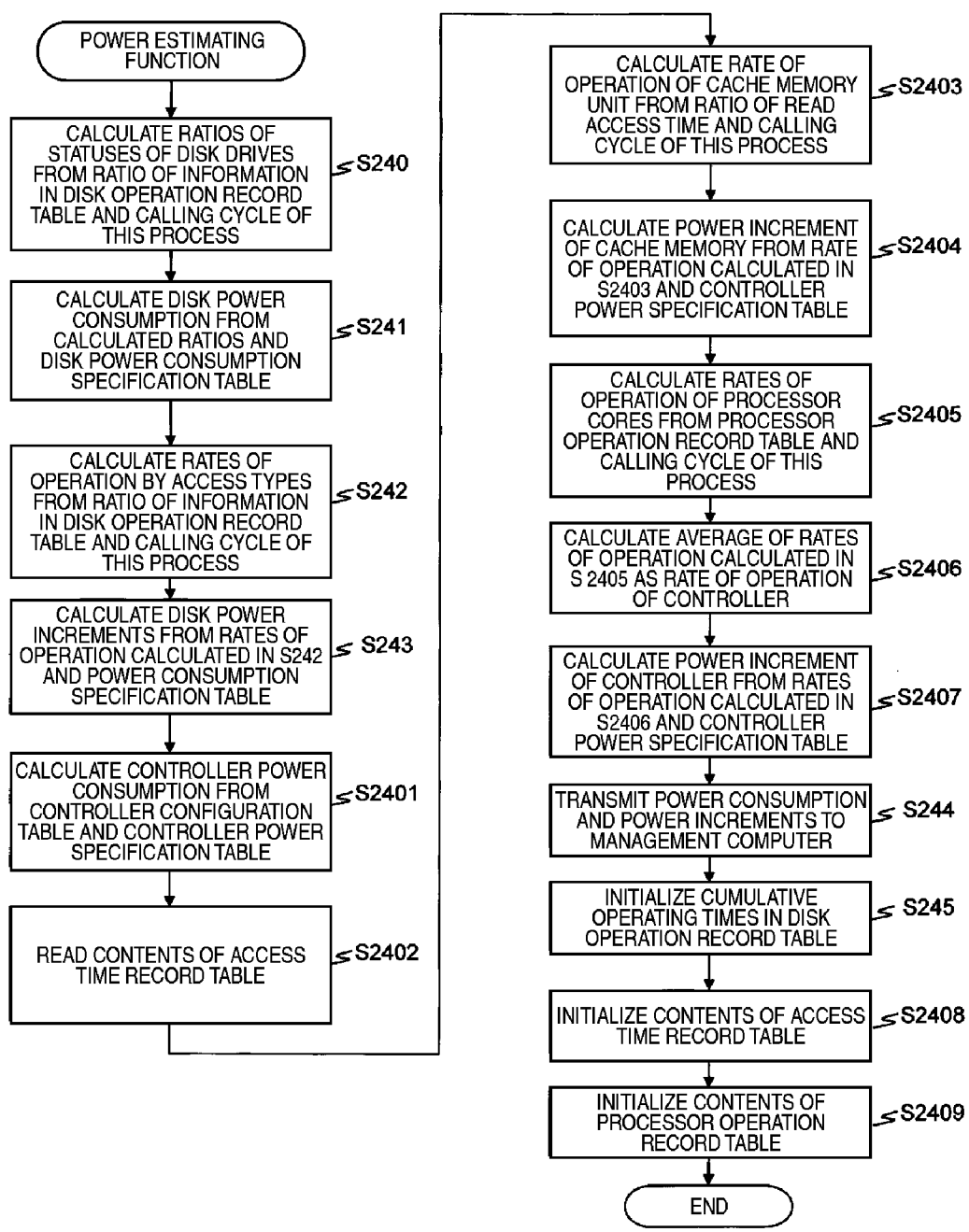
FIG. 53 is a flowchart illustrating an example of a power estimating function according to the third embodiment of the invention.

FIG. 53 is a flowchart illustrating an example of the power estimating function 24 according to the third embodiment of the invention. Process steps different from those of the first embodiment will be mainly described now.

In S240, the power estimating function 24 calculates ratios of the statuses of the disk drive 6 using the ratio of the standby time 337 and the spin-down time 338 in the disk operation record table 33 and the calling interval of this process. The calculation method is the same as the first embodiment.

In S241, the power estimating function 24 calculates the power consumption of the disk drive from the calculated ratio and the information in the disk power specification table 32. Specifically, the power consumption of the disk drives 6 by statuses is calculated. The calculation method is the same as the first embodiment.

The processes of S242 to 245 and S2401 to S2409 are the same as the first embodiment.

As described above, according to the third embodiment of the invention, it is possible to estimate the power consumption by considering the change in status in the storage system 1 controlling the statuses (active, standby, or spin down) of the disk drives 6.

Fourth Embodiment

In a fourth embodiment of the invention, when the storage system 1 includes a disk drive 6 and a solid state drive (SSD), the power consumption is estimated by considering a difference in characteristics therebetween.

In the fourth embodiment, the power consumption of the disk drive 6 is estimated using the access time and the power consumption of the SSD is estimated using the transfer size, thereby estimating the power consumption with high precision.

The configuration of the storage system according to the fourth embodiment is the same as the second embodiment and thus its description is omitted. However, the disk drive 6 includes the SSD and thus is referred to as the SSD 6.

Figure 54:
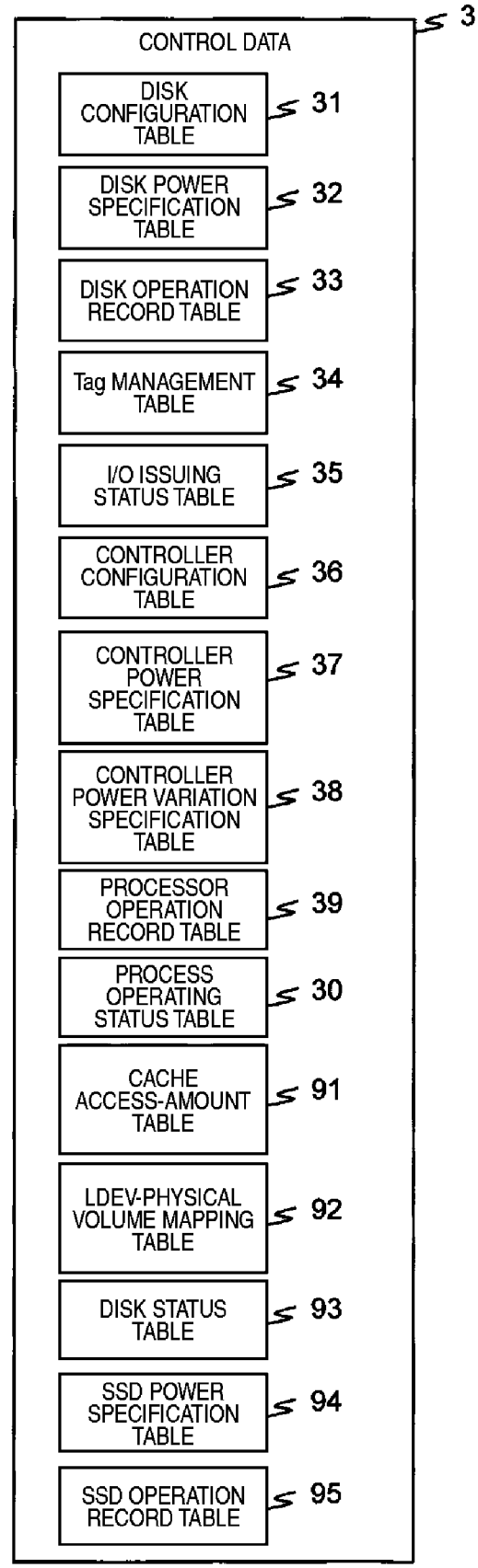
FIG. 54 is a block diagram illustrating a configuration of control data according to a fourth embodiment of the invention.

FIG. 54 is a block diagram illustrating a configuration of control data 3 according to the fourth embodiment of the invention.

Compared with the third embodiment, the control data 3 according to the fourth embodiment additionally includes an SSD power specification table 94 and an SSD operation record table 95. The SSD power specification table 94 and the SSD operation record table 95 will be described later with reference to FIGS. 55 and 56.

FIG. 55 is a diagram illustrating an example of the SSD power specification table 94 according to the fourth embodiment of the invention.

The SSD power specification table 94 manages the energy consumption in the statuses by types of the SSD 6 mounted on the storage system 1. The SSD power specification table 94 is updated at the time of adding a new type of disk drive 6. The power estimating function 24 refers to the SSD power specification table 94 at the time of estimating the power.

The SSD power specification table 94 includes a disk type 941, an idle power 942, a random-read energy consumption 943, a random-write energy consumption 944, a sequential-read energy consumption 945, and a sequential-write energy consumption 946.

The disk type 941 stores identifiers for identifying the types of the SSD 6.

The idle power 942 stores a value indicating the power consumption when the corresponding SSD 6 is in the idle status.

The random-read energy consumption 943 stores a value indicating the energy consumption per data transfer size when the SSD 6 corresponding to the disk type 941 receives only the random read access and is in the fully operating status.

The random-write energy consumption 944 stores a value indicating the energy consumption per data transfer size when the SSD 6 corresponding to the disk type 941 receives only the random write access and is in the fully operating status.

The sequential-read energy consumption 945 stores a value indicating the energy consumption per data transfer size when the SSD 6 corresponding to the disk type 941 receives only the sequential read access and is in the fully operating status.

The sequential-write energy consumption 946 stores a value indicating the energy consumption per data transfer size when the SSD 6 corresponding to the disk type 941 receives only the sequential write access and is in the fully operating status.

FIG. 56 is a diagram illustrating an example of the SSD operation record table 95 according to the fourth embodiment of the invention.

The SSD operation record table 95 manages the data transfer size at the time of access to the SSD 6. The SSD operation record table 95 is updated every access to the SSD 6. The power estimating function 24 refers to the SSD operation record table 95 at the time of estimating the power.

The SSD operation record table 95 includes a disk number 951, a logical volume number 952, a random-read cumulative transfer size 953, a random-write cumulative transfer size 954, a sequential-read cumulative transfer size 955, and a sequential-write cumulative transfer size 956.

The disk number 951 and the logical volume number 952 are the same as the disk number 331 and the logical volume number 336 shown in FIG. 31.

The random-read cumulative transfer size 953 stores a cumulative transfer size of the transfer sizes at the time of random-read access to the corresponding SSD 6.

The random-write cumulative transfer size 954 stores a cumulative transfer size of the transfer sizes at the time of random-write access to the corresponding SSD 6.

The sequential-read cumulative transfer size 955 stores a cumulative transfer size of the transfer sizes at the time of sequential-read access to the corresponding SSD 6.

The sequential-write cumulative transfer size 956 stores a cumulative transfer size of the transfer sizes at the time of sequential-write access to the corresponding SSD 6.

Figure 57:
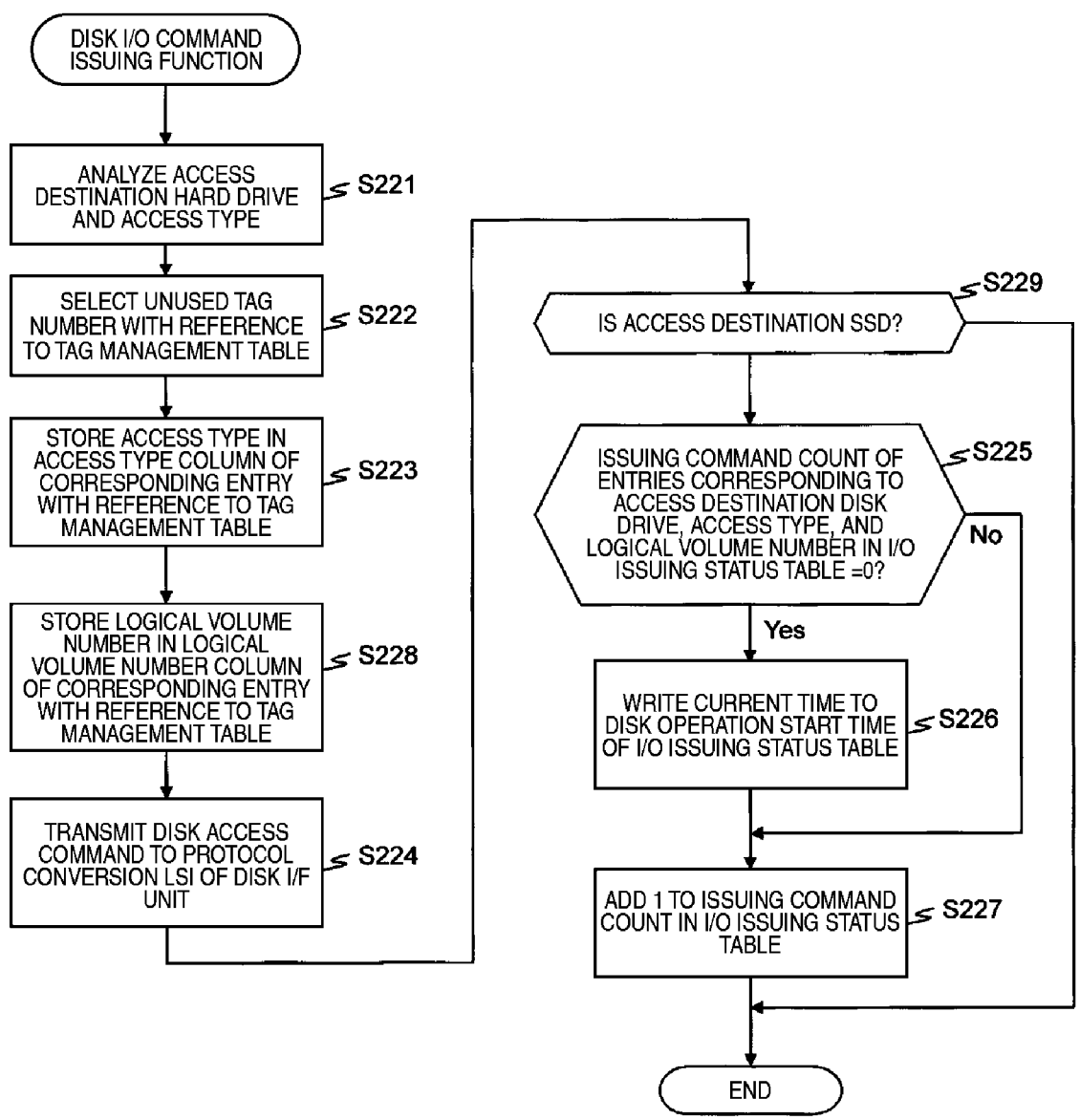
FIG. 57 is a flowchart illustrating an example of a disk I/O issuing function according to the fourth embodiment of the invention.

FIG. 57 is a flowchart illustrating an example of the disk I/O command issuing function 22 according to the fourth embodiment of the invention.

The processes of S221 to S224 are the same as the third embodiment.

In S229, the disk I/O command issuing function 22 determines whether an access destination is the SSD 6. Specifically, the disk I/O command issuing function 22 performs the determination with reference to the information on the disk drive 6 as the access destination extracted in S221.

When it is determined that the access destination is not the SSD 6, the disk I/O command issuing function 22 performs the process of S225. The processes of S225 to S227 are the same as the third embodiment.

When it is determined that the access destination is the SSD 6, the disk I/O command issuing function 22 ends the process. When the access destination is the SSD 6, the power consumption is estimated using the transfer size instead of the operating time and thus the processes of S225 to S227 are omitted.

Figure 58:
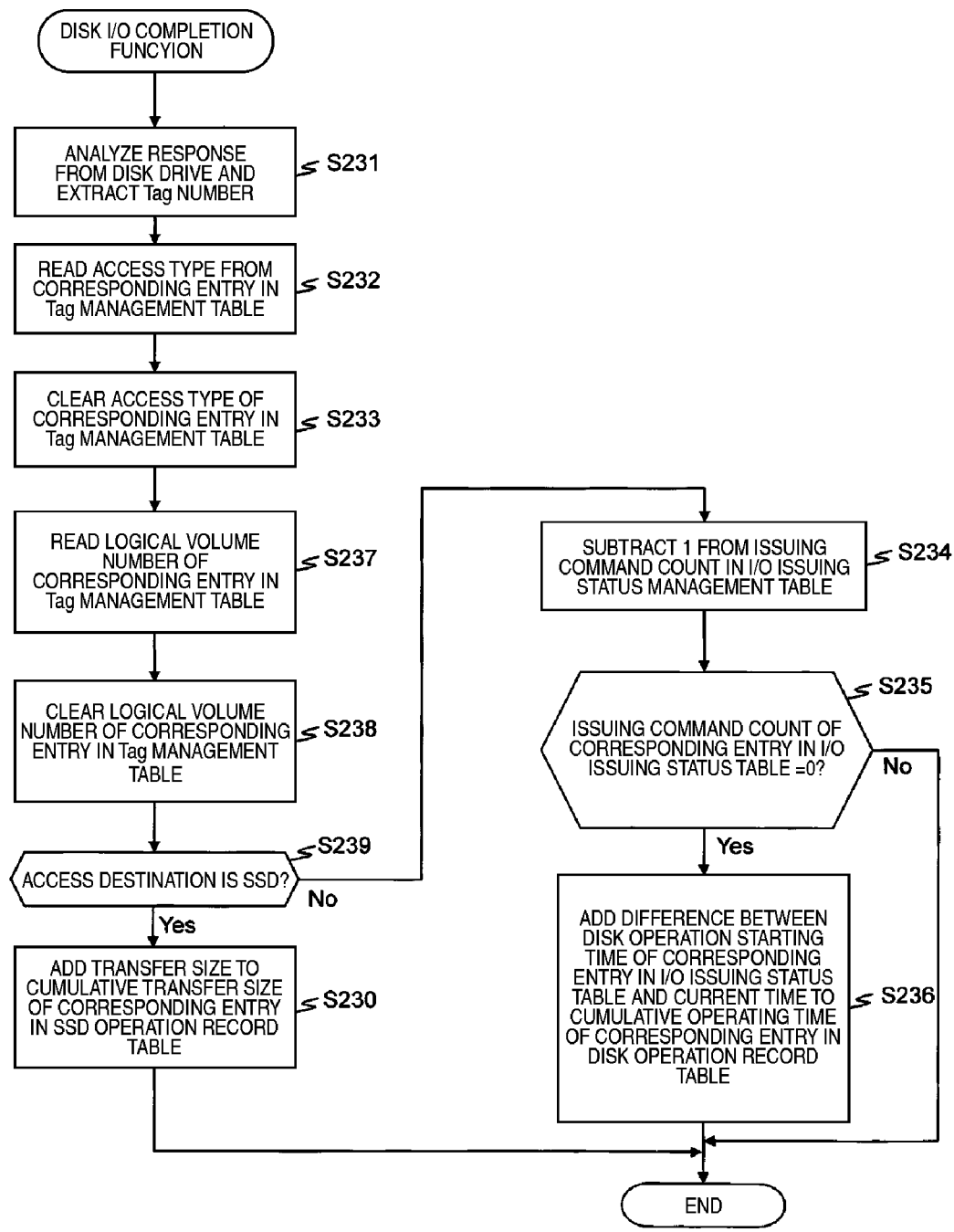
FIG. 58 is a flowchart illustrating an example of a disk I/O completion function according to the fourth embodiment of the invention.

FIG. 58 is a flowchart illustrating an example of a disk I/O completion function 23 according to the fourth embodiment of the invention.

The processes of S231 to S238 are the same as the third embodiment.

In S239, the disk I/O completion function 23 determines whether the access destination is the SSD 6.

When it is determined that the access destination is not the SSD 6, the disk I/O completion function 23 performs the process of S234. The processes of S234 to S236 are the same as the third embodiment.

When it is determined that the access destination is the SSD 6, the disk I/O ending function 23 adds the transfer size to each cumulative transfer size 943 to 946 by access types of the corresponding entry in the SSD operation record table 95 (S230) and ends the process.

Figure 59A:
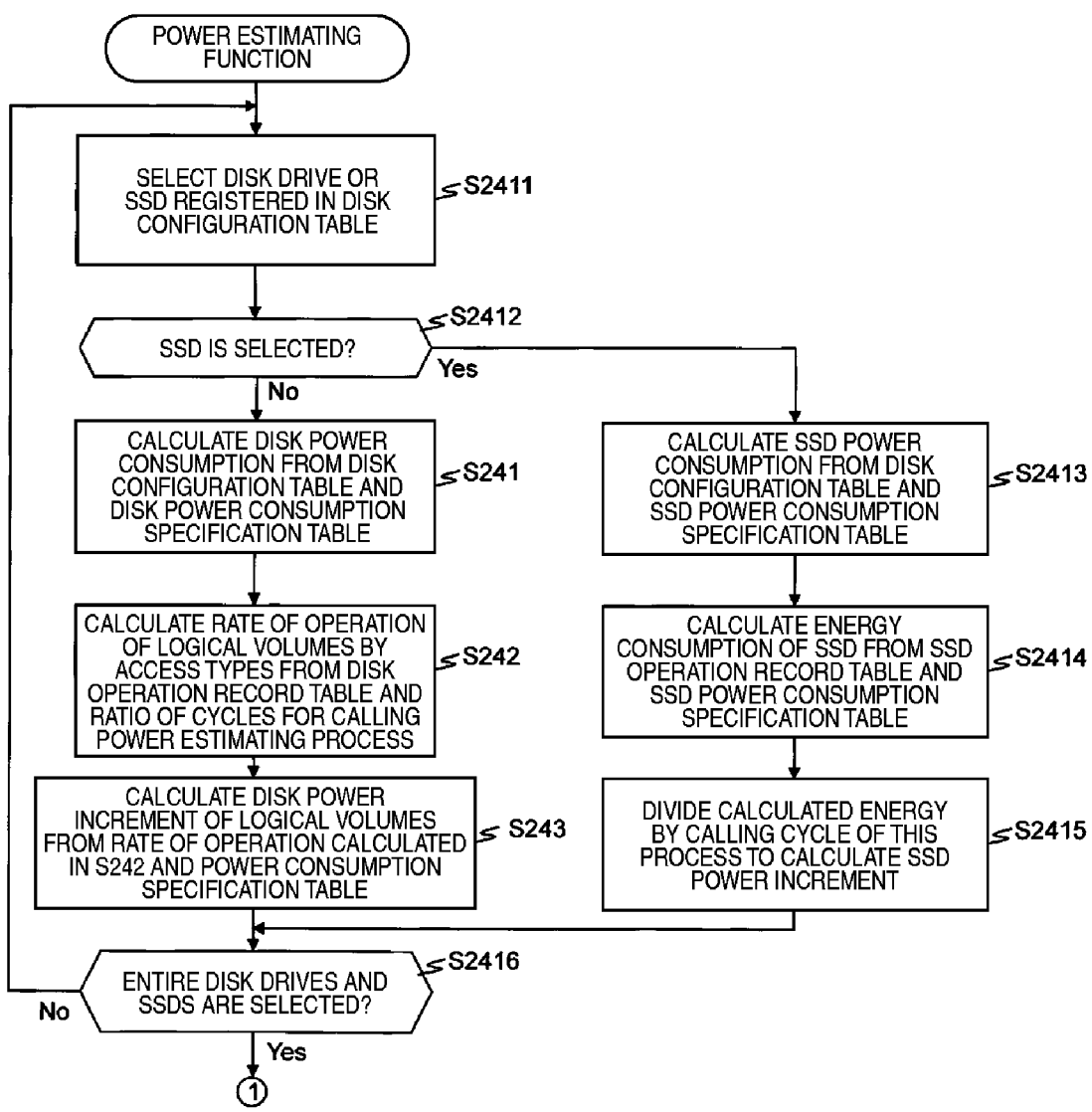
FIG. 59A is a flowchart illustrating an example of a power estimating function according to the fourth embodiment of the invention.
Figure 59B:
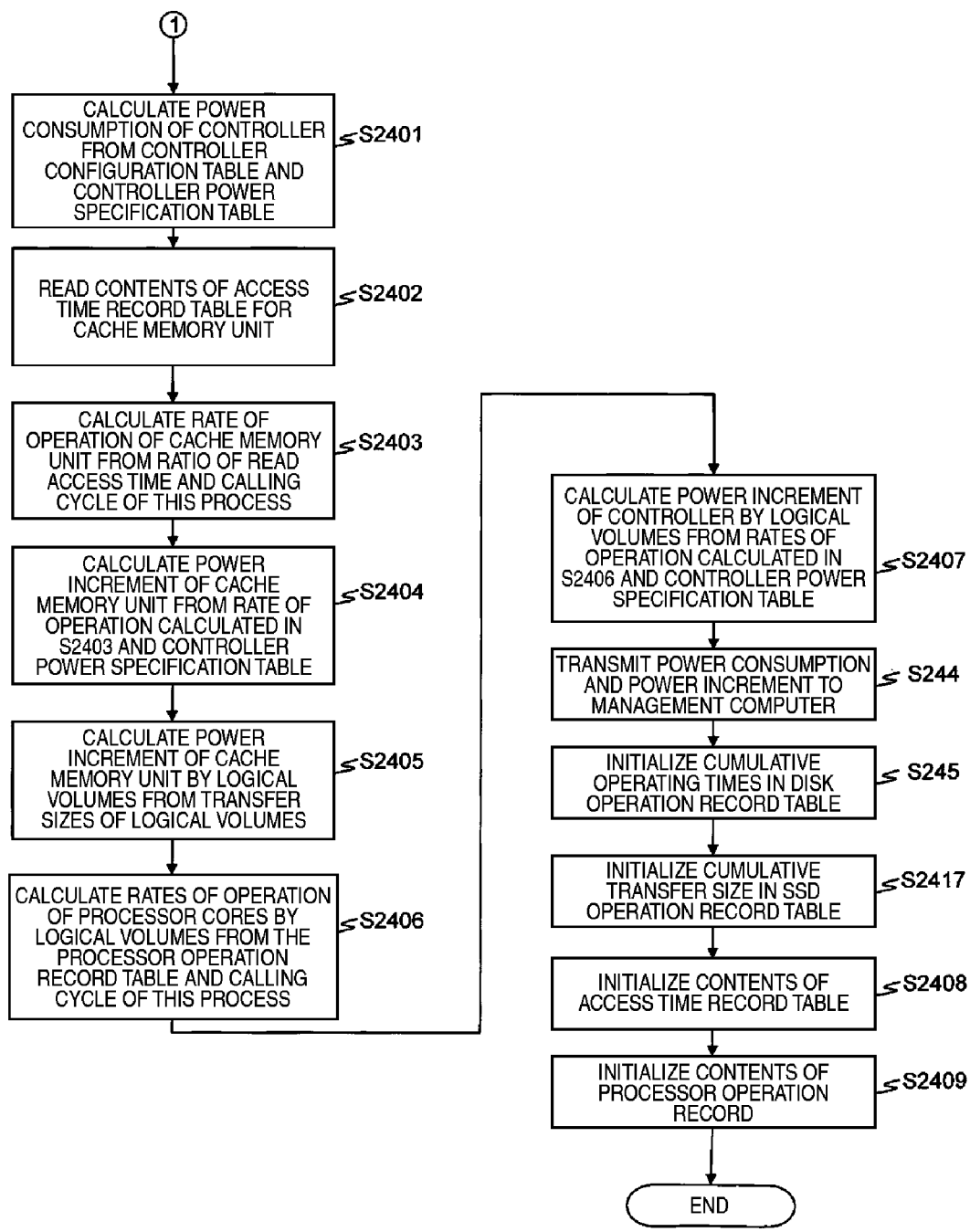
FIG. 59B is a flowchart illustrating another example of the power estimating function according to the fourth embodiment of the invention.

FIGS. 59A and 59B are flowcharts illustrating an example of the power estimating function 24 according to the fourth embodiment of the invention.

The power estimating function 24 selects a power estimating target with reference to the disk configuration table 31 (S2411).

The power estimating function 24 determines whether the selected power estimation target is the SSD (S2412).

When it is determined that the selected power estimation target is not the SSD, the power estimating function 24 performs the process of S241. The processes of S241 to S243 are the same as the third embodiment. The power estimating function 24 performs the process of S2416 after S243.

When it is determined that the selected power estimation target is the SSD, the power estimating function 24 calculates the SSD normal power with reference to the disk configuration table 31 and the SSD power specification table 94 (S2413). The calculation method is the same as performed in S241.

The power estimating function 24 calculates the energy consumption of the SSD 6 with reference to the SSD power specification table 94 and the SSD operation record table 95 (S2414). Specifically, the energy consumption is calculated by multiplying the energy consumption 933 to 936 by the cumulative transfer size 943 to 946 by access types.

The power estimating function 24 calculates the power increment of the SSD using the energy consumption calculated in S2414 and the calling interval of this process (S2415). Specifically, the power increment is calculated by dividing the energy consumption calculated in S2414 by the calling interval of this process. The power estimating function 24 performs the process of S2416 after calculating the power increment of the SSD.

The power estimating function 24 determines whether all the power estimation targets are processed (S2416).

When it is determined that all the power estimation targets are not processed, the power estimating function 24 performs the same process in S2411 again.

When it is determined that all the power estimation targets are not processed, the power estimating function 24 performs the process of S2401. The processes of S2401 to S245 are the same as the third embodiment.

In S2417, the power estimating function 24 initializes the cumulative transfer sizes 943 to 946 by access types in the SSD operation record table 95.

As described above, according to the fourth embodiment of the invention, it is possible to estimate the power consumption with high precision in consideration of the difference in characteristic between the disk drive 6 and the SSD 6 in the storage system 1 including both.

Fifth Embodiment

In a fifth embodiment of the invention, normal power along with power of respective virtual storages is provided to a manager in a storage system 1 performing a logical partition operation.

In the fifth embodiment, it is determined for what virtual storages the respective physical resources of the storage system 1 is used, the normal power is distributed depending on the degree of physical resources used in the respective virtual storages, and the distributed power is displayed.

Figure 60:
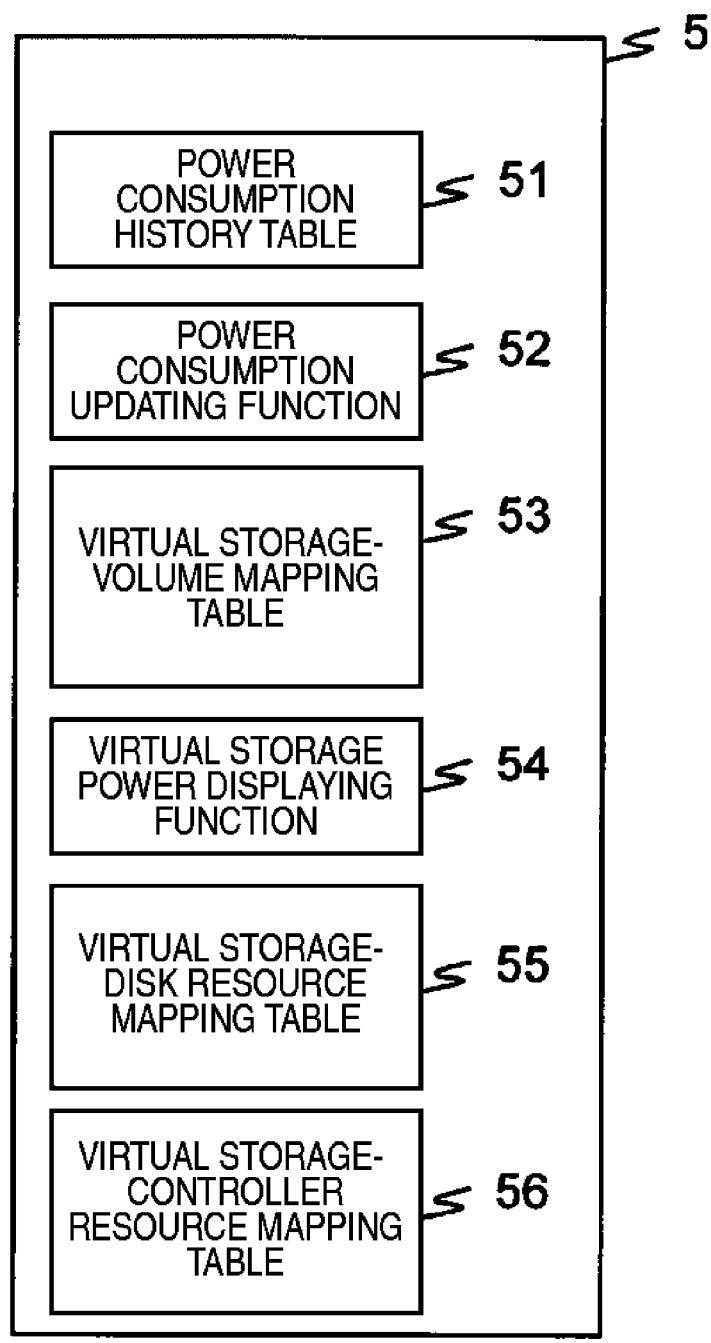
FIG. 60 is a block diagram illustrating functions and tables of a storage management program according to a fifth embodiment of the invention.

FIG. 60 is a block diagram illustrating functions and tables of the storage management program 5 according to the fifth embodiment of the invention.

Compared with the third embodiment, the storage management program 5 additionally includes a virtual storage-disk resource mapping table 55 and a virtual storage-controller resource mapping table 56. The virtual storage-disk resource mapping table 55 and the virtual storage-controller resource mapping table 56 will be described later with reference to FIGS. 60 and 61.

Figure 61:
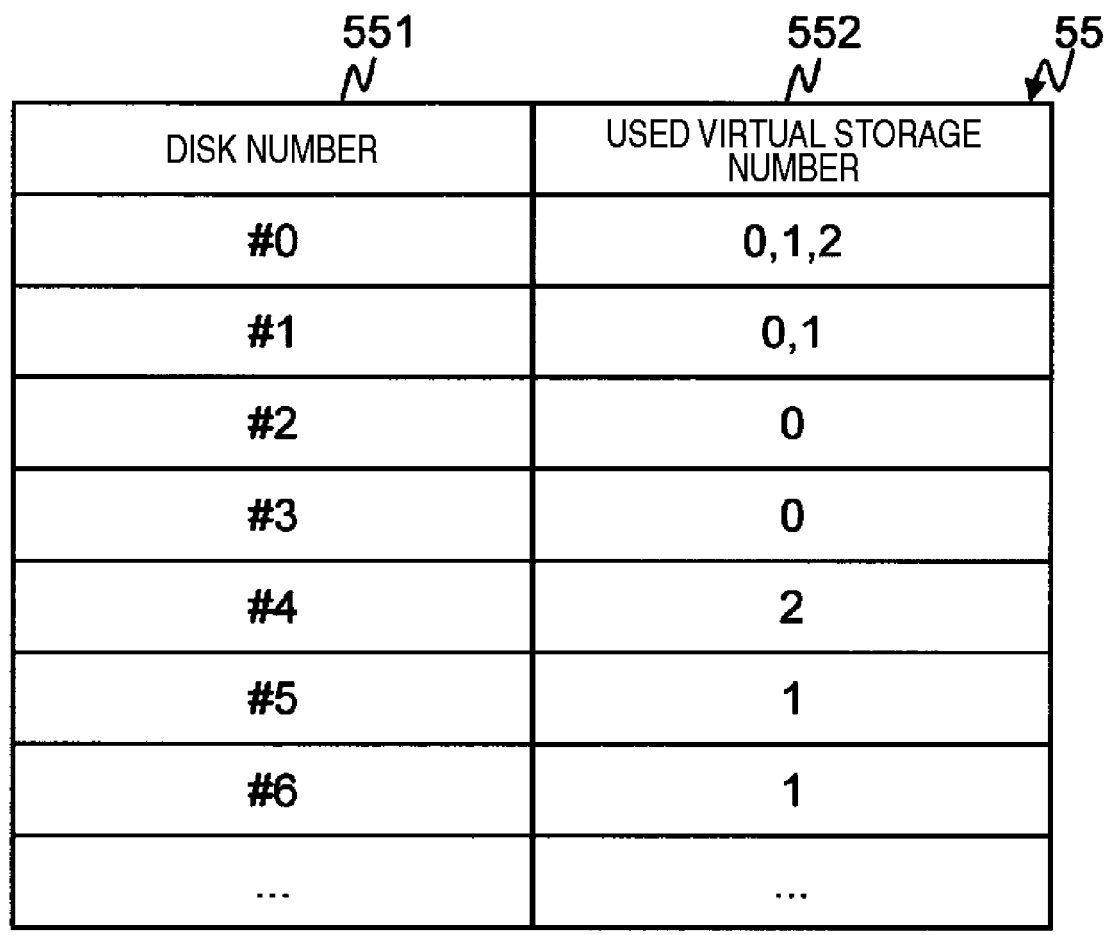
FIG. 61 is a diagram illustrating an example of a virtual storage-disk resource mapping table according to the fifth embodiment of the invention.

FIG. 61 is a diagram illustrating an example of the virtual storage-disk resource mapping table 55 according to the fifth embodiment of the invention.

The virtual storage-disk resource mapping table 55 manages for what virtual storages the disk drives 6 are used. The virtual storage-disk resource mapping table 55 is referred to at the time of displaying the power by virtual storages.

The virtual storage-disk resource mapping table 55 includes a disk number 551 and a used virtual storage number 552.

The disk number 551 is the same as the disk number 311 shown in FIG. 6.

The used virtual storage number 552 stores information indicating for what virtual storage of the corresponding disk drive 6 is used.

FIG. 62 is a diagram illustrating an example of the virtual storage-controller resource mapping table 56 according to the fifth embodiment of the invention.

The virtual storage-controller resource mapping table 56 manages for what virtual storages the respective physical resources of the storage system 1 are used. The virtual storage-controller resource mapping table 56 is referred to at the time of displaying the power by virtual storages.

The virtual storage-controller resource mapping table 56 includes a type 561, a slot number 562, and a used virtual storage number 563.

The type 561 and the slot number 562 are the same as the type 361 and the slot number 362 shown in FIG. 11.

The used virtual storage number 563 stores information indicating for what virtual storage the physical resource corresponding to the type 561 and the slot number 562 is used. Specifically, the virtual storage number 531 is stored therein.

Figure 63:
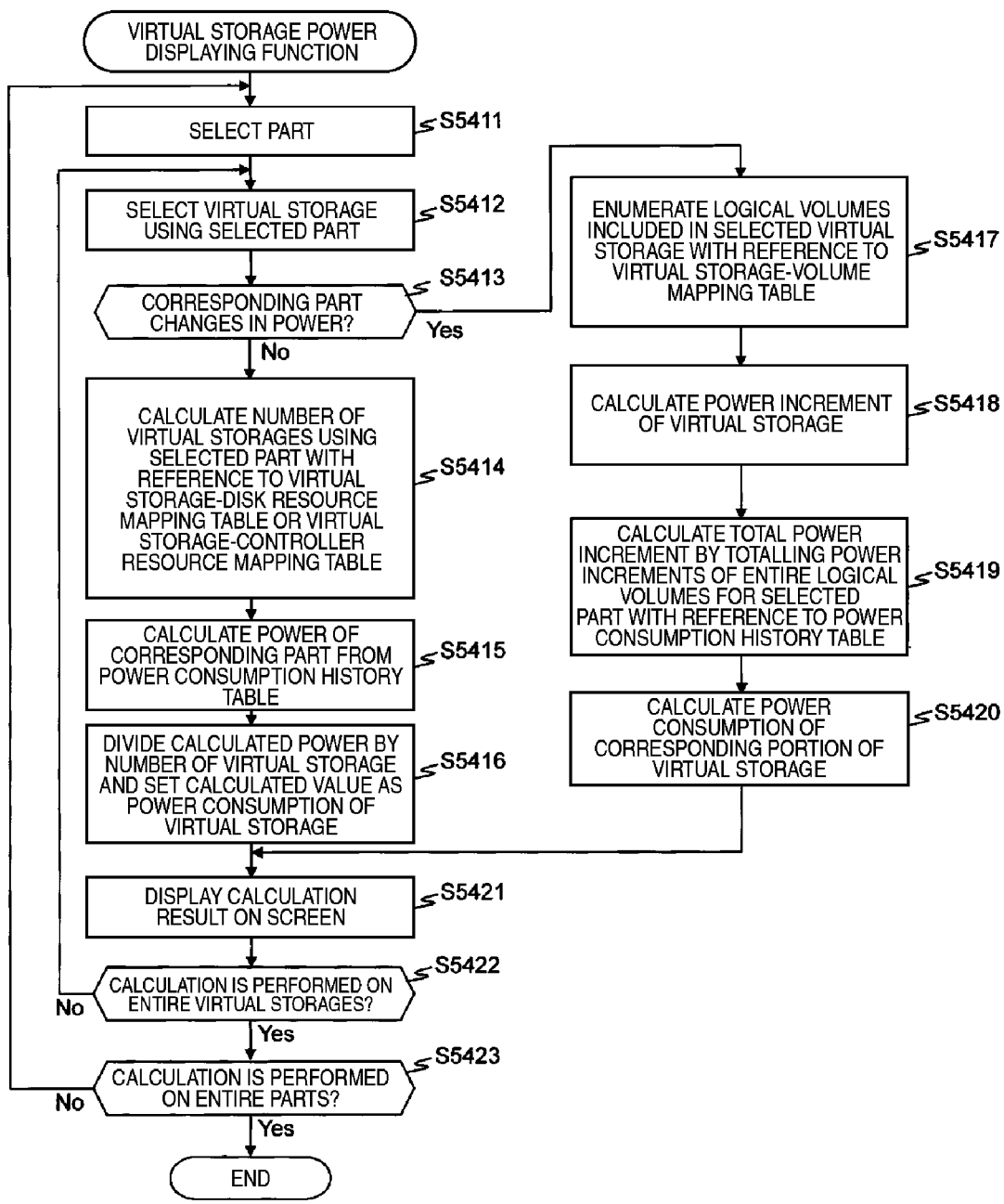
FIG. 63 is a diagram illustrating an example of a virtual storage power displaying function according to the fifth embodiment of the invention.

FIG. 63 is a diagram illustrating an example of the virtual storage power displaying function 54 according to the fifth embodiment of the invention.

The virtual storage power displaying function 54 is called in response to a manager's power display request to calculate the power consumption by virtual storages and to display the calculated power consumption by virtual storages.

First, the virtual storage power displaying function 54 selects a power consumption calculation target from the disk drives or the controller parts (S5411).

The virtual storage power displaying function 54 selects the virtual storage using the corresponding part with reference to the virtual storage-disk resource mapping table 55 and the virtual storage-controller resource mapping table 56 (S5412).

Then, the virtual storage power displaying function 54 determines whether the corresponding part varies in power (S5413). For example, it is determined that the disk drives 6 or the controller 75 vary in power and the host I/F unit 72 and the switching unit 76 do not vary in power.

When it is determined that the corresponding part varies in power, the virtual storage power displaying function 54 enumerates the logical volumes included in the selected virtual storage with reference to the virtual storage-volume mapping table 53 (S5417).

Then, the virtual storage power displaying function 54 calculates the power increment of the virtual storage by summing the power increments of the logical volumes for the selected part with reference to the power consumption history table 51 (S5418).

The virtual storage power displaying function 54 calculates the total power increment by summing the power increments of the entire logical volumes for the selected part (S5419).

The virtual storage power displaying function 54 calculates a ratio of the virtual storage power increment to the total power increment, multiplies the calculated ratio by the normal power of the selected part, calculates the normal power of the corresponding part in the virtual storage (S5420), and then performs the process of S5421.

When it is determined in S5414 that the corresponding part does not vary in power, the virtual storage power displaying function 54 calculates the number of virtual storages using the corresponding resource with reference to the virtual storage-disk resource mapping table 55 and the virtual storage-controller resource mapping table 56 (S5414).

The virtual storage power displaying function 54 calculates the normal power of the corresponding part with reference to the power consumption history table 51 (S5415).

The calculated normal power of the corresponding part is divided by the number of virtual storages used to calculate the power consumption of the corresponding part in the virtual storage (S5416).

The virtual storage power displaying function 54 displays the calculated result on a screen (S5421).

The virtual storage power displaying function 54 determines whether the entire virtual storages are processed (S5422).

When it is determined that the entire virtual storages are not processed, the virtual storage power displaying function 54 performs the process of S5412 again.

When it is determined that the entire virtual storages are processed, the virtual storage power displaying function 54 determines whether the entire parts are processed (S5423).

When it is determined that the entire parts are not processed, the virtual storage power displaying function 54 performs the process of S5411 again.

When it is determined that the entire parts are processed, the virtual storage power displaying function 54 ends the process.

In this way, in the parts varying in power, the normal power is distributed depending on the rates of usage at which the virtual storages use the corresponding part. In parts not varying in power, the normal power is uniformly assigned to the virtual storages. Accordingly, depending on the use condition of the virtual storages, it is possible to assign the power consumption so that the total power of the virtual storages corresponds to the total actual power consumption.

FIG. 64 is a diagram illustrating an example of a virtual storage power consumption displaying screen according to the fifth embodiment of the invention.

The power consumption of the respective parts is displayed in the respective virtual storages 592A and 592B.

In the example shown in FIG. 64, the virtual storage power displaying function 54 displays the power consumption of the respective virtual storages every physical resource of the storage system 1. Specifically, the power consumption of storage system 0 (592A) and storage system 1 (592B) is displayed every physical resource used by the virtual storages. This power consumption is the power consumed by the storage system 1 when the storage system is turned on but does not perform any process.

As described above, according to the fifth embodiment of the invention, it is possible to provide a manager with power of the virtual storages along with normal power in the storage system 1 logically partitioning a storage area.

A representative aspect not described in the claims includes the following.

(1) A power estimating method in a computer system including a management computer and a storage system connected to the management computer and a host computer, wherein the management computer includes a first interface connected to the storage system, a first processor connected to the first interface, and a first memory connected to the first processor, wherein the host computer includes a second interface connected to the storage system, a second processor connected to the second interface, and a second memory connected to the second processor, wherein the storage system includes at least one third processor controlling read and write of data to and from a plurality of disk drives, a control memory connected to the third processor, a management interface connected to the management computer, a host interface connected to the host computer, a disk interface connected to the disk drives, and a cache memory unit temporarily storing data, wherein, the third processor, the management interface, the host interface, the disk interface, and the cache memory unit are connected to each other, wherein the control memory stores a storage control program for controlling the storage system and control data used to control the storage system, wherein the storage control program includes a power estimating program for estimating power, wherein the cache memory unit includes a plurality of memories and a memory controller controlling the plurality of memories, wherein the control data includes incremental power consumption information indicating power consumption increments of the disk drives, the cache memory unit, and the third processor when the storage system is performing a process, wherein the method comprises the steps of:

allowing the third processor to calculate operation rates of the disk drives by access types to the disk drives from operating times of the disk drives;

allowing the third processor to calculate power consumption increments of the disk drives by access types from the incremental power consumption information and the calculated operation rates of the disk drives by access types;

allowing the third processor to calculate a operation rate of the cache memory from access time of the cache memory used for access to the disk drives;

allowing the third processor to calculate the power consumption increment of the cache memory unit used for access to the disk drives from the incremental power consumption information and the calculated operation rate of the cache memory unit;

allowing the third processor to calculate a operation rate of the third processor for access to the disk drives from an operating time of the third processor for access to the disk drives;

allowing the third processor to calculate power consumption increment of the third processor for access to the disk drives from the incremental power consumption information and the calculated operation rate of the third processor for access to the disk drives; and allowing the third processor to transmit the calculated power consumption increments of the disk drives by access types, the calculated power consumption increment of the cache memory unit used for access to the disk drives, and the calculated power consumption increment of the third processor for access to the disk drives to the management computer.

What is claimed is:

1. A power estimating method in a computer system including a management computer and a storage system connected to the management computer and a host computer, wherein the management computer includes a first interface connected to the storage system, a first processor connected to the first interface, and a first memory connected to the first processor, wherein the host computer includes a second interface connected to the storage system, a second processor connected to the second interface, and a second memory connected to the second processor, wherein the storage system includes at least one third processor controlling read and write of data to and from a plurality of disk drives, a control memory connected to the third processor, a management interface connected to the management computer, a host interface connected to the host computer, a disk interface connected to the disk drives, and a cache memory unit temporarily storing data, wherein the third processor, the management interface, the host interface, the disk interface, and the cache memory unit are connected to each other, wherein the cache memory unit includes a plurality of third memories and a memory controller controlling the plurality of third memories, wherein the control memory stores a storage control program for controlling the storage system and control data used to control the storage system, wherein the storage control program includes a power estimating program for estimating power, wherein the control data includes incremental power consumption information indicating power consumption increments of the disk drives, the cache memory unit, and the third processor when the storage system is operating, wherein the storage system
prepares logical storage-volumes in an real area of the plurality of disk drives,
logically partitions physical resources of the storage system to generate a plurality of logical partitions including the logical storage-volumes and the logically-partitioned physical resources, and
provides the logical partitions to the host computer, wherein the incremental power consumption information includes information on power consumption increments of the disk drives according to access types which include random access and sequential access to the logical storage-volumes, wherein the method comprises:

allowing the third processor to calculate operating times in the each access type based on access time in which at least one access corresponding to the access type is issued to the logical storage-volume exists, allowing the third processor to calculate operation rates of the disk drives for the each access type to the logical storage-volumes from the operating times of the disk drives for access to the logical storage-volumes;

allowing the third processor to calculate power consumption increments of the disk drives for the each access type to the logical storage-volumes by access directions from the incremental power consumption information in which each access type has each incremented power consumption and the calculated operation rates of the disk drives; and allowing the third processor to transmit the calculated power consumption increments of the disk drives for the each access type to the logical storage-volumes to the management computer.

2. The method according to claim 1, wherein the memory controller stores information on an access time to the third memory, wherein the control data includes an amount of access of the cache memory unit to the third memory used for the access to the logical storage-volumes, wherein the method further comprises:

allowing the third processor to calculate a operation rate of the cache memory unit used for access to the disk drives from access times to the cache memory unit used for access to the disk drives;

allowing the third processor to calculate power consumption increment of the cache memory unit used for access to the disk drives from the calculated operation rate of the cache memory unit used for access to the disk drives and the incremental power consumption information;

allowing the third processor to calculate a operation rate of the cache memory unit used for access to the logical storage-volumes from the total amount of access of the cache memory unit used for access to the logical storage-volumes and amounts of access to the cache memory unit used for access to the respective logical storage-volumes;

allowing the third processor to calculate the power consumption increments of the cache memory unit used for access to the logical storage-volumes from the calculated operation rate of the cache memory unit used for access to the respective logical storage-volumes and the incremental power consumption information; and allowing the third processor to transmit to the management computer the calculated power consumption increments of the cache memory unit used for access to the disk drives and the calculated power consumption increments of the cache memory unit used for access to the logical storage-volumes.

3. The method according to claim 1, wherein the control data includes information on an operating time of the third processor for access to the logical storage-volumes, and wherein the method further comprises:

allowing the third processor to calculate a operation rate of the third processor for access to the logical storage-volumes from the operating time of the third processor for access to the logical storage-volumes;

allowing the third processor to calculate a power consumption increment of the third processor for access to the logical storage volumes from the incremental power consumption information and the calculated operation rate of the third processor for access to the logical storage-volumes; and allowing the third processor to transmit the calculated power consumption increment of the third processor for access to the logical storage-volumes to the management computer.

4. The method according to claim 1, wherein the control data includes information on the operating time and the power consumption in operating statuses of the disk drives, and wherein the method further comprises:

allowing the storage system to calculate ratios of the operating statuses of the disk drives from the operating times of the operating statuses of the disk drives; and allowing the storage system to calculate the power consumption in the operating statuses of the disk drives from the calculated ratios of the operating statuses of the disk drives and the power consumption in the operating statuses of the disk drives.

5. The method according to claim 1, wherein the disk drives include a semiconductor device, wherein the control data includes incremental energy consumption information indicating an energy consumption increment of the semiconductor device when the storage system is performing a process, wherein the incremental energy consumption information includes information on the energy consumption increment per unit data transfer size by access types, wherein data transfer sizes to the logical storage-volumes by access types are stored, wherein the method comprises:

allowing the third processor to calculate an energy consumption increment of the semiconductor devices by access types from the incremental energy consumption information and the data transfer sizes to the logical storage-volumes by access types; and allowing the third processor to calculate a power consumption increment of the semiconductor device by access types from the calculated energy consumption increment of the semiconductor device by access types and an execution interval of the power estimating program.

6. The method according to any one of claims 1 to 5, wherein the control data includes information on normal power consumption of the disk drive, the cache memory unit, and the third processor when the operating storage system is not performing any process, wherein the first memory stores information on mapping of the logical storage-volumes and the logical partitions, and wherein the method further comprises:

allowing the storage system to transmit information on normal power consumption of the disk drives, the cache memory unit, and the third processor to the management computer;

allowing the management computer to determine whether the power consumption of a part of which the power should be calculated varies from the incremental power consumption information;

allowing the management computer to calculate the normal power consumption of the disk drives, the cache memory unit, and the third processor as the normal power consumption of the logical partitions on the basis of the number of logical partitions using the disk drives, the cache memory unit, and the third processor, when it is determined that the power consumption of which the power should be calculated does not vary;

allowing the management computer to calculate the power consumption increments of the disk drives, the cache memory unit, and the third processor in the logical partitions from the calculated power consumption increments of the disk drives for access to the logical storage-volumes, the calculated power consumption increment of the cache memory unit used for access to the logical storage-volumes, the calculated power consumption increment of the third processor for access to the logical storage-volumes, and the mapping of the logical storage-volumes and the logical partitions, when it is determined that the power consumption of which the power should be calculated does not vary; and displaying the calculated normal power consumption of the disk drives, the cache memory unit, and the third processor in the logical partitions and the calculated power consumption increments of the disk drives, the cache memory unit, and the third processor in the logical partitions.

7. A computer system including a management computer and a storage system connected to the management computer and a host computer, wherein the management computer includes a first interface connected to the storage system, a first processor connected to the first interface, and a first memory connected to the first processor, wherein the host computer includes a second interface connected to the storage system, a second processor connected to the second interface, and a second memory connected to the second processor, wherein the storage system includes at least one third processor controlling read and write of data to and from a plurality of disk drives, a control memory connected to the third processor, a management interface connected to the management computer, a host interface connected to the host computer, a disk interface connected to the disk drives, and a cache memory unit temporarily storing data, wherein the third processor, the management interface, the host interface, the disk interface, and the cache memory unit are connected to each other, wherein the cache memory unit includes a plurality of third memories and a memory controller controlling the plurality of third memories, wherein the control memory stores a storage control program for controlling the storage system and control data used to control the storage system, wherein the storage control program includes a power estimating program for estimating power, wherein the control data includes incremental power consumption information indicating power consumption increments of the disk drives, the cache memory unit, and the third processor when the storage system is operating, wherein the storage system
prepares logical storage-volumes in an real area of the plurality of disk drives,
logically partitions physical resources of the storage system to generate a plurality of logical partitions including the logical storage-volumes and the logically-partitioned physical resources, and
provides the logical partitions to the host computer,
wherein the incremental power consumption information includes information on power consumption increments of the disk drives according to access types which include random access and sequential access to the logical storage-volumes,
wherein the storage system
calculates operating times in the each access type based on access time in which at least one access corresponding to the access type is issued to the logical storage-volume exists,
calculates operation rates of the disk drives for the each access type to the logical storage-volumes from the operating times of the disk drives for access to the logical storage-volumes,
calculates power consumption increments of the disk drives for the each access type to the logical storage-volumes by access directions from the incremental power consumption information in which each access type has each incremented power consumption and the calculated operation rates of the disk drives, and
transmits the calculated power consumption increments of the disk drives for the each access type to the logical storage-volumes to the management computer.

8. The system according to claim 7, wherein the memory controller stores information on an access time to the third memory,
wherein the control data includes an amount of access of the cache memory unit to the third memory used for the access to the logical storage-volumes,
wherein the storage system
calculates a operation rate of the cache memory unit used for access to the disk drives from access times to the cache memory unit used for access to the disk drives,
calculates power consumption increment of the cache memory unit used for access to the disk drives from the calculated operation rate of the cache memory unit used for access to the disk drives and the incremental power consumption information,
calculates a operation rate of the cache memory unit used for access to the logical storage-volumes from the total amount of access of the cache memory unit used for access to the logical storage-volumes and amounts of access to the cache memory unit used for access to the respective logical storage-volumes,
calculates the power consumption increments of the cache memory unit used for access to the logical storage-volumes from the calculated operation rate of the cache memory unit used for access to the respective logical storage-volumes and the incremental power consumption information, and
transmits to the management computer the calculated power consumption increments of the cache memory unit used for access to the disk drives and the calculated power consumption increments of the cache memory unit used for access to the logical storage-volumes.

9. The system according to claim 7, wherein the control data includes information on an operating time of the third processor for access to the logical storage-volumes, and
wherein the storage system
calculates an operation rate of the third processor for access to the logical storage-volumes from the operating time of the third processor for access to the logical storage-volumes;
calculates a power consumption increment of the third processor for access to the logical storage volumes from the incremental power consumption information and the calculated operation rate of the third processor for access to the logical storage-volumes, and
transmits the calculated power consumption increment of the third processor for access to the logical storage-volumes to the management computer.

10. The system according to claim 7, wherein the control data includes information on the operating time and the power consumption in operating statuses of the disk drives, and
wherein the storage system
calculates ratios of the operating statuses of the disk drives from the operating times of the operating statuses of the disk drives, and
calculates the power consumption in the operating statuses of the disk drives from the calculated ratios of the operating statuses of the disk drives and the power consumption in the operating statuses of the disk drives.

11. The system according to claim 7, wherein the disk drives include a semiconductor device,
wherein the control data includes incremental energy consumption information indicating an energy consumption increment of the semiconductor device when the storage system is performing a process,
wherein the incremental energy consumption information includes information on the energy consumption increment per unit data transfer size by access types,
wherein data transfer sizes to the logical storage-volumes by access types are stored, and
wherein the storage system
calculates an energy consumption increment of the semiconductor devices by access types from the incremental energy consumption information and the data transfer sizes to the logical storage-volumes by access types, and
calculates a power consumption increment of the semiconductor device by access types from the calculated energy consumption increment of the semiconductor device by access types and an execution interval of the power estimating program.

12. The system according to any one of claims 7 to 11, wherein the control data includes information on normal power consumption of the disk drive, the cache memory unit, and the third processor when the operating storage system is not performing any process,
- wherein the first memory stores information on mapping of the logical storage-volumes, the logically-partitioned physical resources, and the logical partitions, and
- wherein the storage system transmits information on normal power consumption of the disk drives, the cache memory unit, and the third processor to the management computer,
- wherein the management computer
  - determines whether the power consumption of a part of which the power should be calculated varies from the incremental power consumption information;
  - calculates the normal power consumption of the disk drives, the cache memory unit, and the third processor as the normal power consumption of the logical partitions on the basis of the number of logical partitions using the disk drives, the cache memory unit, and the third processor, when it is determined that the power consumption of which the power should be calculated does not vary;
  - calculates the power consumption increments of the disk drives, the cache memory unit, and the third processor in the logical partitions from the calculated power consumption increments of the disk drives for access to the logical storage-volumes, the calculated power consumption increment of the cache memory unit used for access to the logical storage-volumes, the calculated power consumption increment of the third processor for access to the logical storage-volumes, and the mapping of the logical storage-volumes and the logical partitions, when it is determined that the power consumption of which the power should be calculated does not vary; and
  - displays the calculated normal power consumption of the disk drives, the cache memory unit, and the third processor in the logical partitions and the calculated power consumption increments of the disk drives, the cache memory unit, and the third processor in the logical partitions.

13. A computer system including a management computer and a storage system connected to the management computer and a host computer,
- wherein the management computer includes a first interface connected to a network, a first processor connected to the first interface, and a first memory connected to the first processor,
- wherein the host computer includes a second interface connected to the storage system, a second processor connected to the second interface, and a second memory connected to the second processor,
- wherein the storage system includes at least one third processor controlling read and write of data to and from a plurality of disk drives, a control memory connected to the third processor, a management interface connected to the management computer, at least one host interface connected to the network, at least one disk interface connected to the disk drives, and a cache memory unit temporarily storing data,
- wherein the third processor, the management interface, the host interface, the disk interface, and the cache memory unit are connected to each other through a switching unit,
- wherein the control memory stores a storage control program for controlling the storage system and control data used to control the storage system,
- wherein the cache memory unit includes a plurality of third memories and a memory controller controlling the plurality of third memories,
- wherein the memory controller includes an access time record table in which an amount of access to the memory is recorded,
- wherein the storage system
  - prepares logical volumes in an real area of the plurality of disk drives,
  - logically partitions physical resources of the storage system to generate a plurality of virtual storages including the logical volumes and the logically-partitioned physical resources, and
  - provides the logical partitions to the host computer,
- wherein the control data includes:
  - a disk configuration table storing configurations of the disk drives;
  - a disk operating time record table storing operating times of the disk drives by access types every logical volume;
  - a disk power specification table storing power consumption increments of the disk drives by access types and power consumption of the disk drives when the operating storage system does not perform any process;
  - a controller configuration table storing configurations of the controller and the cache memory unit;
  - a controller power specification table storing power consumption of the controller and the cache memory unit when the operating storage system is not performing any process;
  - a controller power variation specification table storing the power consumption increments of the controller and the cache memory unit when the operating storage system is performing a process;
  - a processor operation record table storing an operating time of the processor core by logical volumes; and
  - a cache access-amount table storing an amount of access to the cache memory unit used for access to the logical volumes,
- wherein the management computer has
  - a storage management program managing the storage system;
  - a virtual storage-volume mapping table storing mapping of the logical volumes, the logically-partitioned physical resources, and the virtual storages;
  - a virtual storage power displaying function displaying power of the virtual storages; and
  - a power estimating function estimating power,
- wherein the storage system
  - calculates power consumption of the disk drives with reference to the disk configuration table and the disk power specification table,
  - calculates operation rates of the disk drives for access to the logical volumes from the disk operating time record table and an execution interval of the power estimating function,
  - calculates power consumption increments of the disk drives for access to the logical volumes by access types from the disk power specification table and the calculated operation rates of the disk drives,
  - calculates power consumption of the cache memory unit and the controller from the controller configuration table and the controller power specification table, calculates a operation rate of the cache memory unit from the access time record table and the execution interval of the power estimating function, calculates a power increment of the cache memory unit from the controller power variation specification table and the calculated operation rate of the cache memory unit, calculates a power consumption increment of the cache memory unit for access to the logical volumes from the access time record table, the controller power variation specification table, and the cache access-amount table, calculates a operation rate of the processor core for access to the logical volumes from the processor operation record table and the execution interval of the power estimating function, calculates a power consumption increment of the controller for access to the logical volumes from the controller power variation specification table and the calculated operation rate of the processor core, and transmits the calculated power consumption and the calculated power consumption increments to the management computer, and wherein the management computer calculates the power increments of the disk drives, the power increment of the cache memory unit, and the power increment of the controller by virtual volumes and displays the calculated power consumption of the disk drives and the calculated power consumption of the controller with reference to the virtual storage-volume mapping table.

14. A computer system including a management computer and a storage system connected to the management computer and a host computer, wherein the management computer includes a first interface connected to a network, a first processor connected to the first interface, and a first memory connected to the first processor, wherein the host computer includes a second interface connected to the storage system, a second processor connected to the second interface, and a second memory connected to the second processor, wherein the storage system includes at least one third processor controlling read and write of data to and from a plurality of disk drives, a control memory connected to the third processor, a management interface connected to the management computer, at least one host interface connected to the network, at least one disk interface connected to the disk drives, and a cache memory unit temporarily storing data, wherein the third processor, the management interface, the host interface, the disk interface, and the cache memory unit are connected to each other through a switching unit, wherein the control memory stores a storage control program for controlling the storage system and control data used to control the storage system, wherein the cache memory unit includes a plurality of third memories and a memory controller controlling the plurality of third memories, wherein the memory controller includes an access time record table in which an amount of access to the memory is recorded, wherein the storage system
prepares logical volumes in an real area of the plurality of disk drives,
logically partitions physical resources of the storage system to generate a plurality of virtual storages including the logical volumes and the logically-partitioned physical resources, and
provides the logical partitions to the host computer, wherein the control data includes:
a disk configuration table storing configurations of the disk drives;
a disk operating time record table storing operating times of the disk drives by access types which include random access and sequential access, for every logical volume;
a disk power specification table storing power consumption increments of the disk drives by the access types which include random access and sequential access, and power consumption of the disk drives when the operating storage system does not perform any process;
a controller configuration table storing configurations of the controller and the cache memory unit;
a controller power specification table storing power consumption of the controller and the cache memory unit when the operating storage system is not performing any process;
a controller power variation specification table storing the power consumption increments of the controller and the cache memory unit when the operating storage system is performing a process;
a processor operation record table storing an operating time of the processor core by logical volumes; and
a cache access-amount table storing an amount of access to the cache memory unit used for access to the logical volumes, wherein the management computer has
a storage management program managing the storage system;
a virtual storage-volume mapping table storing mapping of the logical volumes, the logically-partitioned physical resources, and the virtual storages;
a virtual storage power displaying function displaying power of the virtual storages; and
a power estimating function estimating power, wherein the storage system
calculates power consumption of the disk drives with reference to the disk configuration table and the disk power specification table,
calculates operation rates of the disk drives for the each access type to the logical volumes from the disk operating time record table and an execution interval of the power estimating function,
calculates power consumption increments of the disk drives for the each access type to the logical volumes by the access types including random access and sequential access, from the disk power specification table and the calculated operation rates of the disk drives, in which the each access type has each incremented power consumption,
calculates power consumption of the cache memory unit and the controller from the controller configuration table and the controller power specification table,
calculates a operation rate of the cache memory unit from the access time record table and the execution interval of the power estimating function,
calculates a power increment of the cache memory unit from the controller power variation specification table and the calculated operation rate of the cache memory unit,
calculates a power consumption increment of the cache memory unit for access to the logical volumes from the access time record table, the controller power variation specification table, and the cache access-amount table, calculates a operation rate of the processor core for access to the logical volumes from the processor operation record table and the execution interval of the power estimating function, calculates a power consumption increment of the controller for access to the logical volumes from the controller power variation specification table and the calculated operation rate of the processor core, and transmits the calculated power consumption and the calculated power consumption increments, including the calculated power consumption increments of the disk drives for the each access type to the logical volumes, to the management computer, and wherein the management computer calculates the power increments of the disk drives, the power increment of the cache memory unit, and the power increment of the controller by virtual volumes and displays the calculated power consumption of the disk drives and the calculated power consumption of the controller with reference to the virtual storage-volume mapping table.

\* \* \* \* \*